US006678332B1

(12) United States Patent
Gardere et al.

(10) Patent No.: US 6,678,332 B1
(45) Date of Patent: Jan. 13, 2004

(54) SEAMLESS SPLICING OF ENCODED MPEG VIDEO AND AUDIO

(75) Inventors: Daniel Gardere, Montigny-le-Bretonneux (FR); John Forecast, Newton, MA (US); Peter Bixby, Westborough, MA (US); Sorin Faibish, Newton, MA (US); Wayne W. Duso, Shrewsbury, MA (US); Seyfullah H. Oguz, Framingham, MA (US); Sebastian Keller, Paris (FR); Michel Noury, Villebon sur Yette (FR); Jean Louis Rochette, Vougival (FR)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/540,347

(22) Filed: Mar. 31, 2000

Related U.S. Application Data

(60) Provisional application No. 60/174,360, filed on Jan. 4, 2000.

(51) Int. Cl.$^7$ .............................. H04B 1/66; H04N 7/18
(52) U.S. Cl. .................................. 375/240.26; 348/705
(58) Field of Search ....................... 375/240.26, 240.25; 348/705; 370/487; 725/32

(56) References Cited

U.S. PATENT DOCUMENTS

| | | | |
|---|---|---|---|
| 5,231,484 A | 7/1993 | Gonzales et al. | ............ 358/133 |
| 5,534,944 A | 7/1996 | Egawa et al. | ................ 348/584 |
| 5,675,384 A | 10/1997 | Ramamurthy et al. | ...... 348/405 |
| 5,838,678 A | 11/1998 | Davis et al. | ................. 370/389 |
| 5,859,660 A * | 1/1999 | Perkins et al. | ................. 725/32 |
| 5,892,915 A | 4/1999 | Duso et al. | ............ 395/200.49 |
| 5,917,830 A * | 6/1999 | Chen et al. | .................. 370/487 |
| 5,959,690 A | 9/1999 | Toebes, VIII et al. | ...... 348/578 |
| 6,038,000 A * | 3/2000 | Hurst, Jr. | ................ 375/240.26 |
| 6,414,998 B1 * | 7/2002 | Yoshinari et al. | ....... 375/240.25 |

OTHER PUBLICATIONS

Y. Nakajima, H. Hori, and T. Kanoh, "Rate Conversion of MPEG Coded Video by Re–quantization Process," IEEE Proc. of ICIP–95, vol. III, Sep. 1995, pp. 408–411.

(List continued on next page.)

*Primary Examiner*—Howard Britton
*Assistant Examiner*—Allen Wong
(74) *Attorney, Agent, or Firm*—Howrey Simon Arnold & White LLP

(57) ABSTRACT

Predictive analysis is performed upon encoded digital motion video (such as an MPEG Transport Stream) to facilitate real-time splicing. The predictive analysis includes estimation of upper and lower bounds of the data levels in a decoder's video and audio buffers for splicing in such a way as to prevent buffer overflow and underflow. This enables buffer management techniques including padding or stuffing, micro-restamping, freeze or repeat of frames, skip or drop of frames, alignment of audio with video. The predictive analysis also includes analysis of the structure of the encoded audio including audio access units (AAUs) and compression windows (AFs), prediction in the compressed domain of initial conditions of the decoder buffer levels for every single Elementary Stream (ES) component of a Transport Stream (TS), and identification of valid splicing In Points and Out Points based on the predicted buffer levels without any special encoder. This permits splicing of different compressed audio types without consideration of the details of the compression mechanism. The predictive analysis may also include recommendations or marking. The analysis is performed on ingest of the data as a pre-processing in preparation for splicing of a new file on early queuing in a data storage system before streaming.

28 Claims, 40 Drawing Sheets

OTHER PUBLICATIONS

A. T. Erdem and M.I. Sezan, "Multi–generation Characteristics of the MPEG Video Compression Standards," IEEE Proc. of ICIP–94, vol. II, 1994, pp. 933–937.

M. Perreira, and A. Lippman, "Re–codable video," IEEE Proc. of ICIP–94, vol. II, 1994, pp. 952–956.

M. Mohsenian, R. Rajagopalan, and C.A. Gonzales, "Single–pass constant– and variable–bit–rate MPEG–2 video compression," IBM J. Res. Develop., vol. 43, No. 4, Jul. 1999, pp. 489–509.

P.H. Westerink, R. Rajagopalan, and C.A. Gonzales, "Two–pass MPEG–2 variable–bit–rate encoding," IBM J. Res. Develop., vol. 43, No. 4, Jul. 1999, pp. 471–488.

Jill Boyce, John Henderson, and Larry Pearlstein, "An SDTV Decoder with HDTV Capability: An All–Format ATV Decoder," Hitachi America Ltd., file://C:Fatima\67.gif, pp. 67–75, pubished at least as early as Jan. 12, 2000.

Boon–Lock Yeo, "On fast microscopic browsing of MPEG–compressed video," IBM T.J. Watson Research Center, Jan. 1998, Multimedia Systems 7, 1999, pp. 269–281.

Robert Mokry and Dimitris Anastassiou, "Minimal Error Drift in Frequency Scalability for Motion–Compensated DCT Coding," IEEE Transactions on Circuits and Systems for Video Technology, vol. 4, No. 4, Aug. 1994, pp. 392–406.

C. Ward, C. Pecota, X. Lee, and G. Hughes, "Seamless Splicing for MPEG–2 Transport Stream Video Servers," SMPTE Journal, Dec. 1999, pp. 873–879.

Norm Hurst and Katie Cornog, "MPEG Splicing: A New Standard for Television—SMPTE 312M," SMPTE Journal, Nov. 1998, pp. 978–988.

Norm Hurst and Katie Cornog, "Splicing FAQ," http://www.mpeg.org/MPEG/splicing–FAW.html, 8 pages, published at least as early as Oct. 13, 1999.

SMPTE 312M–1999, SMPTE Standard for Television, "Splice Points for MPEG–2 Transport Streams," Approved Apr. 8, 1999, The Society of Motion Picture and Television Engineers, White Plains, NY, 20 pages.

"The Shape of MPEG," DV Magazine, vol. 4, No. 12, Dec. 1996, http://livedv.com/Mag/Dec96/Contents/mpeg/mpeg.html, 5 pages, published at least as early as Oct. 13, 1999.

"A Guide to MPEG Fundamentals and Protocol Analysis (Including DVB and ATSC)," Tektronix, Inc., Beaverton, Oregon, 1997, pp. 48 pages.

Leonardo Chiariglione, "MPEG and multimedia communications," CSELT, Torino Italy, http://www.cselt.stet.it/ufv/leonardo/paper/isce96.htm, 50 pages, published at least as early as Oct. 13, 1999.

Barry G. Haskell, Atul Puri, and Arun N. Netravali, *MPEG–2 Video Coding and Compression*, Chp. 8, pp. 156–182, and "Interactive Television," Chp. 13, pp. 292–306, Digital Video: An Introduction to MPEG–2, Chapman & Hall, New York, NY, 1997.

"MPEG–2: The basics of how it works," Hewlett Packard, published at least as early as Oct. 31, 1999, 17 pages.

Anil K. Jain, *Fundamentals of Digital Image Processing*, Prentice Hall, Inc., Englewood Cliffs, New Jersey, 1989, Chapter 4: Image Sampling and Quantization and Chapter 5: Image Transforms, pp. 80–188.

"Information technology—Generic coding of moving pictures and associated audio information: Systems," International Standard, ISO/IEC 13818–1:1996(E), 136 pages.

"Information technology—Generic coding of moving pictures and associated audio information: Video," International Standard, ISO/IEC 13818–3:1996(E), 211 pages.

"Information technology—Generic coding of moving pictures and associated audio information—Part 3: Audio," International Standard, ISO/IEC 13818–3:1995(E), 118 pages.

Jerry D. Gibson, Toby Berger, Tom Lookabaugh, Dave Lindbergh, and Richard L. Baker, *Digital Compression for Multimedia: Principles and Standards*, Morgan Kaufmann Publishers, Inc., San Francisco, CA, 1998, Chapter 9: JPEG Still–Image Compression Standard, pp. 291–308, and Chapter 11: MPEG Compression, pp. 363–417.

Barry G. Haskell, Atul Puri, and Arun N. Netravali, Digital Video: An Introduction to MPEG–2, Chapman & Hall, New York, NY, 1997, pp. 1–279, 292–306, 369–421.

\* cited by examiner

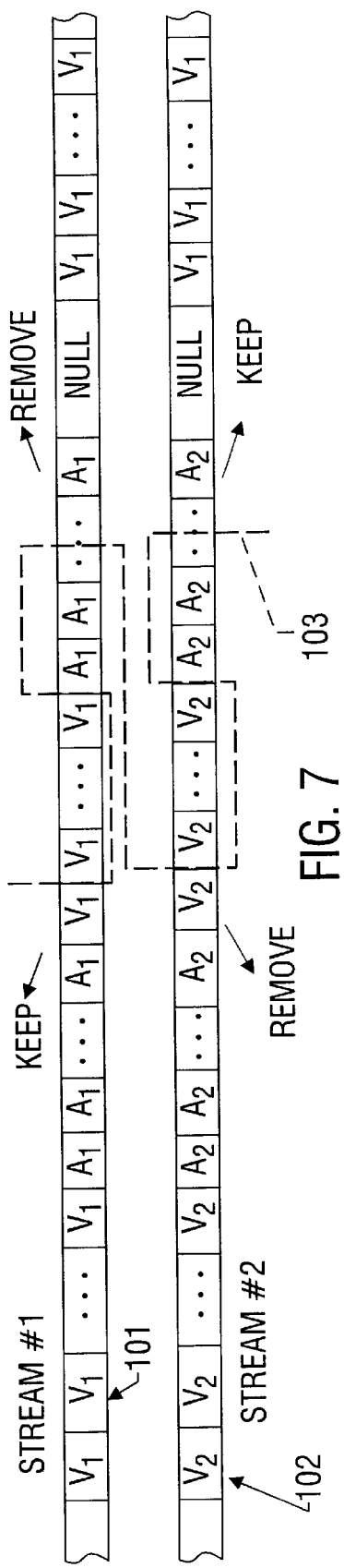
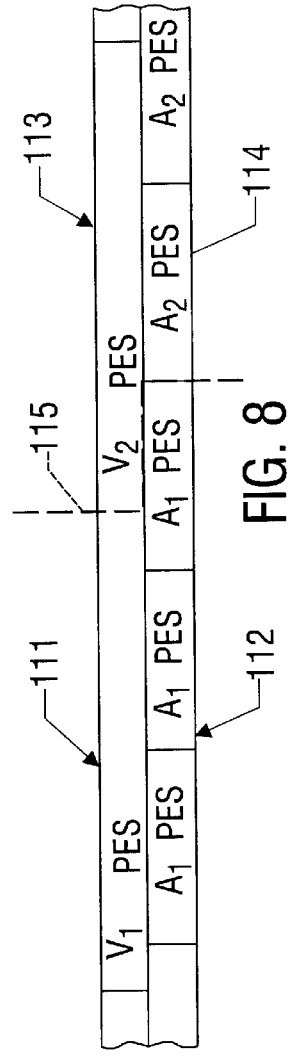
FIG. 7
FIG. 8
FIG. 9

| STREAM #1 BEST ALIGNED APU SHORT INTO THE CUT ($\Delta_1 > 0$) | STREAM #2 BEST ALIGNED APU SHORT INTO THE CUT ($\Delta_2 < 0$) | 12 MSEC. < AUDIO GAP < 24 MSEC. ($\Delta_1 - \Delta_2$) | FIGS. 11A, 11B, 11C |
| --- | --- | --- | --- |
| | | 0 MSEC. < AUDIO GAP < 12 MSEC. ($\Delta_1 - \Delta_2$) | FIGS. 12A, 12B |
| | STREAM #2 BEST ALIGNED APU LONG INTO THE CUT ($\Delta_2 > 0$) | 0 MSEC. < AUDIO GAP < 12 MSEC. ($\Delta_1 - \Delta_2$) | FIGS. 13A, 13B |
| | | 0 MSEC. < AUDIO OVERLAP < 12 MSEC. ($\Delta_2 - \Delta_1$) | FIGS. 14A, 14B |
| STREAM #1 BEST ALIGNED APU LONG INTO THE CUT ($\Delta_1 < 0$) | STREAM #2 BEST ALIGNED APU SHORT INTO THE CUT ($\Delta_2 < 0$) | 0 MSEC. < AUDIO GAP < 12 MSEC. ($\Delta_1 - \Delta_2$) | FIGS. 15A, 15B |
| | | 0 MSEC. < AUDIO OVERLAP < 12 MSEC. ($\Delta_2 - \Delta_1$) | FIGS. 16A, 16B |
| | STREAM #2 BEST ALIGNED APU LONG INTO THE CUT ($\Delta_2 > 0$) | 12 MSEC. < AUDIO OVERLAP < 24 MSEC. ($\Delta_2 - \Delta_1$) | FIGS. 17A, 17B, 17C |
| | | 0 MSEC. < AUDIO OVERLAP < 12 MSEC. ($\Delta_2 - \Delta_1$) | FIGS. 18A, 18B |

FIG. 10

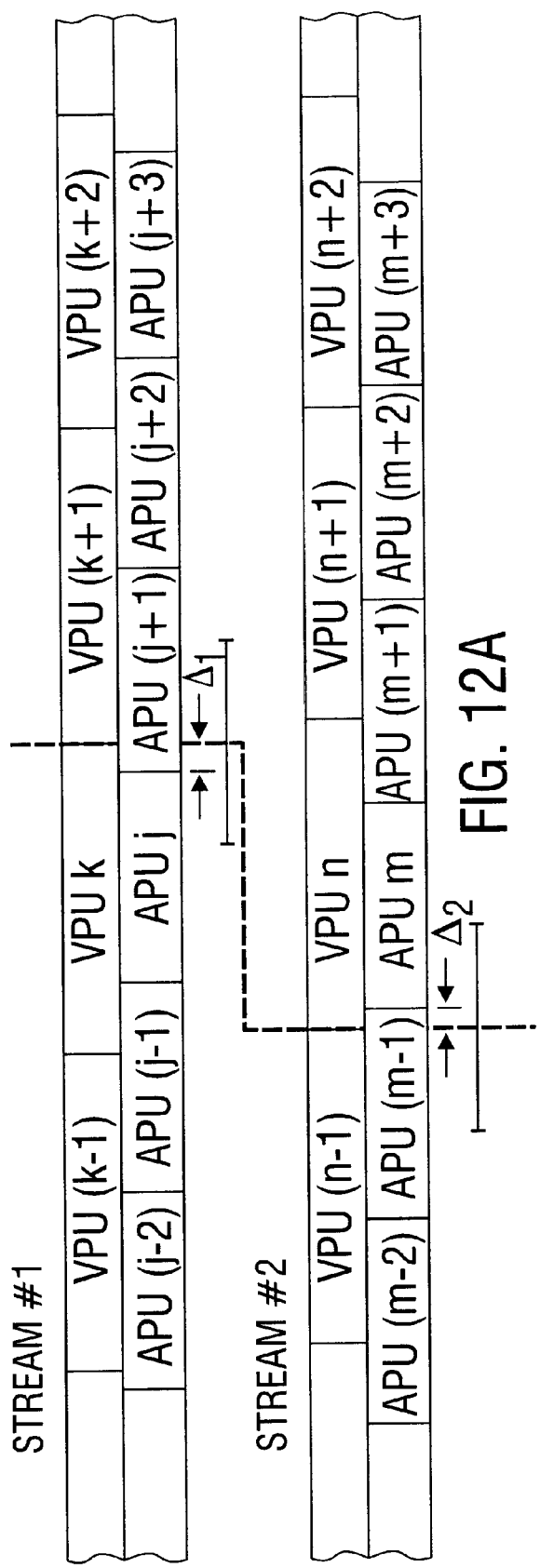
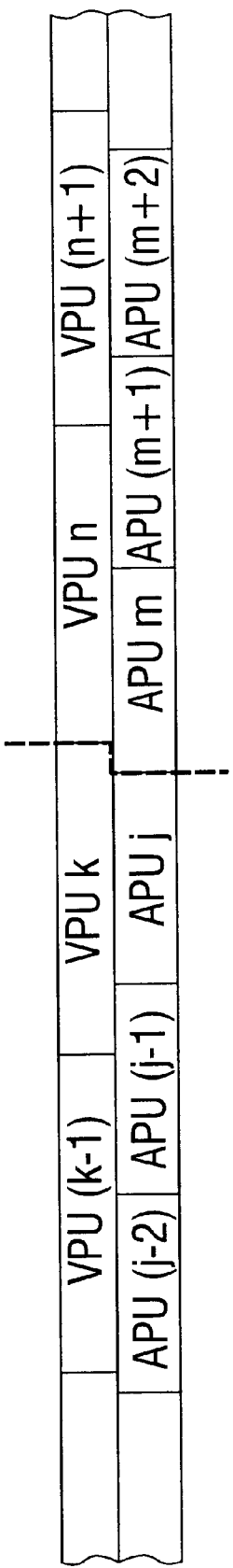
FIG. 12A
FIG. 12B

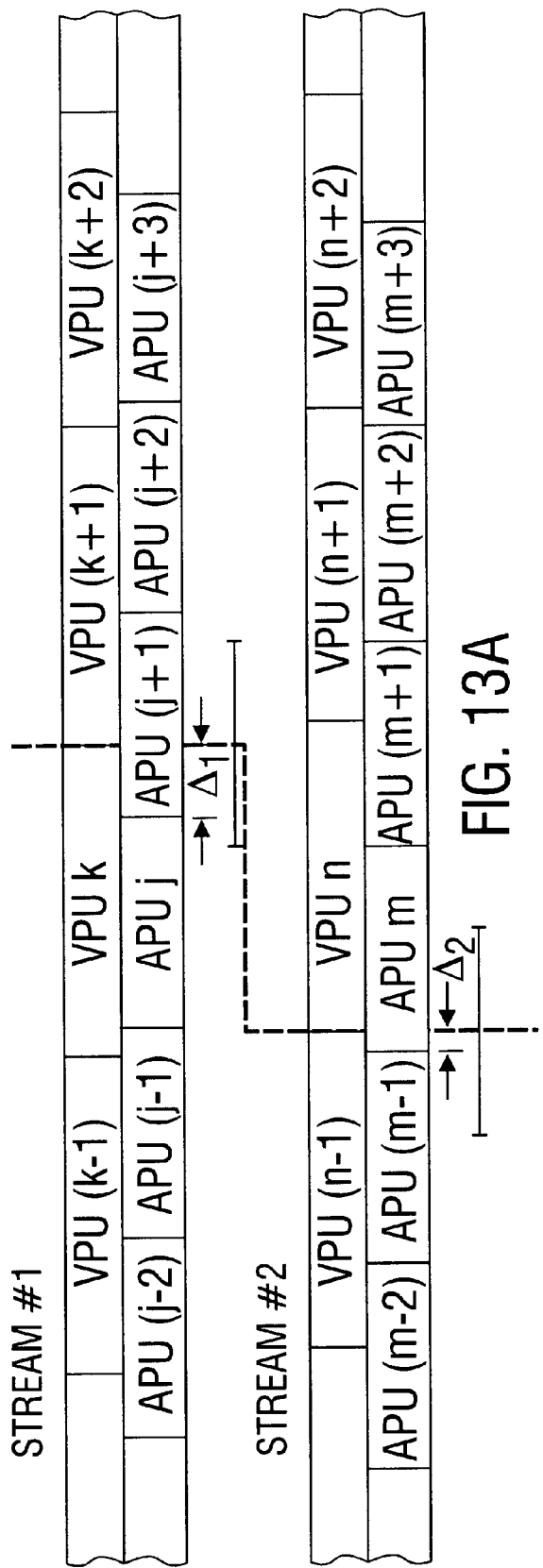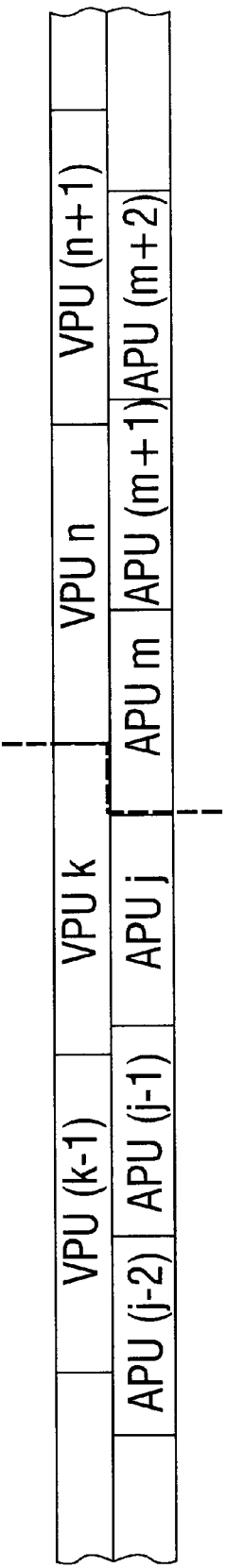
FIG. 13A
FIG. 13B

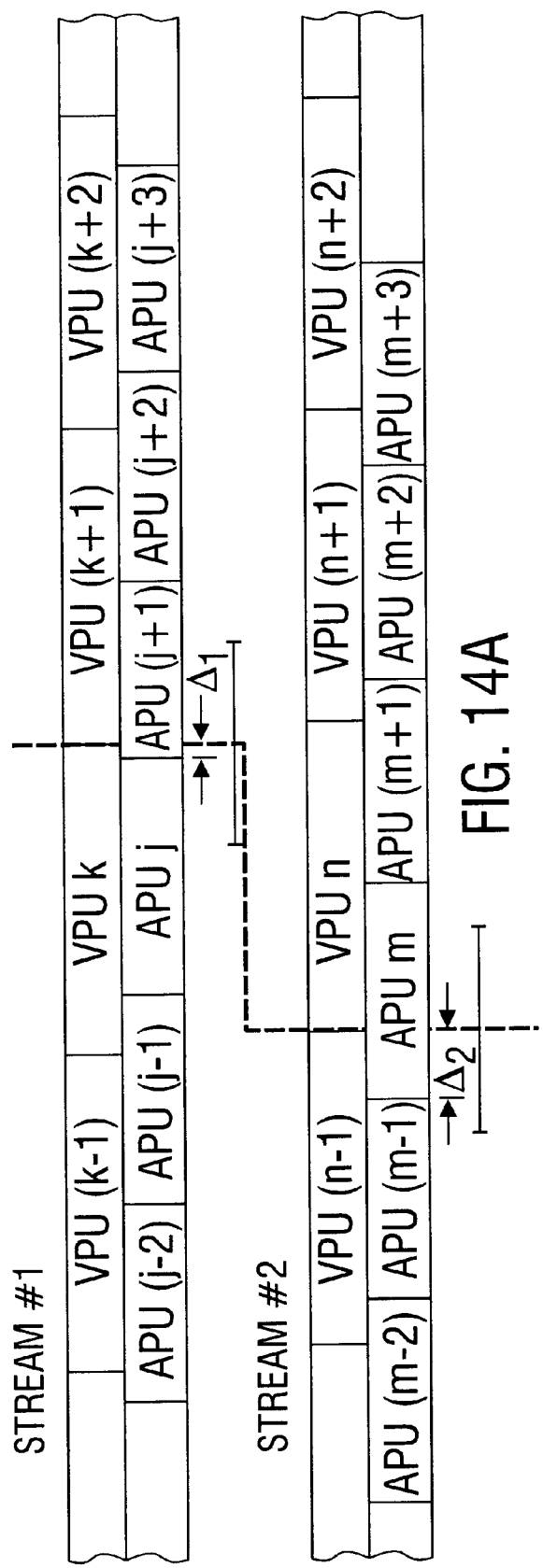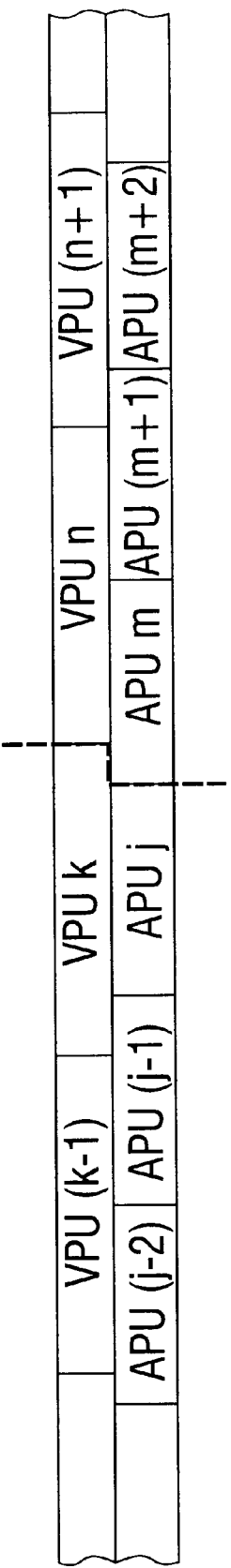

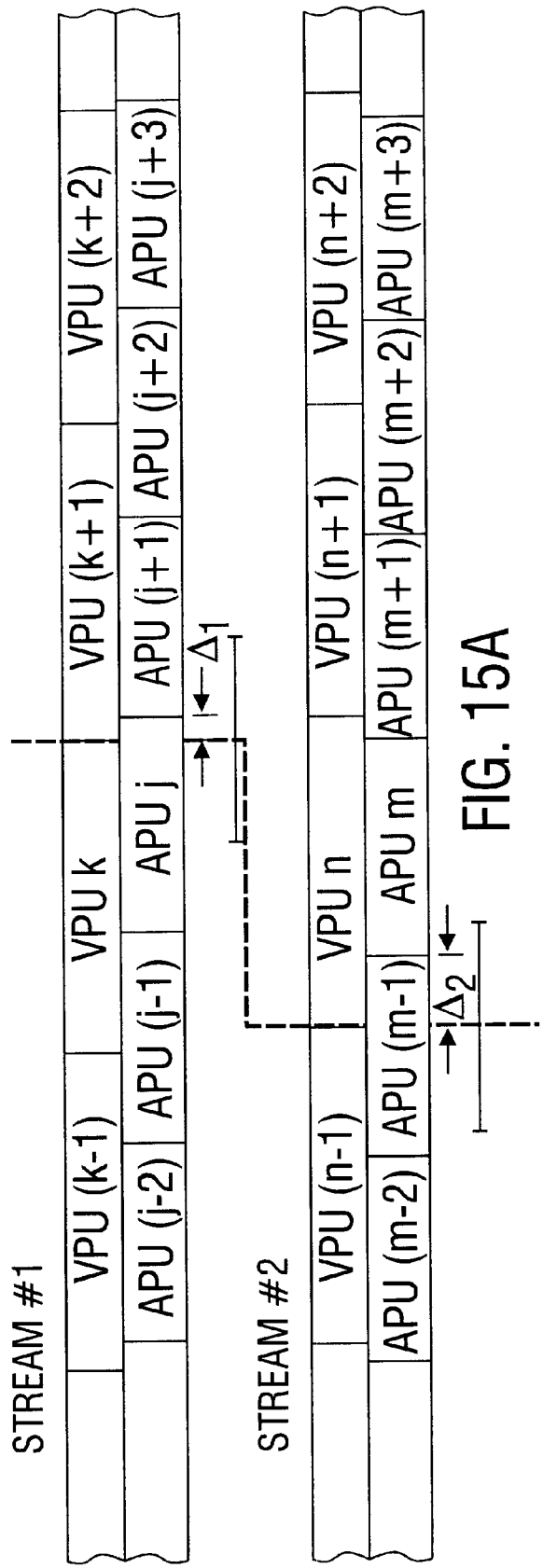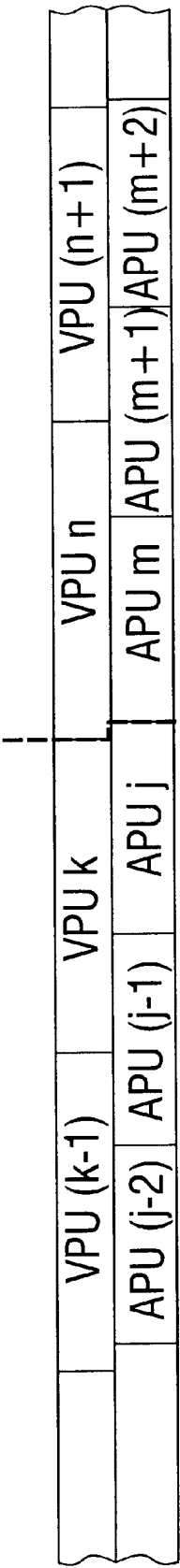
FIG. 15A
FIG. 15B

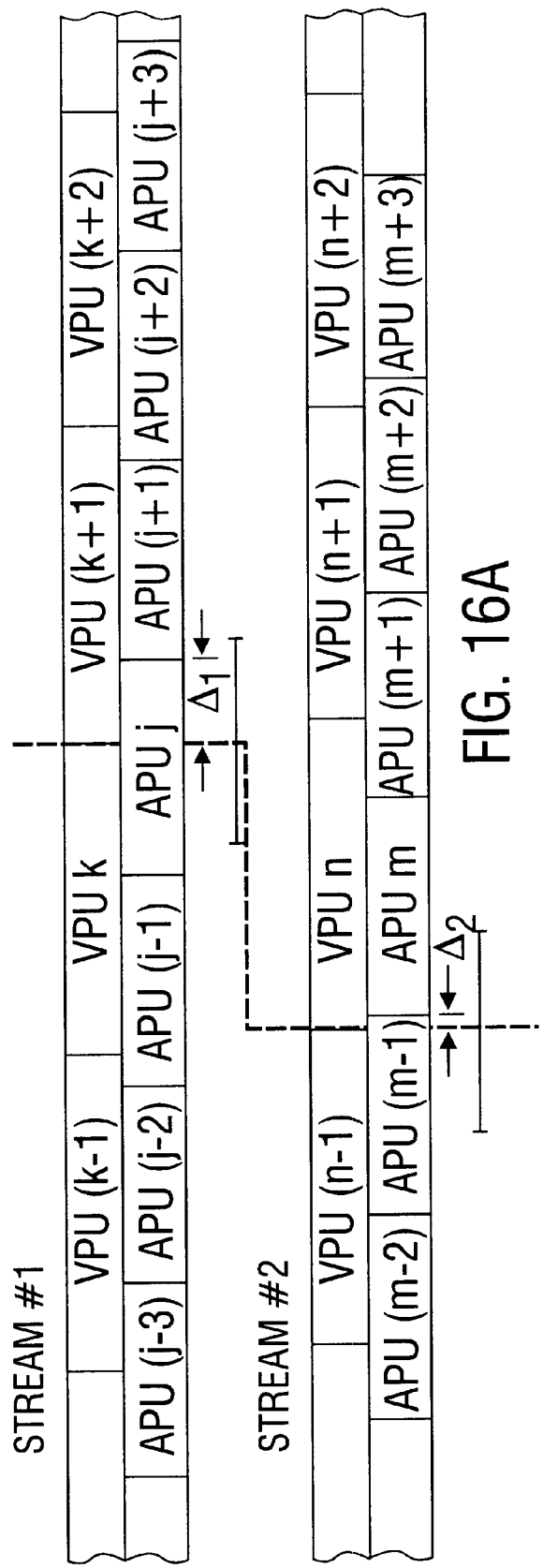
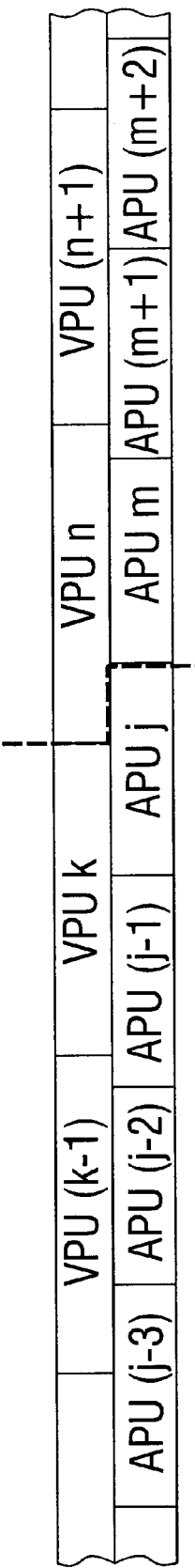
FIG. 16A
FIG. 16B

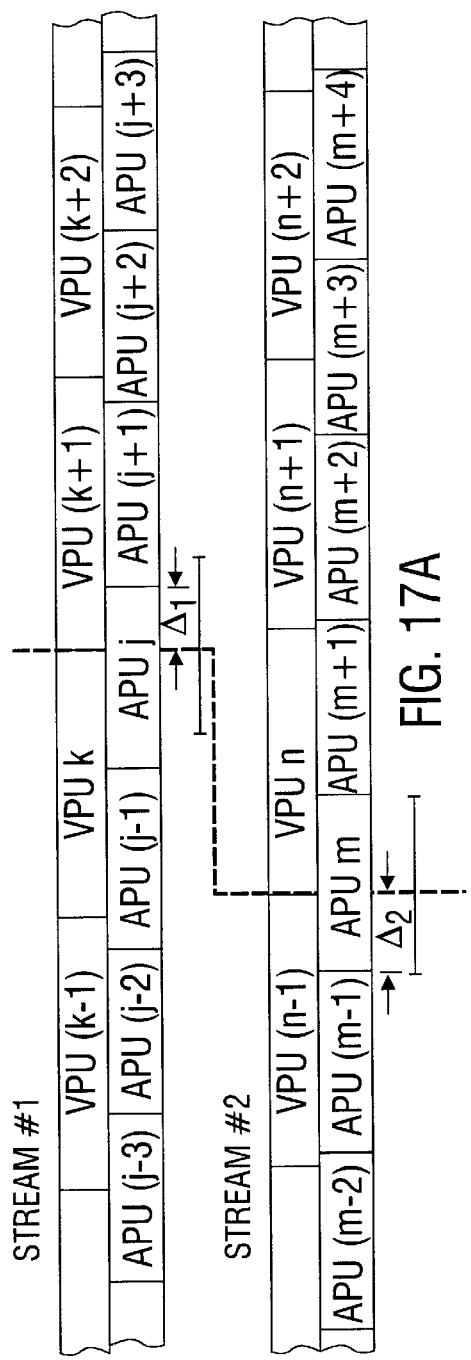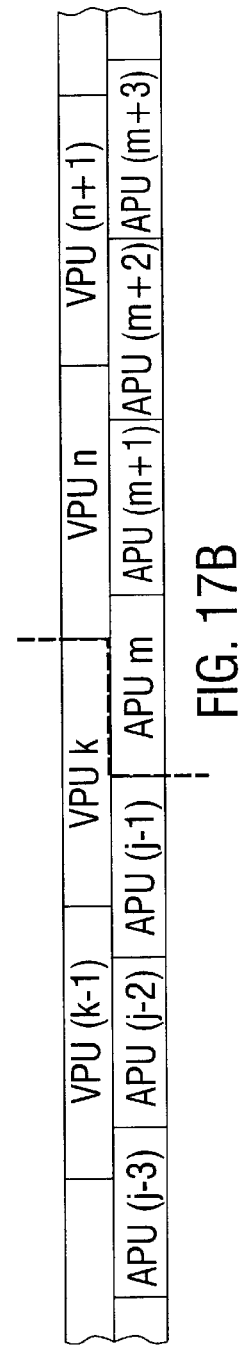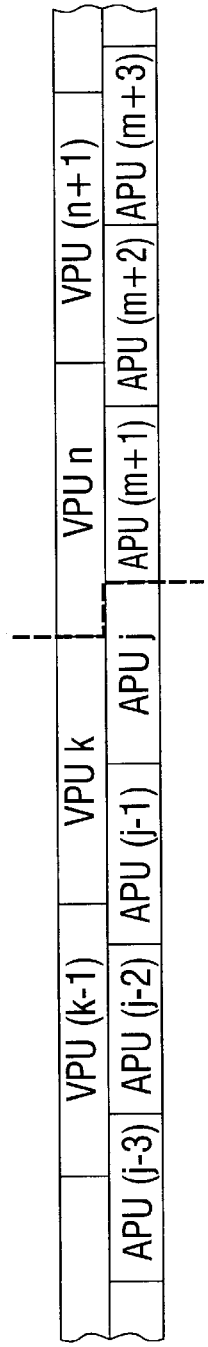
FIG. 17A
FIG. 17B
FIG. 17C

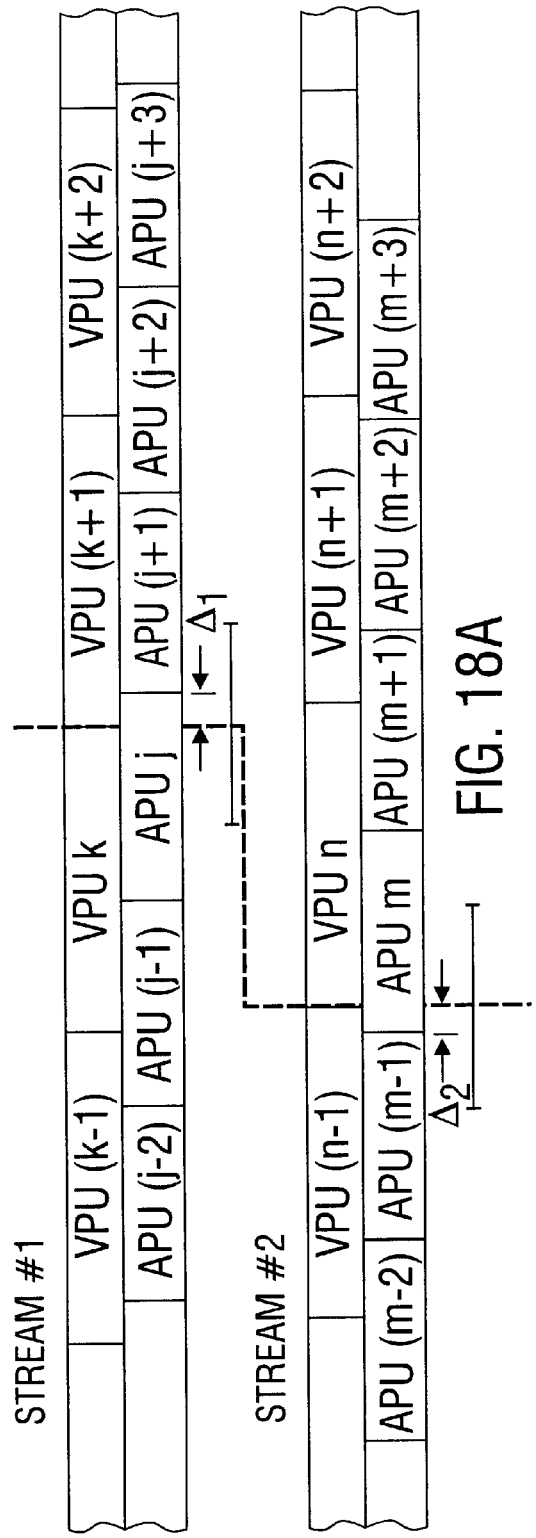
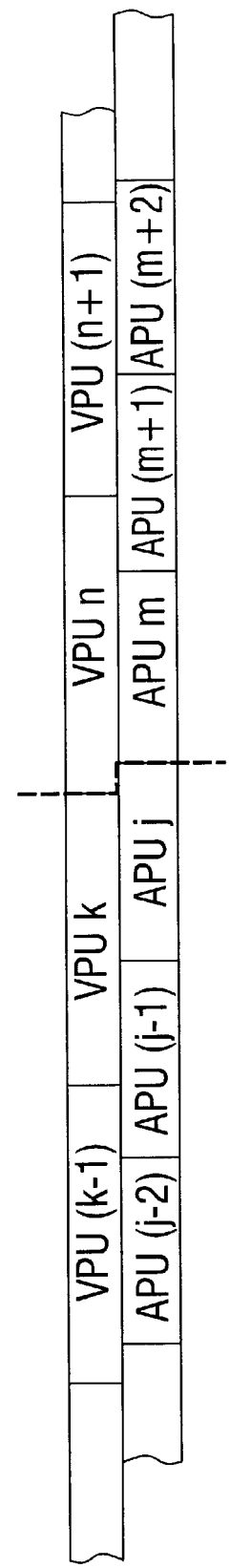
FIG. 18A
FIG. 18B

| CASE | SECOND CLIP HAS A HIGH MEAN AUDIO BUFFER LEVEL | SECOND CLIP HAS A LOW MEAN AUDIO BUFFER LEVEL |
|---|---|---|
| FIG. 11A | USE FIG. 28 | USE FIG. 11B OR 11C |
| FIG. 12A | USE FIG. 12B | USE FIG. 29 |
| FIG. 13A | USE FIG. 13B | USE FIG. 30 |
| FIG. 14A | USE FIG. 31 | USE FIG. 14B |
| FIG. 15A | USE FIG. 15B | USE FIG. 32 |
| FIG. 16A | USE FIG. 33 | USE FIG. 16B |
| FIG. 17A | USE FIG. 17B OR 17C | USE FIG. 34 |
| FIG. 18A | USE FIG. 35 | USE FIG. 18B |

FIG. 27

SEAMLESS SPLICING OF ENCODED MPEG VIDEO AND AUDIO

RELATED APPLICATIONS

This application claims the benefit of U.S. Provisional Application Ser. No. 60/174,360 filed Jan. 4, 2000, incorporated herein by reference.

BACKGROUND OF THE INVENTION

1. Field of the Invention

The present invention relates to processing of compressed audio/visual data, and more particularly to splicing of streams of audio/visual data.

2. Background Art

It has become common practice to compress audio/visual data in order to reduce the capacity and bandwidth requirements for storage and transmission. One of the most popular audio/video compression techniques is MPEG. MPEG is an acronym for the Moving Picture Experts Group, which was set up by the International Standards Organization (ISO) to work on compression. MPEG provides a number of different variations (MPEG-1, MPEG-2, etc.) to suit different bandwidth and quality constraints. MPEG-2, for example, is especially suited to the storage and transmission of broadcast quality television programs.

For the video data, MPEG provides a high degree of compression (up to 200:1) by encoding 8×8 blocks of pixels into a set of discrete cosine transform (DCT) coefficients, quantizing and encoding the coefficients, and using motion compensation techniques to encode most video frames as predictions from or between other frames. In particular, the encoded MPEG video stream is comprised of a series of groups of pictures (GOPs), and each GOP begins with an independently encoded (intra) I frame and may include one or more following P-frames and B-frames. Each I frame can be decoded without information from any preceding and/or following frame. Decoding of a P frame requires information from a preceding frame in the GOP. Decoding of a B frame requires information from a preceding and following frame in the GOP. To minimize decoder buffer requirements, each B frame is transmitted in reverse of its presentation order, so that all the information of the other frames required for decoding the B frame will arrive at the decoder before the B frame.

In addition to the motion compensation techniques for video compression, the MPEG standard provides a generic framework for combining one or more elementary streams of digital video and audio, as well as system data, into single or multiple program transport streams (TS) which are suitable for storage or transmission. The system data includes information about synchronization, random access, management of buffers to prevent overflow and underflow, and time stamps for video frames and audio packetized elementary stream packets. The standard specifies the organization of the elementary streams and the transport streams, and imposes constraints to enable synchronized decoding from the audio and video decoding buffers under various conditions.

The MPEG 2 standard is documented in ISO/IEC International Standard (IS) 13818-1, "Information Technology-Generic Coding of Moving Pictures and Associated Audio Information: Systems," ISO/IEC IS 13818-2, "Information Technology-Generic Coding of Moving Pictures and Associated Information: Video," and ISO/IEC IS 13818-3, "Information Technology-Generic. Coding of Moving Pictures and Associated Audio Information: Audio," incorporated herein by reference. A concise introduction to MPEG is given in "A guide to MPEG Fundamentals and Protocol Analysis (Including DVB and ATSC)," Tektronix Inc., 1997, incorporated herein by reference.

Splicing of audio/visual programs is a common operation performed, for example, whenever one encoded television program is switched to another. Splicing may be done for commercial insertion, studio routing, camera switching, and program editing. The splicing of MPEG encoded audio/visual streams, however, is considerably more difficult than splicing of the uncompressed audio and video. The P and B frames cannot be decoded without a preceding I frame, so that cutting into a stream after an I frame renders the P and B frames meaningless. The P and B frames are considerably smaller than the I frames, so that the frame boundaries are not evenly spaced and must be dynamically synchronized between the two streams at the time of the splice. Moreover, because a video decoder buffer is required to compensate for the uneven spacing of the frame boundaries in the encoded streams, splicing may cause underflow or overflow of the video decoder buffer.

The problems of splicing MPEG encoded audio/visual streams are addressed to some extent in Appendix K, entitled "Splicing Transport Streams," to the MPEG-2 standard ISO/IEC 13818-1 1996. Appendix K recognizes that a splice can be "seamless" when it does not result in a decoding discontinuity, or a splice can be "non-seamless" when it results in a decoding discontinuity. In either case, however, it is possible that the spliced stream will cause buffer overflow.

The Society of Motion Picture and Television Engineers (SMPTE) apparently thought that the ISO MPEG-2 standard was inadequate with respect to splicing. They promulgated their own SMPTE Standard 312M, entitled "Splice Points for MPEG-2 Transport Streams," incorporated herein by reference. The SMPTE standard defines constraints on the encoding of and syntax for MPEG-2 transport streams such that they may be spliced without modifying the packetized elementary stream (PES) packet payload. The SMPTE standard includes some constraints applicable to both seamless and non-seamless splicing, and other constraints that are applicable only to seamless splicing. For example, for seamless and non-seamless splicing, a splice occurs from an Out Point on a first stream to an In Point on a second stream. The Out Point is immediately after an I frame or P frame (in presentation order). The In Point is just before a sequence header and I frame in a "closed" GOP (i.e., no prediction is allowed back before the In Point).

As further discussed in Norm Hurst and Katie Cornog, "MPEG Splicing: A New Standard for Television—SMPTE 312M," SMPTE Journal, November 1998, there are two buffering constraints for seamless splicing. The startup delay at the In Point must be a particular value, and the ending delay at the Out Point must be one frame less than that. Also, the old stream must be constructed so that the video decoder buffer (VBV buffer) would not overflow if the bit rate were suddenly increased to a maximum splice rate for a period of a splice decoding delay before each Out Point.

SUMMARY OF THE INVENTION

In accordance with a first aspect, the invention provides a method of seamless splicing of a first transport stream to a second transport stream to produce a spliced transport stream. The first transport stream includes video access units encoding video presentation units representing video frames, and audio access units encoding audio presentation units representing segments of a first audio signal. The second transport stream includes video access units encoding video presentation units representing video frames, and audio access units encoding audio presentation units representing segments of a second audio signal. The first transport stream has a last video frame to be included in the spliced transport stream, and the second transport stream has a first video frame to be included in the spliced transport stream. The method includes finding, in the first transport stream, an audio access unit that is best aligned with the last video frame from the first transport stream to be included in the spliced transport stream, and removing audio access units from the first transport stream that are subsequent to the audio access unit that is best aligned with the last video frame from the first transport stream. The method also includes finding, in the second transport stream, an audio access unit that is best aligned with the first video frame from the second transport stream to be included in the spliced transport stream, and removing audio access units from the second transport stream that are prior to the audio access unit that is best aligned with the first video frame from the second transport stream. The method further includes concatenating a portion of the first transport stream up to and including the last video frame to a portion of the second transport stream including and subsequent to the first video frame.

In accordance with another aspect, the invention provides a method of seamless splicing of a first transport stream to a second transport stream to produce a spliced transport stream. The first transport stream includes video access units encoding video presentation units representing video frames, and audio access units encoding audio presentation units representing segments of a first audio signal. The second transport stream includes video access units encoding video presentation units representing video frames, and audio access units encoding audio presentation units representing segments of a second audio signal. The first transport stream has a last video frame to be included in the spliced transport stream, and the second transport stream has a first video frame to be included in the spliced transport stream. The method includes computing differences between presentation times and corresponding extrapolated program clock reference times for the audio access units of the second transport stream in order to estimate the mean audio buffer level that would result when decoding the second transport stream. The method further includes concatenating a portion of the first transport stream up to and including the last video frame to a portion of the second transport stream including and subsequent to the first video frame, wherein presentation times for audio access units from the second transport stream are skewed in the spliced transport stream with respect to presentation times for video access units from the second transport stream in order to adjust the estimated mean audio buffer level toward a half-full audio buffer level when decoding the spliced transport stream.

In accordance with yet another aspect, the invention provides a method of seamless splicing of a first transport stream to a second transport stream to produce a spliced transport stream. The first transport stream includes video access units encoding video presentation units representing video frames. The video access units of the first transport stream encode the video presentation units using a data compression technique, and contain a variable amount of compressed video data. The second transport stream includes video access units encoding video presentation units representing video frames. The video access units of the second transport stream encode video presentation units using a data compression technique, and contain a variable amount of compressed video data. The first transport stream has a last video frame to be included in the spliced transport stream, and the second transport stream has a first video frame to be included in the spliced transport stream. Each of the video access units has a time at which the video access unit is to be received in a video decoder buffer and a time at which the video access unit is to be removed from the video decoder buffer. The method includes setting the time at which the video access unit for the first video frame of the second transport stream is to be removed from the video decoder buffer to a time following in a decoding sequence next after the time at which the last video access unit for the last frame of the first transport stream is to be removed from the video decoder buffer. The method also includes adjusting content of the first transport stream so that the beginning of the video access unit for the first video frame of the second transport stream will be received in the video decoder buffer immediately after the end of the video access unit for the last video frame of the first transport stream is received in the video decoder buffer. The method further includes concatenating a portion of the first transport stream up to and including the last video frame to a portion of the second transport stream including and subsequent to the first video frame.

In yet another aspect, the invention provides a method of seamless splicing of a first transport stream to a second transport stream to produce a spliced transport stream. The first transport stream includes video access units encoding video presentation units representing video frames, and audio packets including data of audio access units encoding audio presentation units representing segments of a first audio signal. The second transport stream includes video access units encoding video presentation units representing video frames, and audio packets including data of audio access units encoding audio presentation units representing segments of a second audio signal. The first transport stream has a last video frame to be included in the spliced transport stream, and the second transport stream has a first video frame to be included in the spliced transport stream. The method includes finding a plurality of (j) non-obsolete audio packets in the first transport stream following the video access unit of the last video frame in the first transport stream and to be included in the spliced transport stream, and finding a total of (k) null packets and obsolete audio packets in the second transport stream follow the video access unit of the first video frame of the second transport stream, where j>k. The method also includes replacing the null packets and obsolete audio packets with (k) of the non-obsolete audio packets. The method further includes concatenating a portion of the first transport stream up to and including the last video frame to a portion of the second transport stream including and subsequent to the first video frame to form the spliced transport stream, wherein the remaining j–k) audio packets are inserted in the spliced transport stream before the video access unit of the first video frame from the second transport stream.

BRIEF DESCRIPTION OF THE DRAWINGS

Other objects and advantages of the invention will become apparent upon reading the following detailed description with reference to the accompanying drawings, in which:

FIG. 7 is a diagram showing audio and video content in two MPEG transport streams to be spliced;

FIG. 8 is a diagram showing aligned elementary video and audio streams resulting from the splicing of the two MPEG transport streams in FIG. 7;

FIG. 9 is a diagram showing that audio access units are not aligned on audio PES packet boundaries;

FIG. 10 is a logic table showing eight cases for the selection of audio presentation units to be included in the splicing of two MPEG transport streams;

FIG. 12A is a diagram showing content of video and audio presentation unit streams for the two MPEG transport streams for a second case in the logic table of FIG. 10;

FIG. 12B is a diagram showing the content of video and audio presentation unit streams resulting from splicing of the two MPEG transport streams shown in FIG. 12A;

FIG. 13A is a diagram showing content of video and audio presentation unit streams for the two MPEG transport streams for a third case in the logic table of FIG. 10;

FIG. 13B is a diagram showing the content of video and audio presentation unit streams resulting from splicing of the two MPEG transport streams shown in FIG. 13A;

FIG. 14A is a diagram showing content of video and audio presentation unit streams for the two MPEG transport streams for a fourth case in the logic table of FIG. 10;

FIG. 14B is a diagram showing the content of video and audio presentation unit streams resulting from splicing of the two MPEG transport streams shown in FIG. 14A;

FIG. 15A is a diagram showing content of video and audio presentation unit streams for the two MPEG transport streams for a fifth case in the logic table of FIG. 10;

FIG. 15B is a diagram showing the content of video and audio presentation unit streams resulting from splicing of the two MPEG transport streams shown in FIG. 15A;

FIG. 16A is a diagram showing content of video and audio presentation unit streams for the two MPEG transport streams for a sixth case in the logic table of FIG. 10;

FIG. 16B is a diagram showing the content of video and audio presentation unit streams resulting from splicing of the two MPEG transport streams shown in FIG. 16A;

FIG. 17A is a diagram showing content of video and audio presentation unit streams for the two MPEG transport streams for a seventh case in the logic table of FIG. 10;

FIG. 17B is a diagram showing the content of video and audio presentation unit streams resulting from a first possible splicing of the two MPEG transport streams shown in FIG. 17A;

FIG. 17C is a diagram showing the content of video and audio presentation unit streams resulting from a second possible splicing of the two MPEG transport streams shown in FIG. 17A;

FIG. 18A is a diagram showing content of video and audio presentation unit streams for the two MPEG transport streams for an eighth case in the logic table of FIG. 10;

FIG. 18B is a diagram showing the content of video and audio presentation unit streams resulting from splicing of the two MPEG transport streams shown in FIG. 18A;

FIG. 27 is a logic table showing how the first and second clips for the cases of FIGS. 11A to 18A should be spliced when the second clip has a high or low mean audio buffer level close to overflowing or underflowing respectively;

Figure 1:
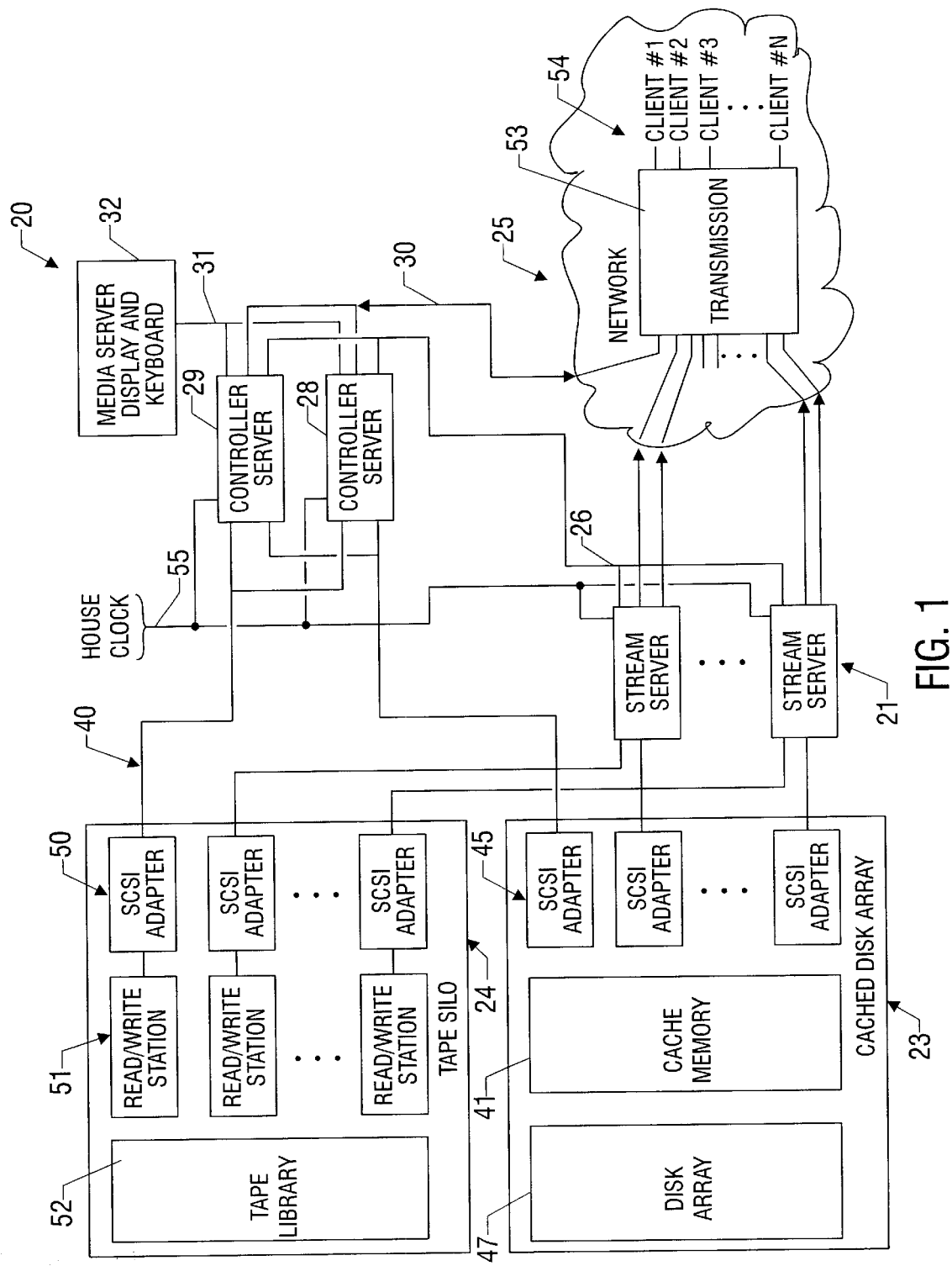
FIG. 1 is a block diagram of a video file server.

While the invention is susceptible to various modifications and alternative forms, specific embodiments thereof have been shown in the drawings and will be described in detail. It should be understood, however, that it is not intended to limit the form of the invention to the particular forms shown, but on the contrary, the intention is to cover all modifications, equivalents, and alternatives falling within the scope of the invention as defined by the appended claims.

DESCRIPTION OF ILLUSTRATIVE EMBODIMENTS

Turning now to FIG. 1 of the drawings, there is shown a video file server generally designated 20 which may use the present invention. The video file server 20 includes an array of stream servers 21, at least one control server 28, 29, a cached disk array storage subsystem 23, and an optional tape silo 24. The video file server 20 is a high performance, high capacity, and high-availability network-attached data server. It provides the ability for multiple file systems to exist concurrently over multiple communication stacks, with shared data access. It also allows multiple physical file systems to co-exist, each optimized to the needs of a particular data service.

The video file server 20 is managed as a dedicated network appliance, integrated with popular network operating systems in a way, which, other than its superior performance, is transparent to the end user. It provides specialized support for real-time data streams used in live, as well as store-and-forward, audio-visual applications. Therefore, the video file server 20 is suitable for a wide variety of applications such as image repositories, video on demand, and networked video applications, in addition to high-end file server applications such as the Network File System (NFS, version 2 and version 3) (and/or other access protocols), network or on-line backup, fast download, etc.

The clustering of the stream servers 21 as a front end to the cached disk array 23 provides parallelism and scalability. The clustering of random-access memory in the stream servers 21 provides a large capacity cache memory for video applications.

Each of the stream servers 21 is a high-end commodity computer, providing the highest performance appropriate for a stream server at the lowest cost. The stream servers 21 are mounted in a standard 19" wide rack. Each of the stream servers 21, for example, includes and Intel processor connected to an EISA or PCI bus and at least 64 MB of random-access memory. The number of the stream servers 21, their processor class (i486, Pentium, etc.) and the amount of random-access memory in each of the stream servers, are selected for desired performance and capacity characteristics, such as the number of concurrent users to be serviced, the number of independent multi-media programs to be accessed concurrently, and the desired latency of access to the multi-media programs.

Each of the stream servers 21 contains one or more high-performance FWD (fast, wide, differential) SCSI connections to the back-end storage array. Each of the stream servers 21 may also contain one or more SCSI connections to the optional tape silo 24. Each of the stream servers 21 also contains one or more outbound network attachments configured on the stream server's EISA or PCI bus. The outbound network attachments, for example, are Ethernet, FDDI, ATM, DS1, DS3, or channelized T3 attachments to data links to a network 25. Each of the stream servers 21 also includes an additional Ethernet connection to a dual redundant internal Ethernet link 26 for coordination of the stream servers with each other and with one or more controller servers 28, 29.

The controller servers 28, 29 are dual redundant computers 28, 29, each of which is similar to each of the stream servers 21. Each of the dual redundant controller servers 28, 29 has a network attachment to a bidirectional link 30 in the network 25, through which each of the controller servers 28, 29 can conduct service protocols. The service protocols include one or more standard management and control protocols such as the Simple Network Management Protocol (SNMP), and at least one Continuous Media File Access Protocol supporting real-time multi-media data transmission from the stream servers 21 to the network 25.

Each of the dual redundant controller servers 28, 29 has an Ethernet connection to the local Ethernet link 26. Each of the controller servers 28, 29 also has a connection to a serial link 31 to a media server display and keyboard 32. The controller servers 28, 29 run a conventional operating system (such as Windows NT or UNIX) to provide a hot-failover redundant configuration. An active one of the dual redundant controller servers 28, 29 functions as a media server controller for the video file server 20. The active one of the controller servers 28, 29 also allows management and control of the server resources from the network using standard protocols, such as the Simple Network Management Protocol (SNMP). The active one of the controller servers 28, 29 may also provide lock management if lock management is not provided by the cached disk array 23.

For multi-media data transfer, the active one of the controller servers 28, 29 assigns one of the stream servers 21 to the network client 54 requesting multi-media service. The network 25, for example, has conventional transmission components 53 such as routers or ATM switches that permit any one of the clients 54 to communicate with any one of the stream servers 21. The active one of the controller servers 28, 29 could assign a stream server to a network client by a protocol sending to the client the network address of the stream server assigned to send or receive data to or from the client. Alternatively, the active one of the controller servers 28, 29 could communicate with a router or switch in the transmission components 53 to establish a data link between the client and the stream server assigned to the client.

The cached disk array 23 is configured for an open systems network environment. The cached disk array 23 includes a large capacity semiconductor cache memory 41 and SCSI adapters 45 providing one or more FWD SCSI links to each of the stream servers 21 and to each of the dual redundant controller servers 28, 29. The disk array 47 may store data using mirroring or other RAID (redundant array of inexpensive disks) techniques to recover from single disk failure. Although simple mirroring requires more storage disks than the more complex RAID techniques, it has been found very useful for increasing read access bandwidth by a factor of two by simultaneously accessing each of two mirrored copies of a video data set. Preferably, the cached disk array 23 is a Symmetrix 5500 (Trademark) cached disk array manufactured by EMC Corporation, 171 South Street, Hopkinton, Mass., 01748-9103.

The tape silo 24 includes an array of SCSI adapters 50 and an array of read/write stations 51. Each of the read/write stations 51 is connected via a respective one of the SCSI adapters 50 and a FWD SCSI link to a respective one of the stream servers 21 or each of the redundant controller servers 28, 29. The read/write stations 51 are controlled robotically in response to commands from the active one of the controller servers 28, 29 for tape transport functions, and preferably also for mounting and unmounting of tape cartridges into the read/write stations from storage bins.

Further details regarding the structure and operation of the video file server 20 are found in Wayne Duso and John Forecast, "System Having Client Sending Edit Commands to Server During Transmission of Continuous Media from One Clip in Play List for Editing the Play List," U.S. Pat. No. 5,892,915, issued Apr. 6, 1999, incorporated herein by reference. For practicing the present invention, the tape library 52 or cached disk array 47 stores video clips in a compressed format. Each clip, for example, is a recorded MPEG transport stream, including a video elementary stream and one or more audio elementary streams synchronized to the video elementary stream. By using the splicing techniques as described below, it is possible for the video file server to make a seamless transition to a second clip from an intermediate location in a first clip during real-time audio/video data transmission from the video file server 20 to one of the clients 54. In this regard, for the purposes of interpreting the appended claims, "seamless splicing" should be understood to mean a process that will produce a spliced transport stream, the play-out of which is substantially free from any audio-visual artifact that the human auditory and visual system can detect.

Figure 2:
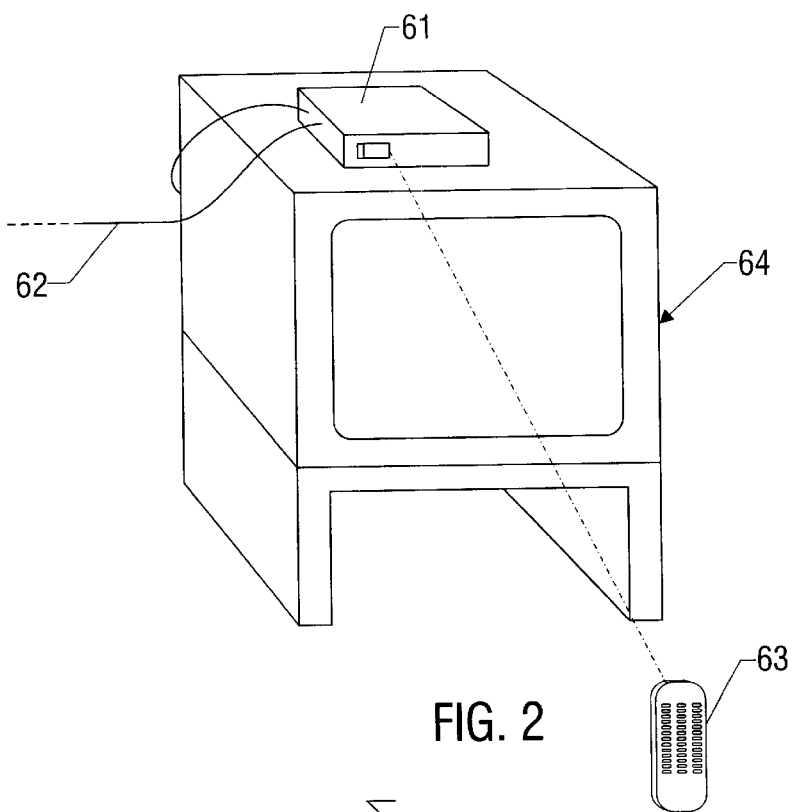
FIG. 2 is a perspective view showing the use of a set-top decoder box.

With reference to FIG. 2, there is shown another application for seamless splicing of MPEG transport streams. In this application, a set-top decoder box 61 receives a number of MPEG transport streams from a coaxial cable 62. Each of the MPEG transport streams encodes audio and video information for a respective television channel. A viewer (not shown) may operate a remote control 63 to select one of the channels for viewing on a television 64. The decoder box 61 selects the MPEG transport stream for the desired channel and decodes the transport stream to provide a conventional audio/visual signal (such as an NTSC composite analog audio/video signal) to the television set.

In the set-top application as shown in FIG. 2, a problem arises when the viewer rapidly scans through the channels available from the decoder 61. If a simple demultiplexer is used to switch from one MPEG transport stream to another from the cable 62, a considerable time will be required for the decoder to adapt to the context of the new stream. During this adaptation process, undesirable audio and video discontinuities may result. One attempt to solve this discontinuity problem is to reset the decoder, squelch the audio, and freeze the video for a certain amount of time after switching from one MPEG transport stream to another. However, this approach will slow down the maximum rate at which the viewer can scan through the channels while looking for an interesting program to watch.

A preferred solution is to incorporate an MPEG transport stream splicer into the set-top decoder box. The MPEG splicer would be programmed to perform a seamless splicing procedure as will be described further below with reference to FIG. 7 et seq. The MPEG splicer would seamlessly splice from an MPEG transport stream currently viewed to a selected new MPEG transport stream to produce an encoded MPEG transport stream that would be decoded in the conventional fashion without significant audio/visual discontinuities and without a significant delay. The MPEG splicer in the set-top decoder box would be similar to the MPEG splicer shown in FIG. 3.

Figure 3:
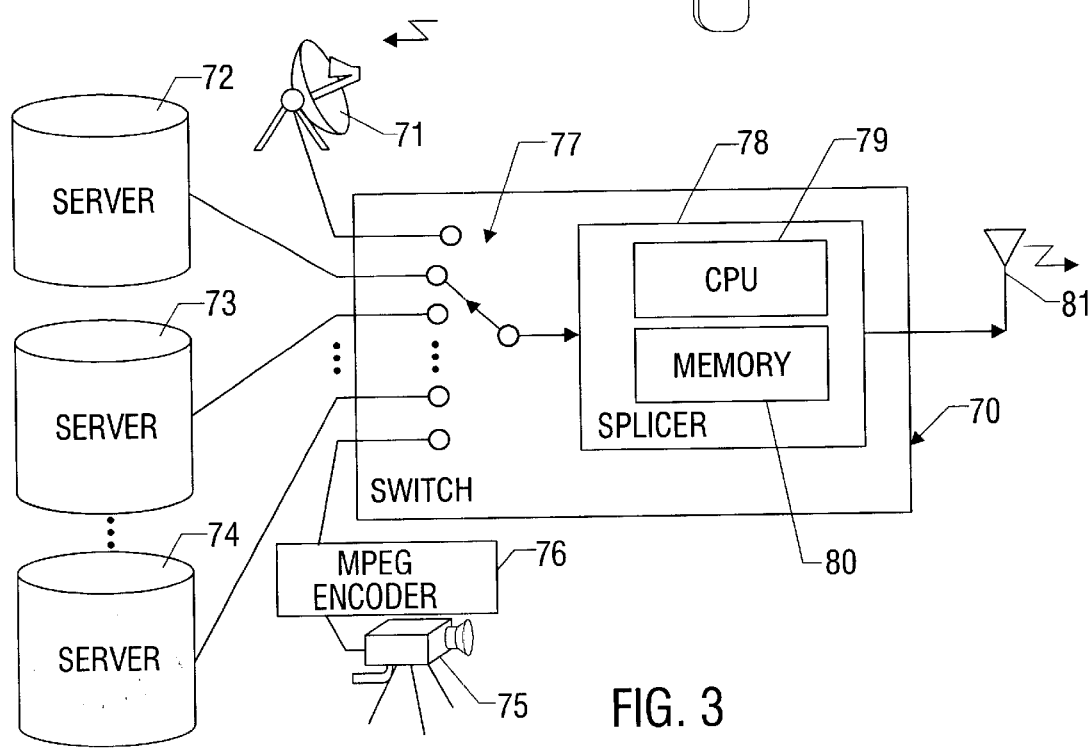
FIG. 3 is a block diagram showing a switch for splicing broadcast audio/visual streams.

FIG. 3 shows a switch 70 for seamless switching between MPEG transport streams in a broadcast environment. The switch 70 receives MPEG transport streams from a variety of sources, such as a satellite dish receiver 71, servers 72, 73, 74, and a studio video camera 75 and an MPEG encoder 76. A conventional method of seamless switching between MPEG transport streams in a broadcast environment is to decode each transport stream into a respective series of video frames and one or more corresponding audio signals, switch between the video frames and corresponding audio signals for one transport stream and the video frames and corresponding audio signals for another transport stream, and re-encode the video frames and audio signals to produce the spliced MPEG transport stream. However, the computational and storage resources needed for decoding the MPEG transport streams and encoding the spliced video frames and audio signals can be avoided using the seamless splicing procedure described below.

In the switch 70, a de-multiplexer 77 switches from a current MPEG transport stream to a new MPEG transport stream. The MPEG transport stream selected by the multiplexer 77 is received by an MPEG splicer 78, which performs seamless splicing as described below. The MPEG splicer 78 includes a central processor unit (CPU) and random access memory 80. The random access memory provides buffering of the MPEG transport stream selected by the multiplexer 77 so that at the time of splicing, the splicer 78 will have in the memory 80 a portion of the current MPEG transport stream near the splice point, and a beginning portion of the new MPEG transport stream. The splicer 78 outputs a spliced MPEG transport stream that can be transmitted to customers, for example, from a broadcast antenna 81.

Figure 4:
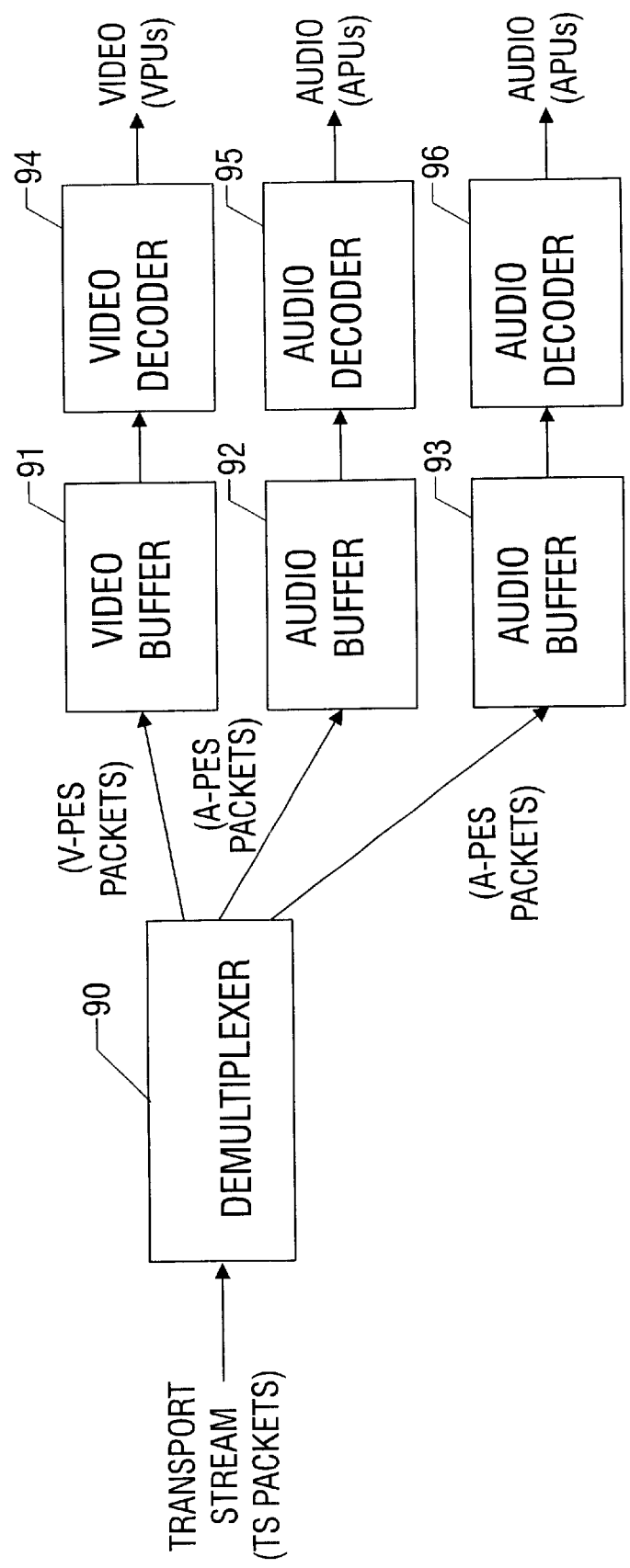
FIG. 4 is a block diagram of an MPEG decoder.

With reference to FIG. 4, there is shown a block diagram of an MPEG decoder. The decoder includes a demultiplexer 90, which receives a transport stream (TS) of packets. The demultiplexer extracts a stream of video packetized elementary stream (V-PES) packets, and two streams of audio packetized elementary stream (A-PES) packets. A video buffer 91 receives the stream of V-PES packets, a first audio buffer 92 receives the first stream of A-PES packets, and a second audio buffer 93 receives the second stream of A-PES packets. A video decoder 94 receives the V-PES packets from the video buffer 91 and produces video presentation units (VPUs). Each VPU, for example, includes digital data specifying the color and intensity of each pixel in a video frame. A first audio decoder 95 receives A-PES packets from the first audio buffer 92 and produces audio presentation units (APUs) for a first audio channel. An audio presentation unit, for example, includes digital data specifying a series of audio samples over an interval of time. A second audio decoder 96 receives A-PES packets from the second audio buffer 93 and produces APUs for a second audio channel. The first and second channels, for example, are right and left stereo audio channels.

For seamless splicing of MPEG transport streams, it is not necessary to decode the video and audio elementary streams down to the presentation unit level, nor is it necessary to simulate the video and audio buffers. Instead, the transport stream need only be parsed down to the level of the packetized elementary streams and access units, and the video and audio buffers need be considered only to the extent of avoiding buffer overflow or underflow. As will be described below, buffer overflow or underflow can be avoided by estimating buffer level based on program clock reference (PCR) and decode time stamp (DTS) values. Seamless splicing can be done independently of the method of audio encoding, although the estimation of buffer level can be made more precise by taking into consideration certain encoded data statistics, which happen to be dependent on the type of audio encoding. It is desired to provide a generic splicing method in which no constraining assumptions are made about various encoding parameters such as frame rate, audio bit rate, and audio sampling frequency. It is also desired to achieve splicing directly on the transport streams with as little complexity as possible.

Figure 5:
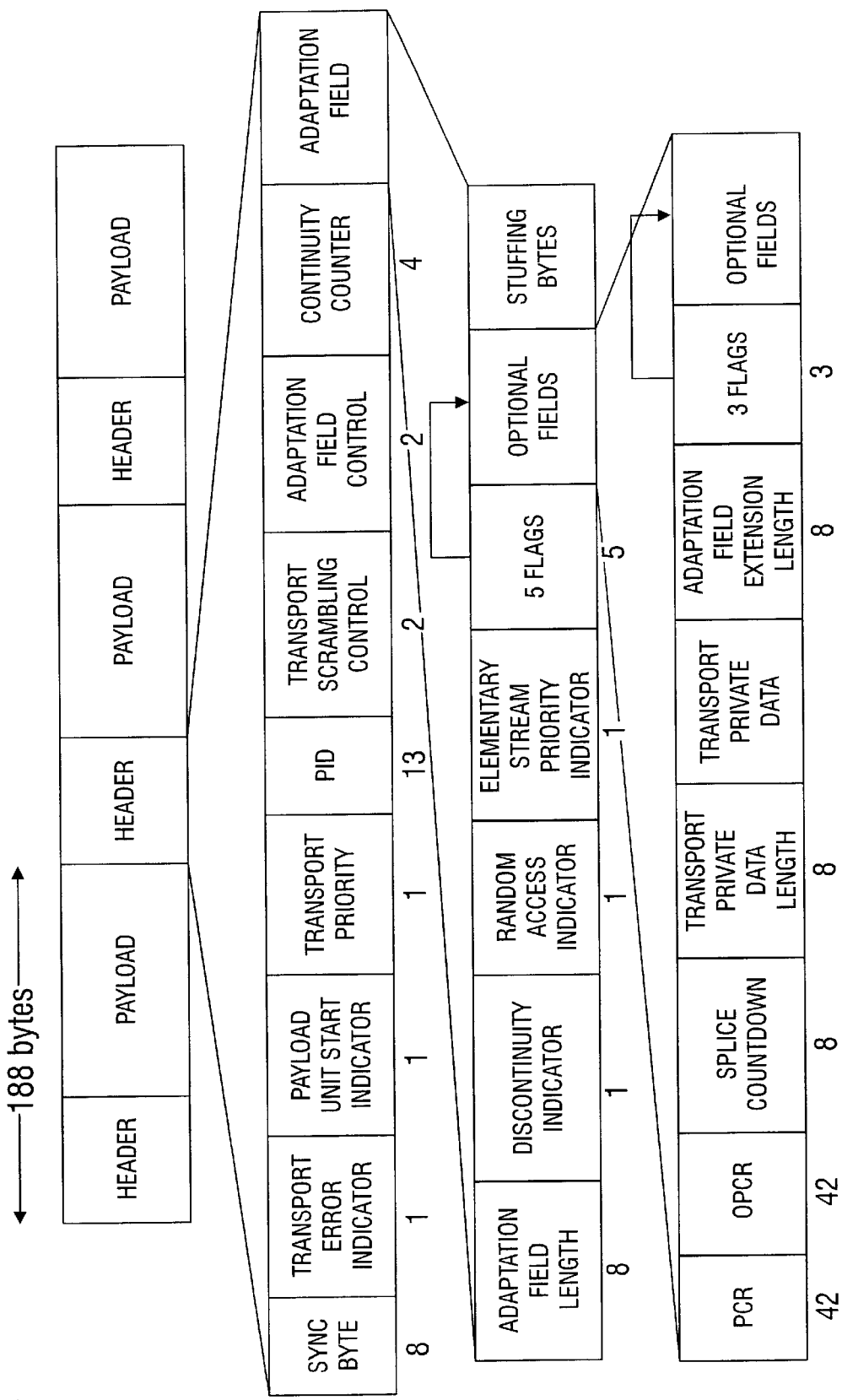
FIG. 5 is a diagram of the format of an MPEG transport packet stream.

FIG. 5 is a diagram showing the syntax of the MPEG-2 Transport Stream. This diagram is a relevant portion of Figure F.1 of Annex F of the MPEG-2 standards document ISO/IEC 13818-1. The MPEG-2 Transport Stream is comprised of a series of 188 byte TS packets, each of which may include video, audio, or control information. Seamless splicing, as described below, may involve modification of the payload unit start indicator, the packet identifier (PID), the continuity counter field, the adaptation field length in the adaptation field, and the program counter (PCR) time stamp again provided in the adaptation field. If the data of a video PES packet or audio PES packet starts in the payload of a TS packet, then the payload unit start indicator bit is set to a one. Otherwise, if the TS packet contains the continuation of an already initiated audio or video PES packet, then the payload unit start indicator bit is set to zero. Very typically the payload unit start indicator will be changed by setting it to one at the first TS packet of the audio for the second stream in the spliced Transport Stream. The original continuity counter values of the second stream are modified so that the continuity counter values in the spliced TS have consecutive values. The adaptation field length in the adaptation fields of the last audio TS packet in the first stream and also the first audio TS packet in the second stream within the spliced TS will typically need to be modified during splicing in order to insert some stuffing bytes to generate full 188 byte sized valid transport packets. The original PCR values from the second stream are uniformly incremented in the spliced TS.

Figure 6:
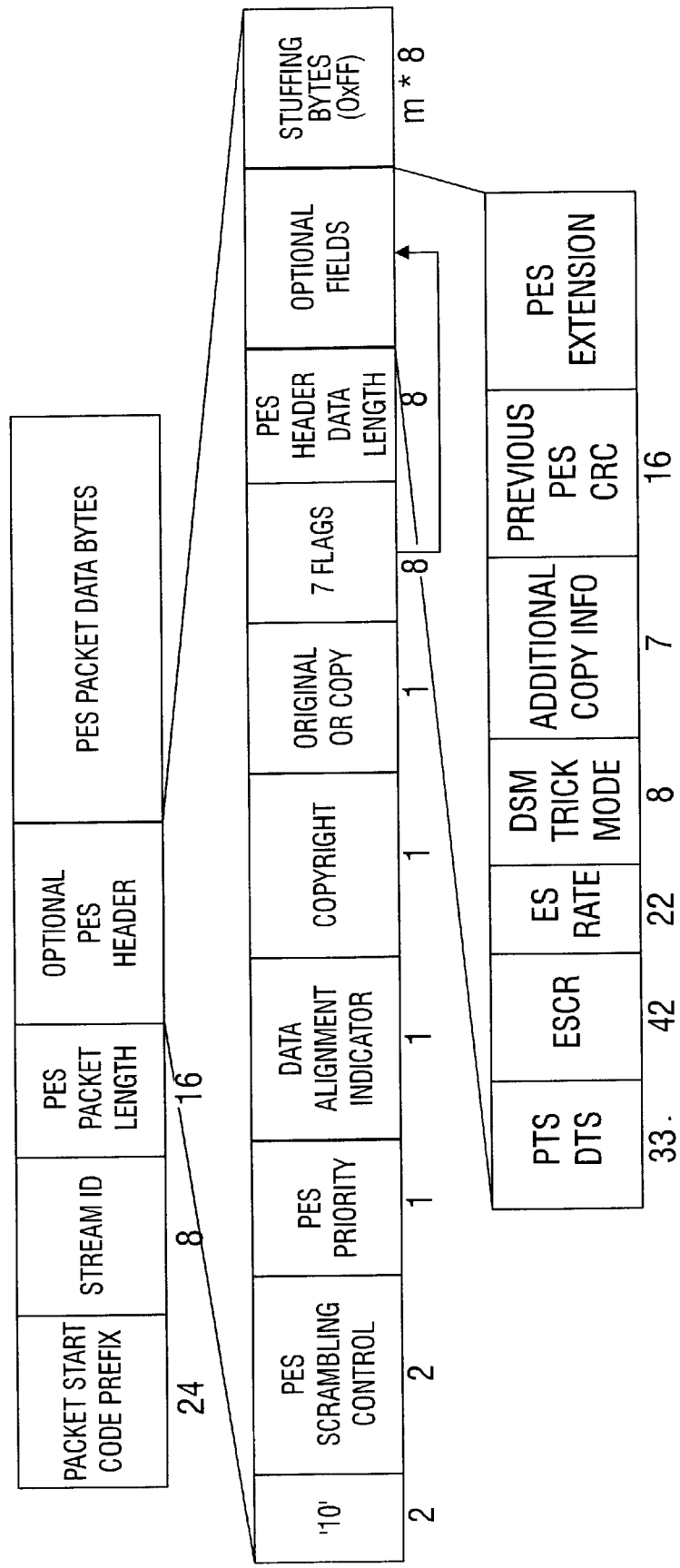
FIG. 6 is a diagram of the format of an MPEG PES packet.

FIG. 6 is a diagram showing the syntax of an MPEG-2 PES packet. This diagram is a relevant portion of Figure F.2 of Annex F of the MPEG-2 standards document ISO/IEC 13818-1. The MPEG-2 PES packet may include video, audio, or control information. Seamless splicing, as described below, may involve modification of the PES packet length, and the data alignment indicator and presentation time stamp (PTS) and decode time stamp (DTS) in the PES header. During splicing, the PES packet length typically has to be modified for the audio, in two places. The first is the last audio PES packet of the first stream, where the information about the size often has to be changed. The size should refer to the bytes preserved in these two audio PES packets after editing for splicing is made. The data alignment indicator may also change in the first audio PES packet of the second stream due to deletion of some obsolete audio access units. The original PTS and DTS values from the second stream are uniformly incremented in the spliced TS.

In general, splicing of MPEG-2 Transport Streams involves selecting an end point in a first MPEG-2 TS stream, selecting a beginning point in a second MPEG-2 TS stream, combining the content of the first TS stream prior in presentation order to the end point with the content of the second TS stream subsequent in presentation order to the beginning point. Unfortunately, the TS streams are formatted so that the presentation order is often different from the order in which the content appears in the TS streams. In particular, transport packets including audio information are delayed with respect to corresponding transport packets of video information. Moreover, as noted above, the B frames appear in the TS streams in reverse of their presentation order with respect to the reference frames that immediately follow the B frames. As shown in FIG. 7, for example, the first Transport Stream 101 and the second Transport Stream 102 are subdivided by a dashed cut line 103 which indicates which of the audio packets (A1) and video packets (V1) in the first stream appear in presentation order before the end point, and which of the audio packets (A2) and video packets (V2) in the second stream 102 appear in presentation order after the beginning point. Due to this problem, the transport streams are parsed prior to splicing to determine the relative presentation time of the video and audio information around the desired beginning and end points. In addition, splicing is more difficult than just removing certain Transport Stream packets from the first and second Transport Streams and concatenating the two streams. In general, the audio data to keep and the audio data to discard will not be segregated into contiguous blocks in the Transport Streams. Typically the splicing operation will involve reformatting of the audio data in the spliced Transport Stream, as discussed below with reference to FIG. 43.

As shown in FIG. 8, the portion of the first Transport Stream prior to the end point has been parsed into a video PES stream 111 and an audio PES stream 112, and the portion of the second Transport Stream after the beginning point has been parsed into a video PES stream 113 and an aligned audio PES stream 114. The two video PES streams 111, 113 have been jointed together at a dashed cut line 115, and the two audio PES streams have been also joined at the dashed cut line 115. The natural cut point for the audio stream, however, is not between video PES boundaries, and instead it is between audio access units (AAU) which are decoded to produce corresponding audio presentation units (APU). Therefore, there may be a slight gap or overlap at the cut line 115 between the AAUs from the first Transport Stream and the AAUs from the second Transport Stream. The gap or the overlap is removed during a reformatting operation in which the spliced Transport Stream is produced from the parsed video PES stream and the parsed audio PES stream. Typically the reformatting operation will slightly shift the alignment of the audio presentation units from the second Transport Stream with respect to their corresponding video presentation units.

As shown in FIG. 9, the AAUs are not necessarily aligned on the audio PES packet boundaries in the elementary stream. There may be fractions of an AAU at the beginning 116 and/or end 117 of the PES packet payload. The parsing and the reformatting operations take into account this non-alignment of the AAUs with the PES packet boundaries. Each AAU, for example, has 576 bytes, and decodes to a 24 millisecond APU, for a sampling frequency of 48 kHz and audio bit rate of 192 kbits/sec. Of course, the splicing techniques disclosed here can be used with a variety of sampling rates and audio encoding techniques.

One problem with the splicing of transport streams is the elimination of any audio discontinuity at the splice point without causing an excessive or cumulative skew in the audio buffer level or in the alignment of the audio with the corresponding video. In general, there will be no alignment of the VPUs and the APUs because the audio and video frame durations are substantially incommensurate. For example, an MPEG-2 TS encoding an NTSC television program with an audio sampling frequency of 48 kHz and audio bit rate of 192 kbits/sec will have a video frame duration (VPU) of $1/29.97$ sec. and an audio frame duration (APU) of 24 msec. In this example, the start of a VPU will be aligned (in presentation time) with the start of an APU possibly at the beginning of a stream and then only at multiples of 5 minute increments in time. This implies that later they will not be aligned again for all practical purposes.

The splicing point between two MPEG-2 Transport Streams is naturally defined with respect to VPUs. The splicing point, for example, occurs at the end of the VPU for an Out Point (I or P frame) in the first TS, and at the beginning of the VPU for an In Point (I frame of a closed GOP) in the second TS. For splicing, the time base of the second TS is shifted to achieve video presentation continuity.

Because the AAUs are usually not aligned with the VPUs, there is an issue with respect to the selection of AAUs to be included in the spliced TS. In general, audio truncation (i.e., positioning of the cut with respect to the stream of AAUs in the first and second TS) should always be done at the AAU boundaries. Fractional AAUs are useless because the audio encoding algorithm is such that only whole AAUs can be decoded. Audio truncation for the ending stream should be done with respect to the end of its last VPU's presentation interval. Audio truncation for the beginning stream should be done relative to the beginning of its first VPU's presentation interval. These general rules, however, are insufficient to precisely specify which AAUs should be selected near the cut for inclusion in the spliced TS.

A more precise set of rules for selection of AAUs near the cut takes into consideration the concept of the "best aligned APU" and also takes into consideration the audio buffer level that would be expected in the beginning (i.e., second) stream absent splicing. The "best aligned final APU" of the ending (i.e., first) stream is defined as the APU whose presentation interval ends within one APU interval centered about the time of the cut. The "best aligned initial APU" of the beginning (i.e., second) stream is defined as the APU whose presentation interval starts within one APU interval centered about the time of the cut. As shown in the logic table of FIG. 10, there are eight possible cases that can be identified in terms of the "best aligned final APU," the "best aligned initial APU," and the presence of an audio gap or an audio overlap with respect to these best aligned APUs after the alignment of the VPUs of first and second streams at the cut point.

In FIG. 10, the APU duration is assumed to be 24 msec only for illustrative purposes without loss of generality. The eight cases are shown in FIGS. 11A, 12A, 13A, 14A, 15A, 16A, 17A, and 18A, and corresponding splicing solutions are shown in FIGS. 11B, 11C, 12B, 13B, 14B, 15B, 16B, 17B, 17C, and 18B. FIGS. 11B and 11C show alternative solutions, and FIGS. 17B and 17C show alternative solutions. In FIGS. 11A to 18B, VPUk designates the VPU of the Out-Point, APUj designates the best aligned. final APU, VPUn designates the VPU of the In-Point, and APUm designates the best aligned initial APU. Presentation time increases from left to right in the figures, and the bold dashed line is the cut line at which the beginning presentation time of VPUn becomes aligned with end presentation time of VPUk.

The decoding logic of FIG. 10 can be implemented in software instructions for computing delta values, where delta 1 is computed as the end of the presentation time of the last VPU of the first stream minus the presentation time of the end of the best aligned final APU of the first stream. The best aligned final APU can be found by computing such a delta for each APU in the first stream around the time of the cut, and selecting the APU having such a delta that is within plus or minus one-half of the APU interval. Delta 2 is computed as the beginning of the presentation time interval of the first VPU of the second stream minus the presentation time of the beginning of the best aligned initial APU of the second stream. The best aligned initial APU can be found by computing such a delta for each APU in the second stream around the time of the cut, and selecting the APU having such a delta that is within plus or minus one-half of the APU interval.

The decoding logic of FIG. 10 is acceptable when the expected mean audio buffer level would be neither high nor low in the second stream absent splicing (i.e., in the original form of the second stream). When such a mean audio buffer level would be high or low for the second stream, additional solutions may be appropriate, as will be described below with reference to FIGS. 27 to 35.

Figure 11A:
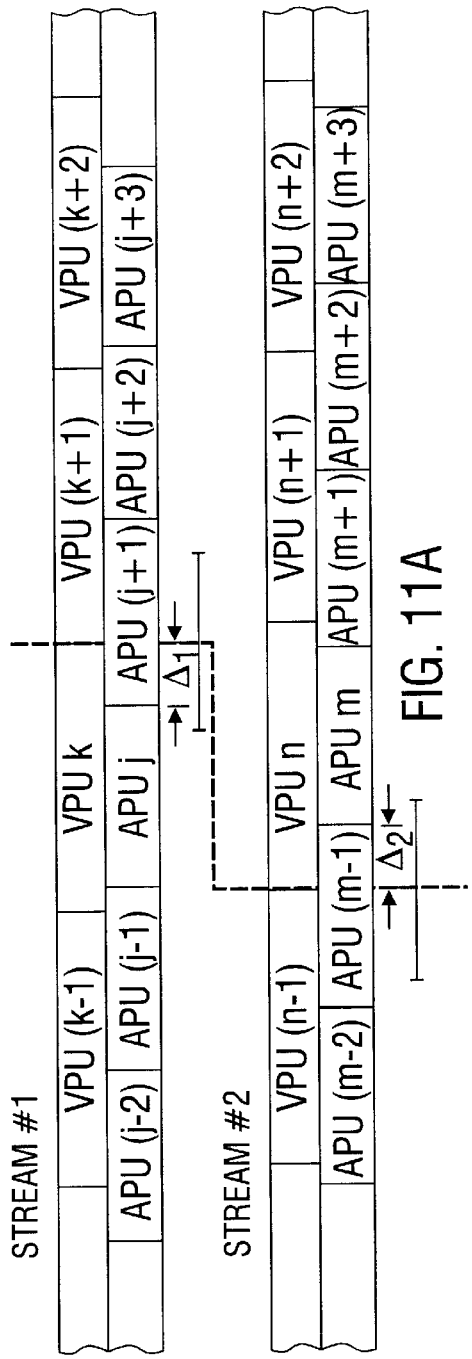
FIG. 11A is a diagram showing content of video and audio presentation unit streams for the two MPEG transport streams for a first case in the logic table of FIG. 10.
Figure 11B:
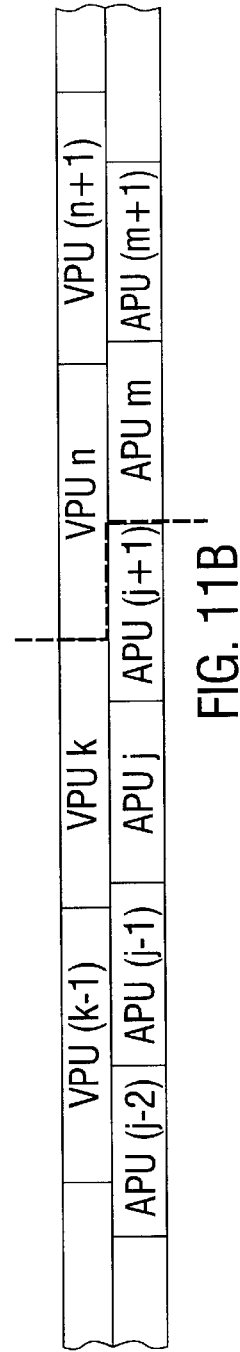
FIG. 11B is a diagram showing the content of video and audio presentation unit streams resulting from a first possible splicing of the two MPEG transport streams shown in FIG. 11A.
Figure 11C:
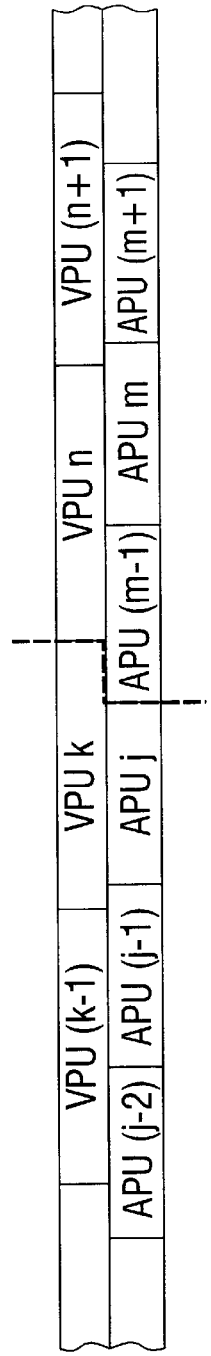
FIG. 11C is a diagram showing the content of video and audio presentation unit streams resulting from a second possible splicing of the two MPEG transport streams shown in FIG. 11A.

Except for the cases in FIGS. 11A and 17A, splicing involves truncating the first audio stream at the end of the best aligned final APU, and starting the second audio stream at the best aligned initial APU. The presentation time stamps of the best aligned initial APU and all following APUs from the second stream are re-stamped so that they follow next in sequence after the best aligned final APU. Since presentation time stamps are not provided for each AAU but rather specified in the header field of audio PES packets for the first AAU commencing in the payload of the PES packet, the above mentioned re-stamping is achieved by modifying only these specified presentation time stamps. Further processing is required at the elementary stream level for modifying the audio PES packet carrying the best aligned final APU, and modifying the audio PES packet carrying the best aligned initial APU. The audio PES packet carrying the best aligned final APU is modified by truncation of AAU data after the AAU associated with the best aligned final APU, and modifying the PES packet size (in the corresponding PES packet header field) accordingly. The audio PES packet carrying the best aligned initial APU is modified by deleting the AAU data preceding the AAU associated with the best aligned initial APU, and modifying the PES packet size (in the corresponding PES packet header field) accordingly. In addition and as mentioned above, the audio PES packet carrying the best aligned initial APU and all subsequent audio PES packets are modified by re-stamping their PTS values to follow in sequence from the PTS value of the audio PES packet carrying the best aligned final APU. The cases in FIGS. 11A and 17A involve similar truncation and modification operations, but in these cases either an additional APU is included in between the best aligned APUs (case of FIG. 11A) or one of the best aligned APUs is omitted (case of FIG. 17A). For the eight cases of audio splicing identified in FIG. 10, it is possible to construct a spliced audio elementary stream with no holes and no audio PTS discontinuity. As a consequence, an audio/video skew in presentation time of magnitude at most half of an APU duration will be introduced following the cut point in the spliced stream. This audio splicing technique can be repeated any number of times with neither a failure to meet its structural assumptions nor a degradation in this audio/video skew performance. The A/V skews introduced by the multiple splices do not accumulate. Irrespective of the number of consecutive splices, the worst audio/video skew at any point in time will be half of the APU duration. At each splice point, at the termination of the APUs and VPUs of the first stream, the total audio and video presentation durations up to that point will be almost matching each other, i.e., |video_duration−audio_duration|<=(½) APU_duration. Therefore always the proper amount of audio data will be provided by the audio splicing procedure described above. The resulting audio stream is error-free and MPEG-2 compliant.

The audio and video elementary streams must be recombined around and following the splice point. This is conveniently done by reformatting of spliced Transport Stream around and following the splice point. The truncation of the final PES packet of the first audio stream will typically necessitate the insertion of some adaptation field padding into its last transport packet. The deletion of some AAU data from the beginning of the second audio stream's initial PES packet will typically necessitate the editing of at most two audio transport packets.

In any MPEG-2 Transport Stream, the audio bit rate, over the span of a few VAU durations, is substantially constant. The VAUs, however, are of varying sizes. Therefore the relative positions of VAUs and AAUs associated with VPUs and APUs almost aligned in time cannot be maintained constant. Almost always it is the case that the AAUs are significantly delayed with respect to the corresponding VAUs for which the decoded representations are almost synchronous. Therefore, splicing to achieve the solutions for the cases of FIGS. 11A to 18A also involves transport packet buffering and re-multiplexing. The delayed audio packets near the Out Point in the first TS stream are temporarily stored in a buffer when the first TS stream is truncated based on the VAU of the Out Point. Also, the spliced TS is reformatted by deletion of some obsolete audio packets at the beginning of the second stream around the In Point, and repositioning of some audio packets of the first stream just following the Out Point into the spliced TS.

Figure 19:
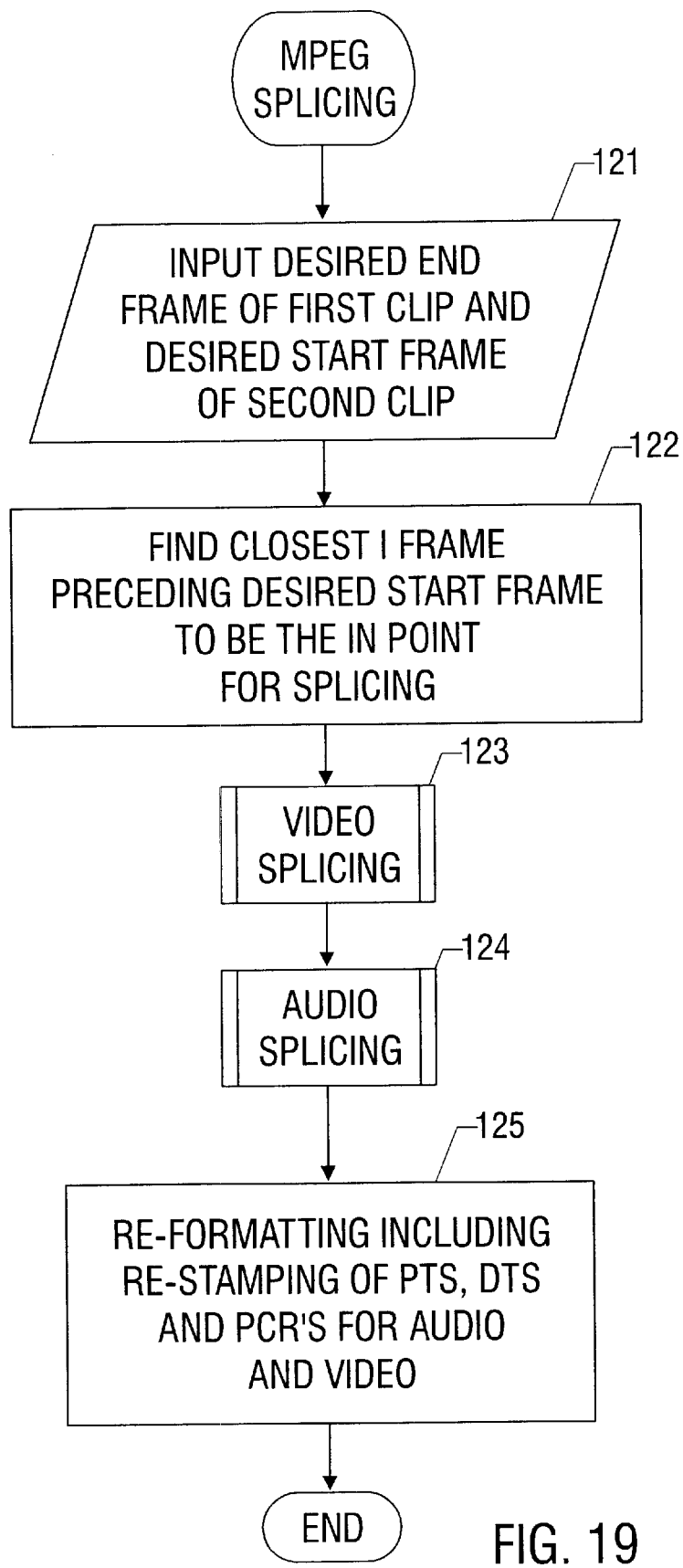
FIG. 19 is a flow chart of a procedure for splicing MPEG clips.

With reference to FIG. 19, there is shown a top-level flow chart of the preferred procedure for splicing MPEG Transport Streams. At least the portions of a first and second MPEG TS stream around the Out Point and In Point, respectively, are assumed to be stored in a buffer. The stored MPEG TS data for the first stream will be referred to as a first clip, and the stored MPEG TS data for the second stream will be referred to as a second clip.

In a first step 121, the splicing procedure receives an indication of a desired end frame of the first clip and a desired start frame of the second clip. Next, in step 122, the splicing procedure finds the closest I frame preceding the desired start frame to be the In Point for splicing. In step 123, a video splicing subroutine is invoked, as further described below with reference to FIGS. 23 to 24. In step 124, an audio splicing subroutine is invoked, as further described below with reference to FIGS. 25 to 26. Finally, in step 125, the concatenation of the first clip up to about the Out Point and the second clip subsequent to about the In Point is re-formatted, including re-stamping of the PTS and PCR values for the audio and video.

Considering now video splicing, the splicing procedure should ensure the absence of objectionable video artifacts, preserve the duration of the spliced stream, and if possible, keep all of the desired frames in the spliced stream. The duration of the spliced stream should be preserved in order to prevent any time drift in the scheduled play-list. In some cases, it is not possible to keep all of the original video frames due to buffer problems. In such a case, one or more frames of the clip are replaced by frozen frames, and this frame replacement is made as invisible as possible.

Management of the video buffer is an important consideration in ensuring the absence of objectionable video artifacts. In a constant bit rate (CBR) and uniform picture quality sequence, subsequent pictures typically have coded representations of drastically different sizes. The encoder must manage the decoder's buffer within several constraints. The buffer should be assumed to have a certain size defined in the MPEG-2 standard. The decoder buffer should neither overflow nor underflow. Furthermore, the decoder cannot decode a picture before it receives it in full (i.e. completely). Moreover, the decoder should not be made to "wait" for the next picture to decode; this means that every 40 ms in PAL and $\frac{1}{29.97}$ second in NTSC, the decoder must have access to a full picture ready to be decoded.

Figure 20A:
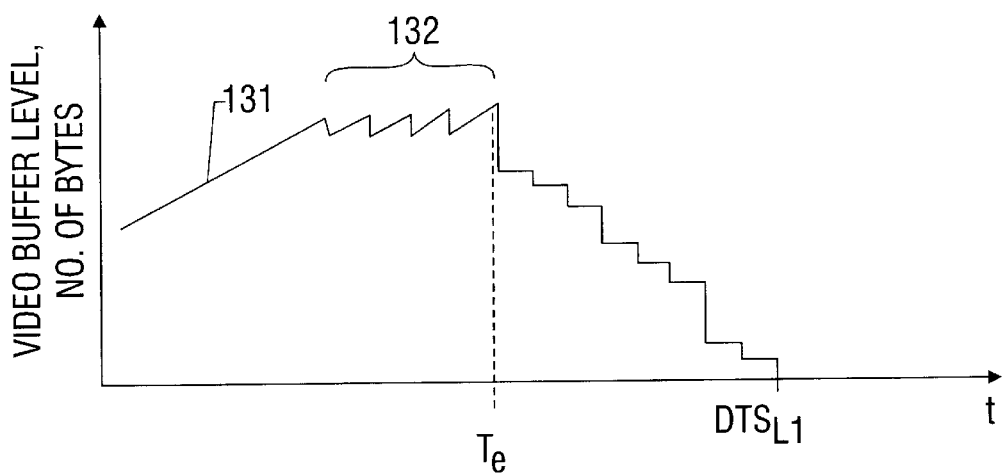
FIG. 20A is a graph of video buffer level versus time for decoding the end of a first MPEG clip.

The MPEG encoder manages the video decoder buffer through decode time stamps (DTS), presentation time stamps (PTS), and program clock reference (PCR) values. With reference to FIG. 20A, for example, there is shown the video buffer level during the playing of a first clip. The x-axis represents the time axis. The video buffer level initially increases in a linear fashion over a segment 131 as the buffer is loaded at a constant bit rate. Then over a time span 132, video data is displayed at frame intervals, and the buffer is replenished at least to some extent between the frame intervals. At a time $T_e$, the last video frame's data is finished being loaded into the video buffer. Then the video buffer is periodically depleted to some extent at each subsequent video frame interval, and becomes emptied at a time $DTS_{L1}$.

Figure 20B:
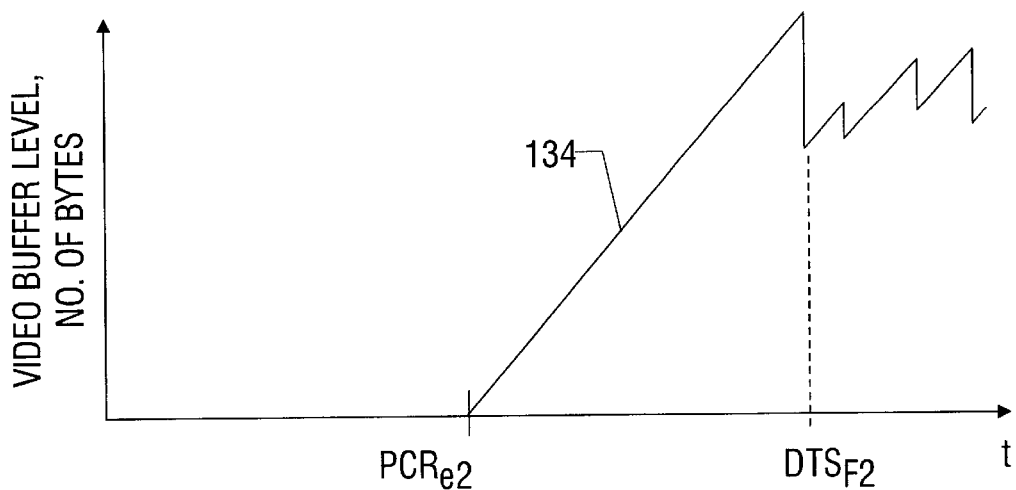
FIG. 20B is a graph of video buffer level versus time for decoding the beginning of a second MPEG clip.

FIG. 20B shows the video buffer level for a second clip. The video buffer begins to receive video data for the second clip at a time $PCR_{e2}$. ($PCR_{e2}$ is extrapolated from the value of the most recent received genuine PCR record, to the first byte of the picture header sync word of the first video frame in the clip to start. The extrapolation adjusts this most recently received genuine PCR record value by the quotient of the displacement in data bits of the clip from the position where it appears in the second clip to the position at which video data of the first frame of the second clip begins, divided by the data transmission bit rate for transmission of the clip to the decoder.) The video buffer level initially increases in a linear fashion over a segment 134 as the buffer is loaded at a constant bit rate. However, the slope of the segment 134 in FIG. 20B may be substantially different from the slope of the segment 131 in FIG. 20A. In each case, the slope of the segment is proportional to the bit rate at which the data is loaded into the video buffer. As shown, the video data of the second clip is received at the video buffer at a higher bit rate than the video data of the first clip. At a time $DTS_{F2}$, the first frame of the second clip is decoded as more video data from the second clip continues to flow into the video buffer.

When splicing the end of the first clip of FIG. 20A to the beginning of the second clip of FIG. 20B, there will be a problem of video buffer management if duration of time $DTS_{L1}-T_e$ is different from the duration of time $DTS_{F2}-PCR_{e2}$ minus one video frame (presentation) interval. Because the time $PCR_{e2}$ must just follow $T_e$, there will be a gap in the decoding and presentation of video frames if $DTS_{F2}-PCR_{e2}$ is substantially greater than $DTS_{L1}-T_e$ plus one video frame interval. In this case, the buffer will not be sufficiently full to begin decoding of the second clip one video frame interval after the last frame of the first clip has been decoded. Consequently, either the second clip will be prematurely started to be decoded or the decoder will be forced to repeat a frame one or more times after the end of the display of the last frame from the first clip to provide the required delay for the second clip's buffer build-up. In the case of a premature start for decoding the second clip, a video buffer underflow risk is generated. On the other hand, in case of repeated frames, the desired frame accuracy for scheduled play-lists is lost besides the fact that a precise timing adjustment can neither be achieved through this procedure.

If $DTS_{F2}-PCR_{e2}$ is substantially less than $DTS_{L1}-T_e$ plus one video frame interval, then the decoder will not be able to decode the first frame of the second clip at the specified time $DTS_{F2}$ because the last frame of the first clip will not yet have been removed from the video buffer. In this case a video buffer overflow risk is generated. Video buffer overflow may present a problem not only at the beginning of the second clip, but also at a subsequent location of the second clip. If the second clip is encoded by an MPEG-2 compliant encoder, then video buffer underflow or buffer overflow will not occur at any time during the decoding of the clip. However, this guarantee is no longer valid if the $DTS_{F2}-PCR_{e2}$ relationship at the beginning of the second clip is altered. Consequently, to avoid buffer problems, the buffer occupancy at the end of the first clip must be modified in some fashion. This problem is inevitable when splicing between clips having significantly different ending and starting buffer levels. This is why SMPTE has defined some splice types corresponding to well-defined buffer levels.

Figure 21:
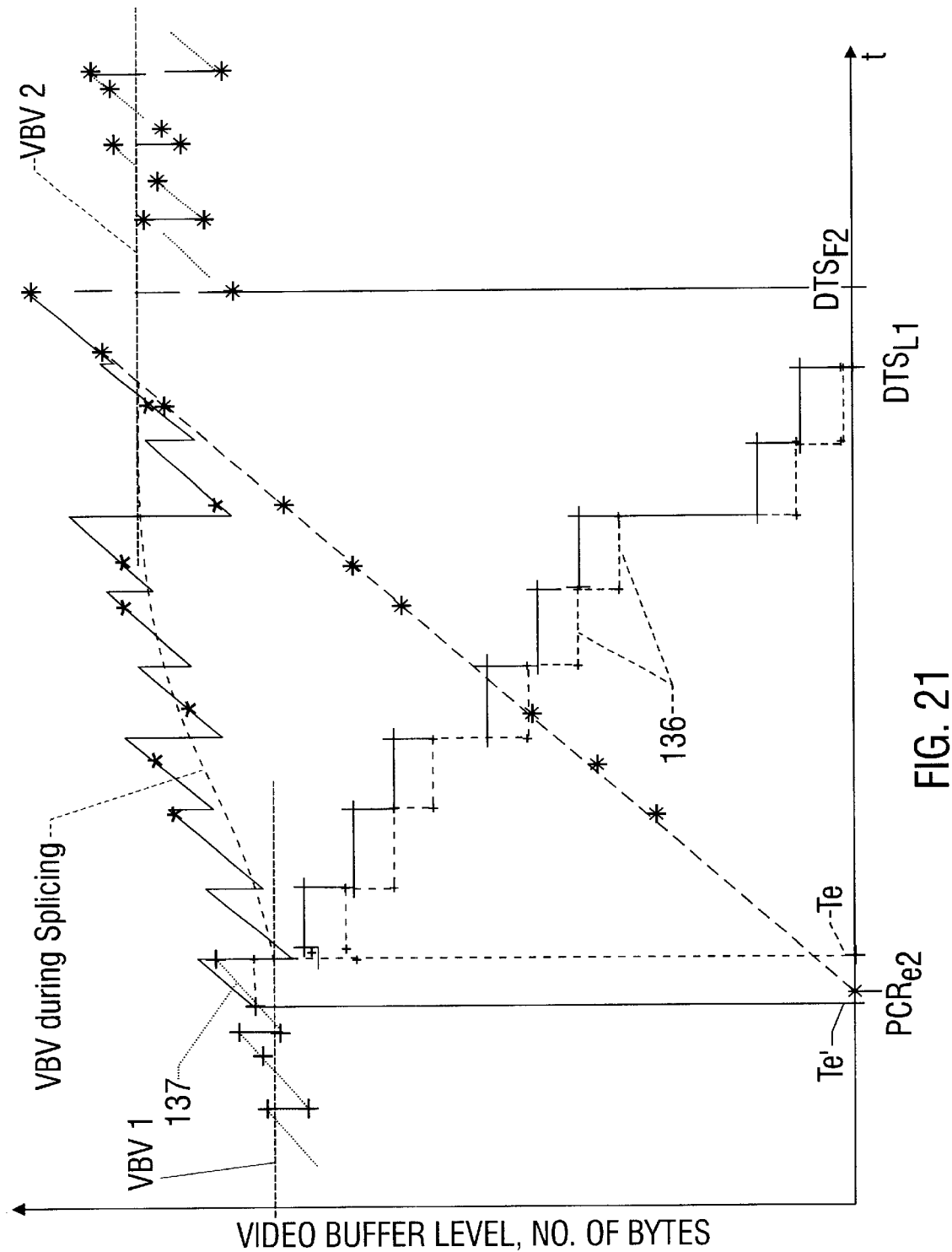
FIG. 21 is a graph of video buffer level versus time for decoding of a seamless splicing of the first MPEG clip to the second MPEG clip.

In order to seamlessly splice the first clip of FIG. 20A to the second clip of FIG. 20B, the content of the first clip (towards its end) is modified so that $PCR_2$ can just follow $T_e$ (by one byte transmission time) and $DTS_{F2}$ can just follow $DTS_{L1}$ (by one video frame presentation interval). FIG. 21 shows the video buffer level for the spicing of the first clip to the second clip in this fashion. The content around the end of the first clip has been modified to provide a buffer emptying characteristic shown in dashed lines, such as the line segments 136, so that the buffer is emptied sooner of video data from the first clip. In particular, this is done by replacing a frame loaded into the video buffer over an interval 137 with a "freeze frame" having a selected amount of video data. The position of $DTS_{L1}$ has not changed, the position of $DTS_{F2}$ is one video frame interval after $DTS_{L1}$, and the relationship $DTS_{F2}-PCR_{e2}$ is unchanged, but the position of $T_e$ has been moved to $T_e'$ in order to achieve the desired conditions for seamless video splicing.

Figure 22:
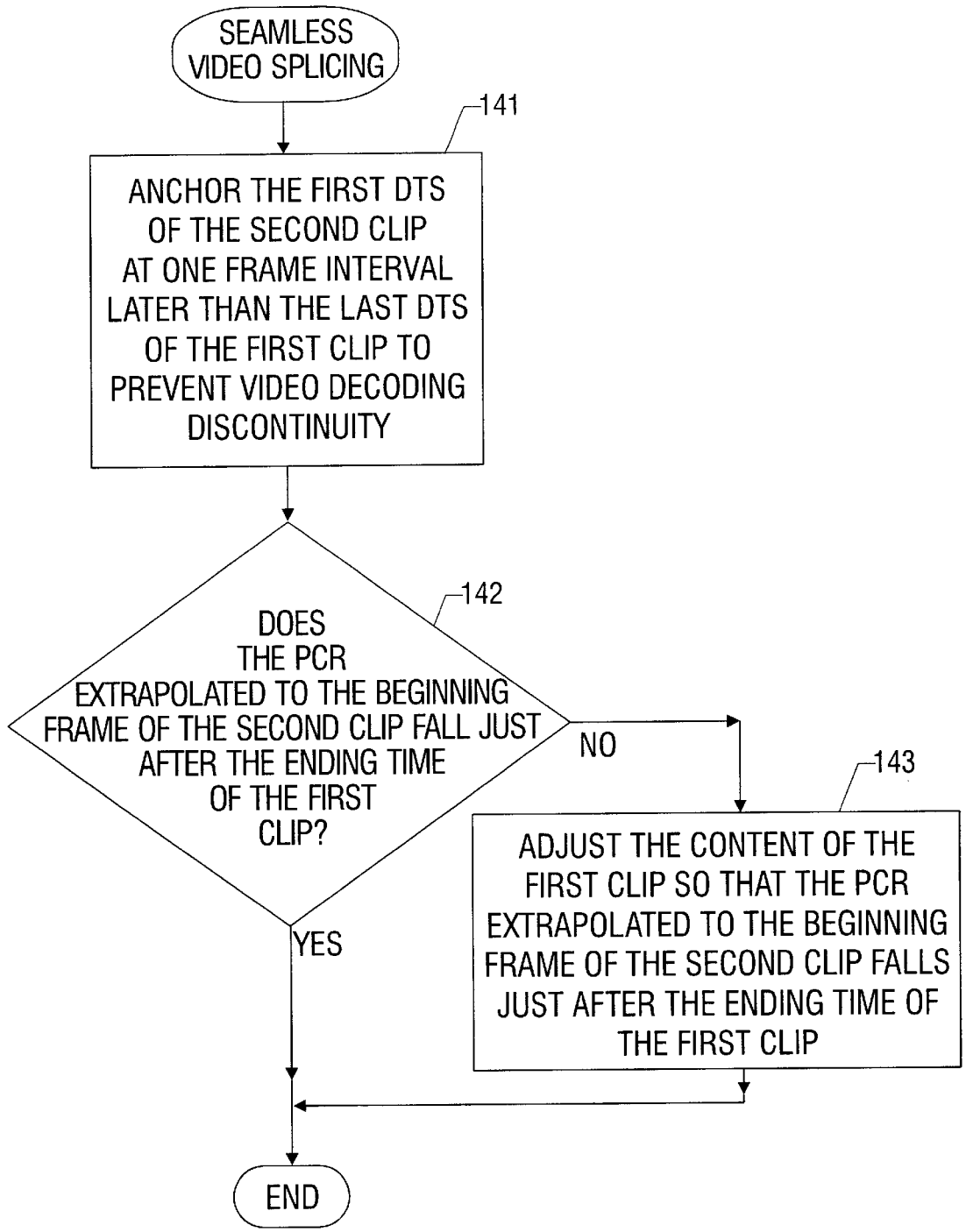
FIG. 22 is a flow chart of a basic procedure for seamless splicing of video streams.

FIG. 22 shows a flow chart of a seamless video splicing procedure that obtains the desired conditions just described above. In a first step 141, the first DTS of the second clip is anchored at one frame interval later than the last DTS of the first clip in order to prevent a video decoding discontinuity. Then, in step 142, the procedure branches depending on whether the PCR extrapolated to the beginning frame of the second clip falls just after the ending time of the first clip. If so, then the splice will be seamless with respect to its video content. Otherwise, the procedure branches to step 143. In step 143, the content of the first clip is adjusted so that the PCR extrapolated to the beginning frame of the second clip falls just after the ending time of the first clip. Therefore the desired conditions for seamless video splicing are achieved.

Figure 23:
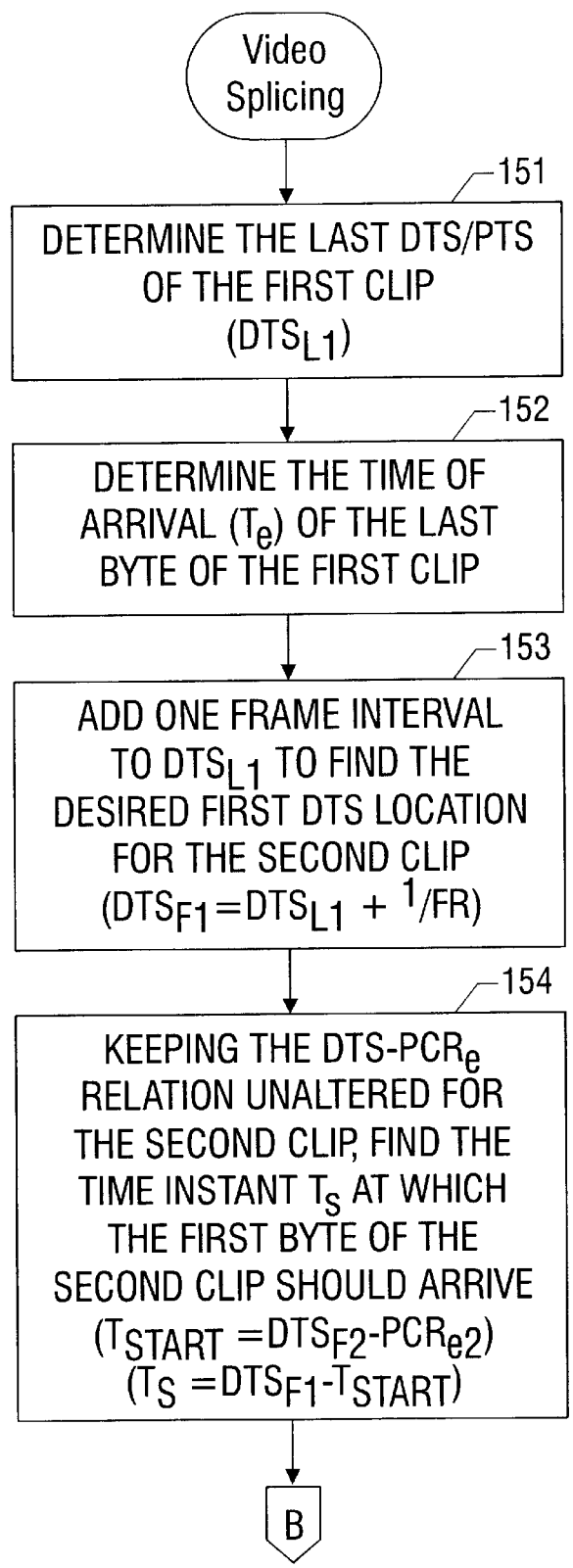
FIG. 23 is a first portion of a flow chart of a procedure for splicing video streams.

With reference to FIG. 23, there is shown a more detailed flow chart of a seamless video splicing procedure. In a first step 151, the procedure inspects the content of the first clip to determine the last DTS/PTS of the first clip. This last DTS/PTS of the first clip is designated $DTS_{L1}$. Next, in step 152, the procedure inspects the content of the first clip to determine the time of arrival ($T_e$) of the last byte of the first clip. In step 153, the procedure adds one frame interval to $DTS_{L1}$ to find the desired first DTS location for the second clip. The sum, designated $DTS_{F1}$, is equal to $DTS_{L1}+1/FR$, where FR is the video frame rate. In step 154, while keeping the $DTS-PCR_e$ relationship unaltered, the procedure finds the time instant, designated $T_S$, at which the first byte of the second clip should arrive. This is done by calculating $T_{START}=DTS_{F2}-PCR_{e2}$, and $T_S=DTS_{F1}-T_{START}$.

Figure 24:
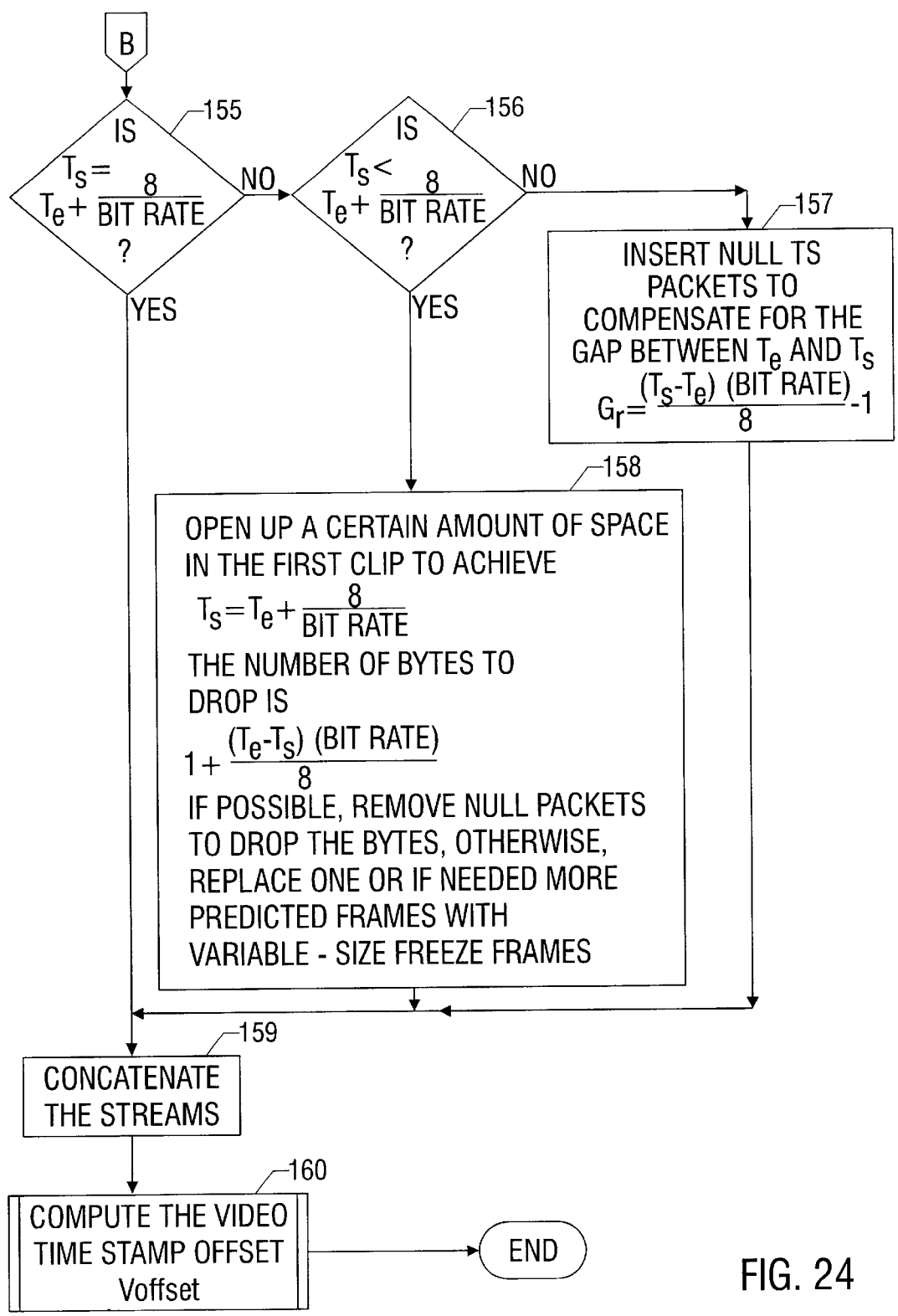
FIG. 24 is a second portion of the flow chart begun in FIG. 23.

Continuing in FIG. 24, in step 155, execution branches depending on whether $T_S$ is equal to $T_e$ plus 8 divided by the bit rate. If not, then the clips to be spliced need modification before concatenation, and execution branches to step 156. In step 156, execution branches depending on whether $T_S$ is less than $T_e$ plus 8 divided by the bit rate. If not, then there is an undesired gap in between the clips to be spliced, and execution branches to step 157. In step 157, null packets are inserted into the clips to be spliced to compensate for the gap. The gap to be compensated has a number of bytes, designated $G_r$, equal to $(T_S-T_e)$(BIT RATE)/8 minus one. If in step 156, $T_S$ is less than $T_e$ plus 8 divided by the bit rate, then execution continues from step 156 to step 158 to open up a certain amount of space in the first clip to achieve $T_S=T_e+8/$(BIT RATE). The number of bytes to drop is one plus $(T_e-T_S)$(BIT RATE)/8. If possible, the bytes are dropped by removing null packets. Otherwise, one or if needed more predicted video frames are replaced with smaller, variable-size freeze frames.

Figure 38:
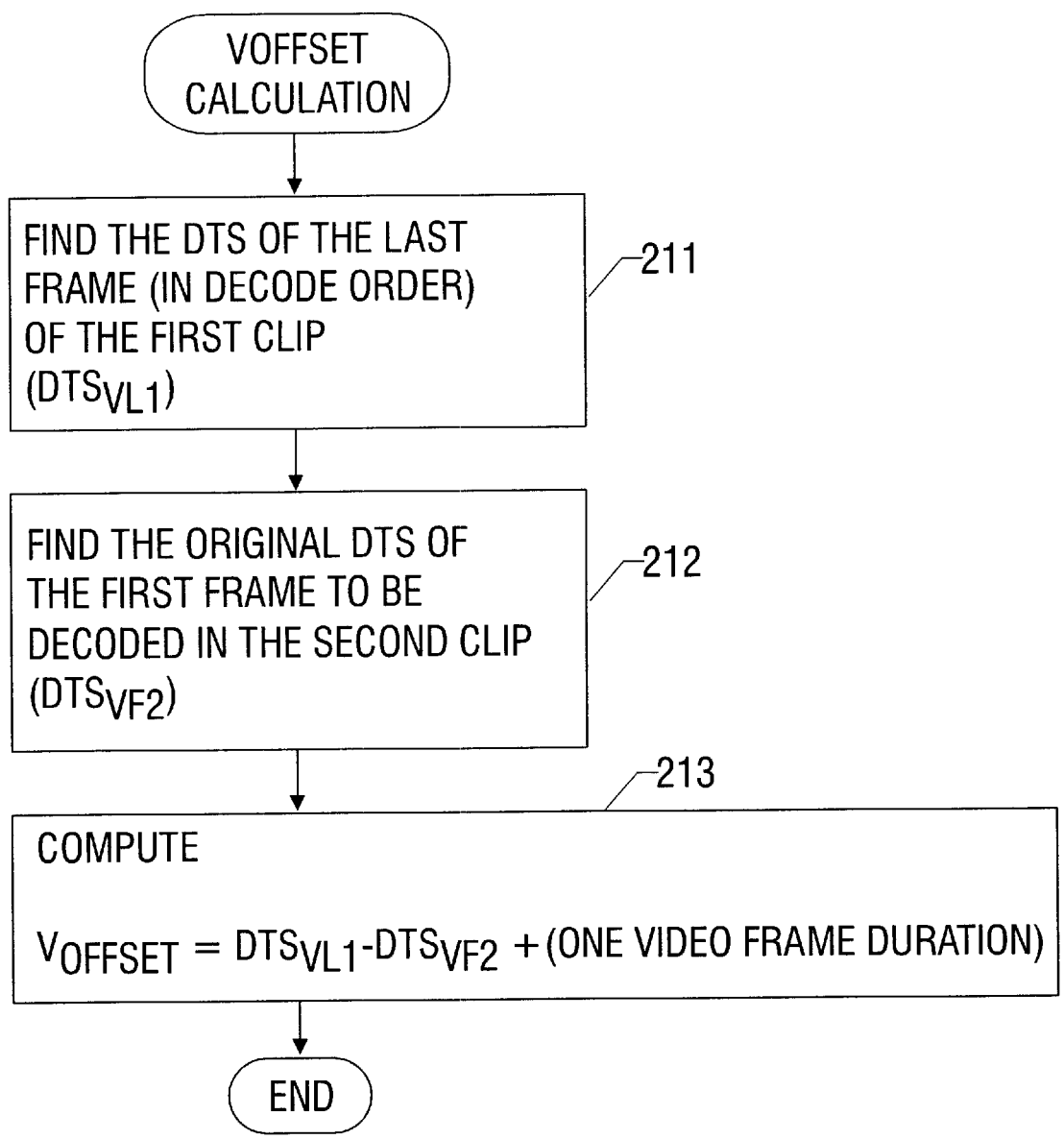
FIG. 38 is a flow chart of a procedure for computing an offset for the video decode time stamps (DTS) of the second clip for splicing the second clip onto the first clip.

If in step 155 $T_S$ is found to be equal to $T_e$ plus 8 divided by the bit rate, then execution continues to step 159. Execution also continues to step 159 from steps 157 and 158. In step 159, the transport streams from the two clips are concatenated. Finally, in step 160, a subroutine, as described below with reference to FIG. 38, is called to compute a video time stamp offset, designated as $V_{offset}$.

Figure 25:
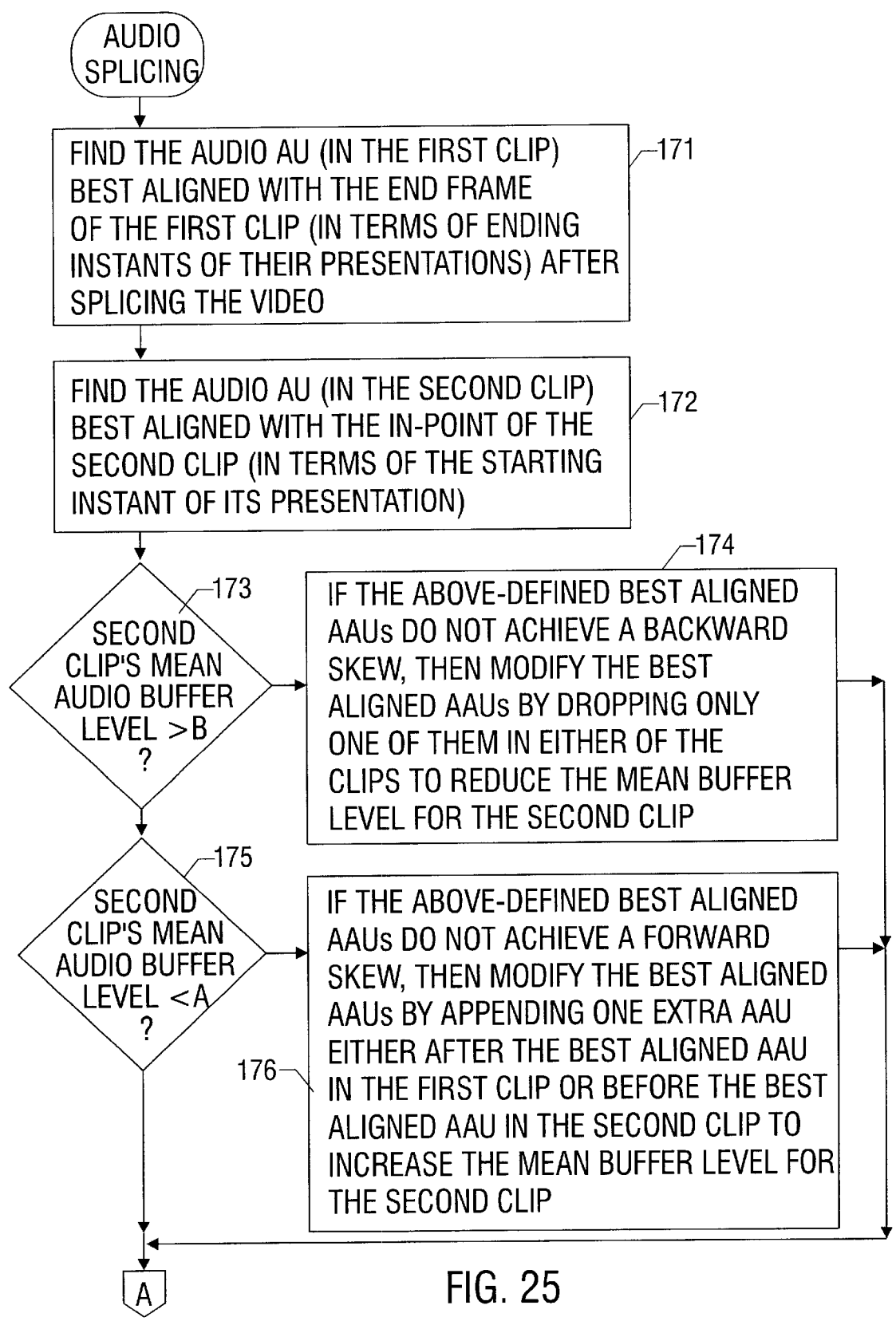
FIG. 25 is a first portion of a flow chart of a procedure for splicing audio streams.

With reference to FIG. 25, there is shown the beginning of a flow chart of an audio splicing procedure. In a first step 171, the procedure finds the audio access unit (AAU) of the first clip best aligned with the end frame of the first clip (in terms of the ending instants of their presentations) after splicing of the video. Then, in step 172, the procedure finds the audio access unit (AAU) of the second clip best aligned with the In Point of the second clip (in terms of the starting instant of its presentation). In step 173, for the second clip the mean audio buffer level, assuming no modification made for splicing, is compared to a high threshold, designated B. (B, for example, has a value of 66% of the audio buffer capacity.) If this mean audio buffer level exceeds the high threshold B, then the procedure branches to step 174. In step 174, if the above-defined best aligned AAUs do not achieve a backward skew, then the best aligned AAUs are modified by dropping only one of them in either of the clips to reduce the mean audio buffer level for the second clip. In step 173, if the mean audio buffer level does not exceed the high threshold B, then execution continues to step 175. In step 175, the mean audio buffer level for the second clip, assuming no modification made for splicing, is compared to a low threshold, designated A. (A, for example, has a value of 33% of the audio buffer capacity.) If this mean audio buffer level is less than the low threshold A, then the procedure branches to step 176. In step 176, if the above-defined best aligned AAUs do not achieve a forward skew, then the best aligned AAUs are modified by appending only one extra AAU either after the best aligned AAU in the first clip or before the best aligned AAU in the second clip to increase the mean audio buffer level for the second clip.

In general, a forward skew of the AAUs from the second stream by incrementing their presentation time instants tends to increase the mean audio buffer level. Therefore, a forward skew is good if the mean audio buffer level is low for the second stream. A backward skew of the AAUs from the second stream by decrementing their presentation time instants tends to decrease the audio buffer level. Therefore, a backward skew is good if the mean audio buffer level is high for the second stream.

Figure 26:
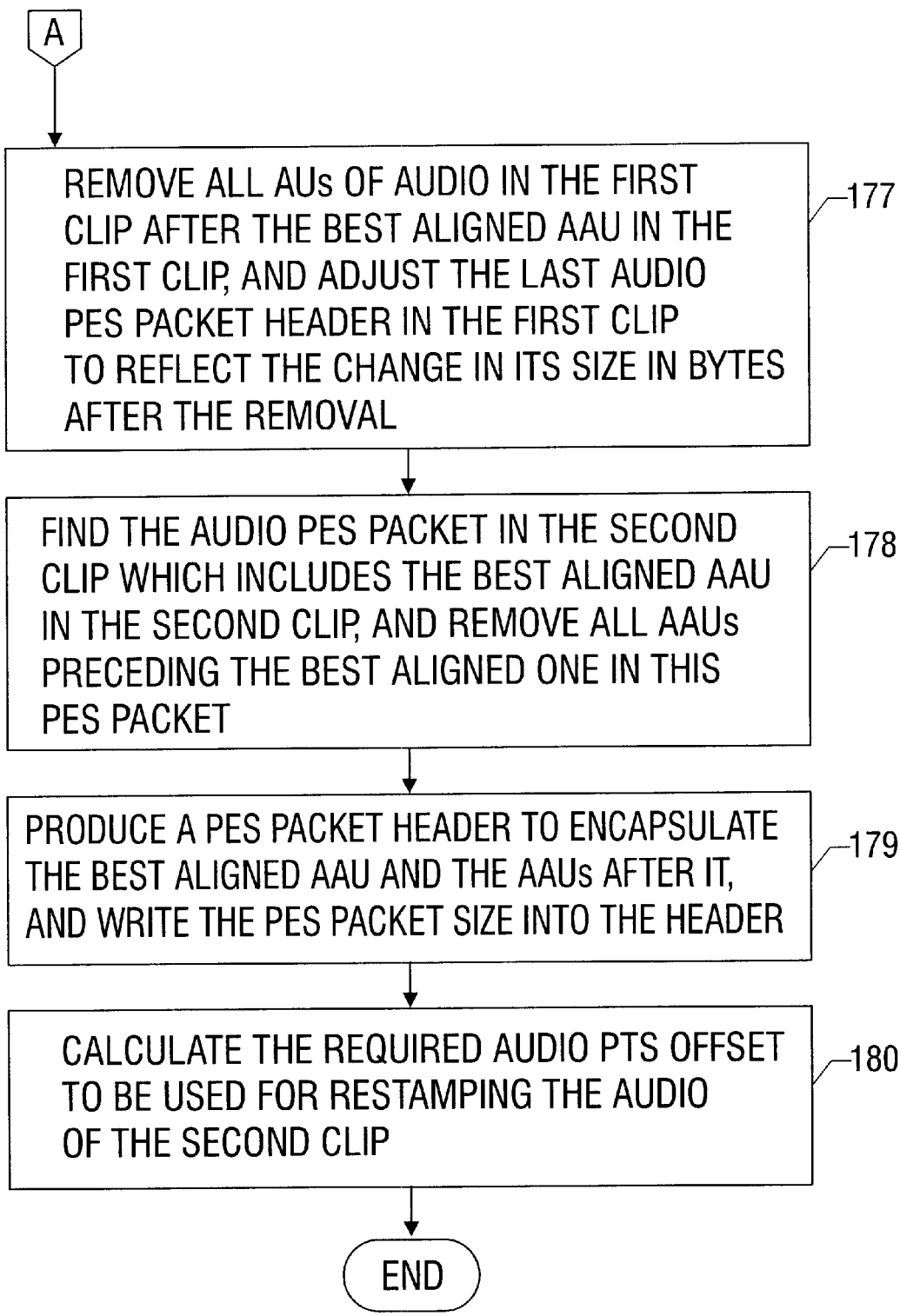
FIG. 26 is a second portion of the flow chart begun in FIG. 25.
Figure 28:
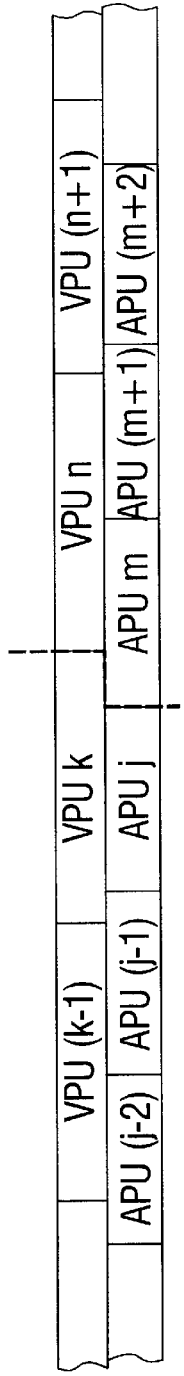
FIG. 28 shows how the first and second clips for the case of FIG. 11A should be spliced when the second clip has a high mean audio buffer level.
Figure 29:
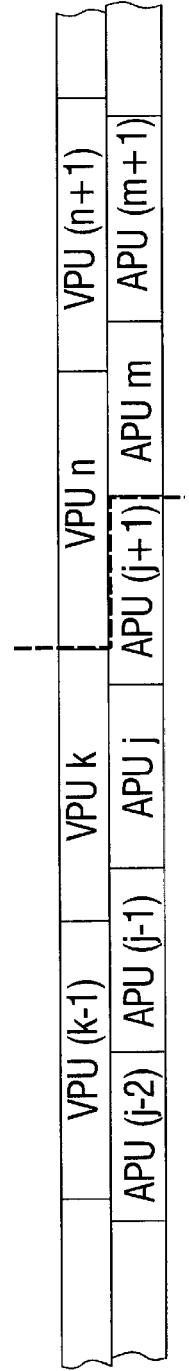
FIG. 29 shows how the first and second clips for the case of FIG. 12A should be spliced when the second clip has a low mean audio buffer level.
Figure 30:
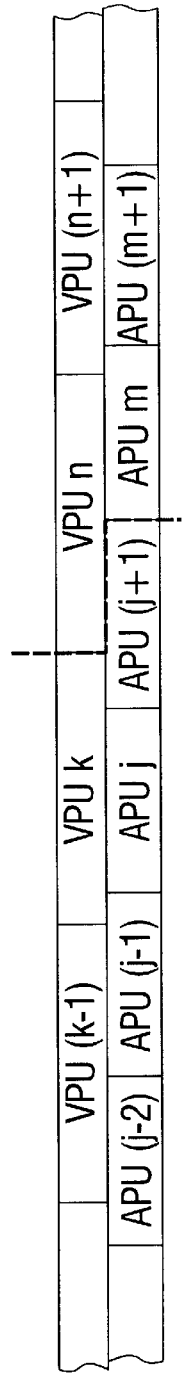
FIG. 30 shows how the first and second clips for the case of FIG. 13A should be spliced when the second clip has a low mean audio buffer level.
Figure 31:
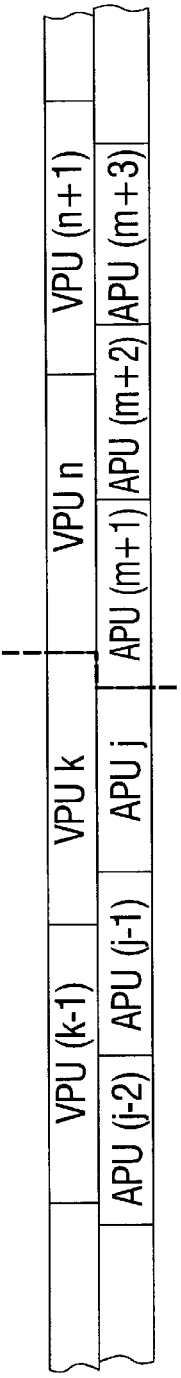
FIG. 31 shows how the first and second clips for the case of FIG. 14A should be spliced when the second clip has a high mean audio buffer level.
Figure 32:
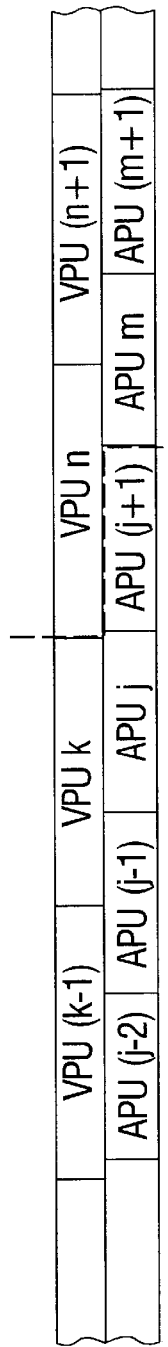
FIG. 32 shows how the first and second clips for the case of FIG. 15A should be spliced when the second clip has a low mean audio buffer level.
Figure 33:
FIG. 33 shows how the first and second clips for the case of FIG. 16A should be spliced when the second clip has a high mean audio buffer level.
Figure 34:
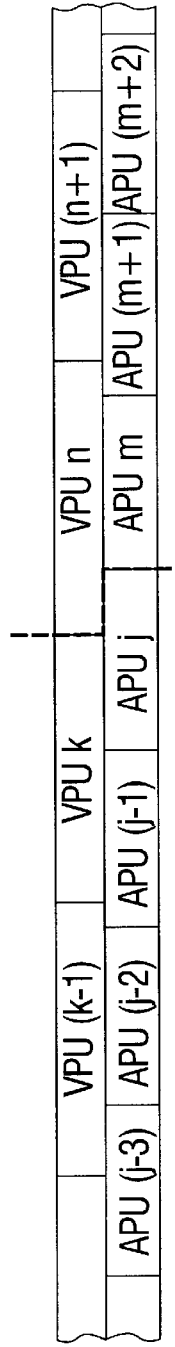
FIG. 34 shows how the first and second clips for the case of FIG. 17A should be spliced when the second clip has a low mean audio buffer level.
Figure 35:
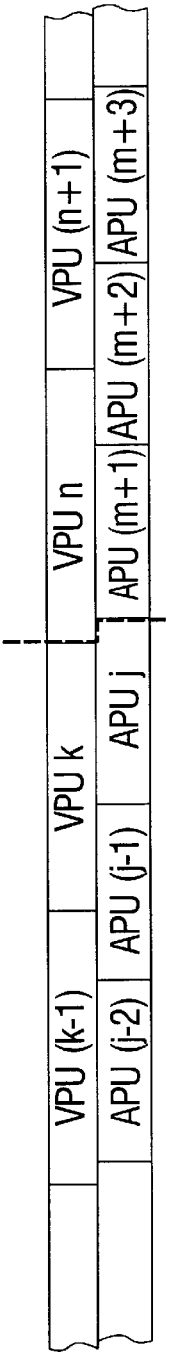
FIG. 35 shows how the first and second clips for the case of FIG. 18A should be spliced when the second clip has a high mean audio buffer level.

In step 175, if the mean audio buffer level is not less than the low threshold A, then the procedure continues to step 177 in FIG. 26. The procedure continues to step 177 also after steps 174 and 176. In step 177, the procedure removes all AAUs in the first clip after the best aligned AAU in the first clip, and adjusts the last audio PES packet header in the first clip to reflect the change in its size in bytes after the removal. In FIG. 26, step 178, the procedure finds the audio PES packet in the second clip which includes the best aligned AAU in the second clip, and removes all AAUs preceding the best aligned one in this PES packet. Then in step 179, the procedure produces a PES packet header to encapsulate the best aligned AAU and the AAUs after it, and writes the PES packet size into the header. Finally, in step 180, the procedure calculates the required audio PTS offset ($A_{offset}$) to be used for re-stamping the audio of the second clip.

The preferred implementation of the audio splicing routine in FIGS. 26 and 27 uses the logic shown in FIG. 27. Depending on whether the mean audio buffer level for the second clip, assuming no modifications are made for splicing, is greater than the high threshold B or less than the low threshold A, the eight cases of FIG. 10 are expanded to sixteen cases. The preferred solutions for these eight additional cases are shown in FIGS. 28 to 35. When the mean audio buffer level for the second clip, assuming no modifications are made for splicing, is neither greater than the high threshold B nor less than the low threshold A, then the solutions shown in FIGS. 11 to 18 are immediately applicable.

Figure 36:
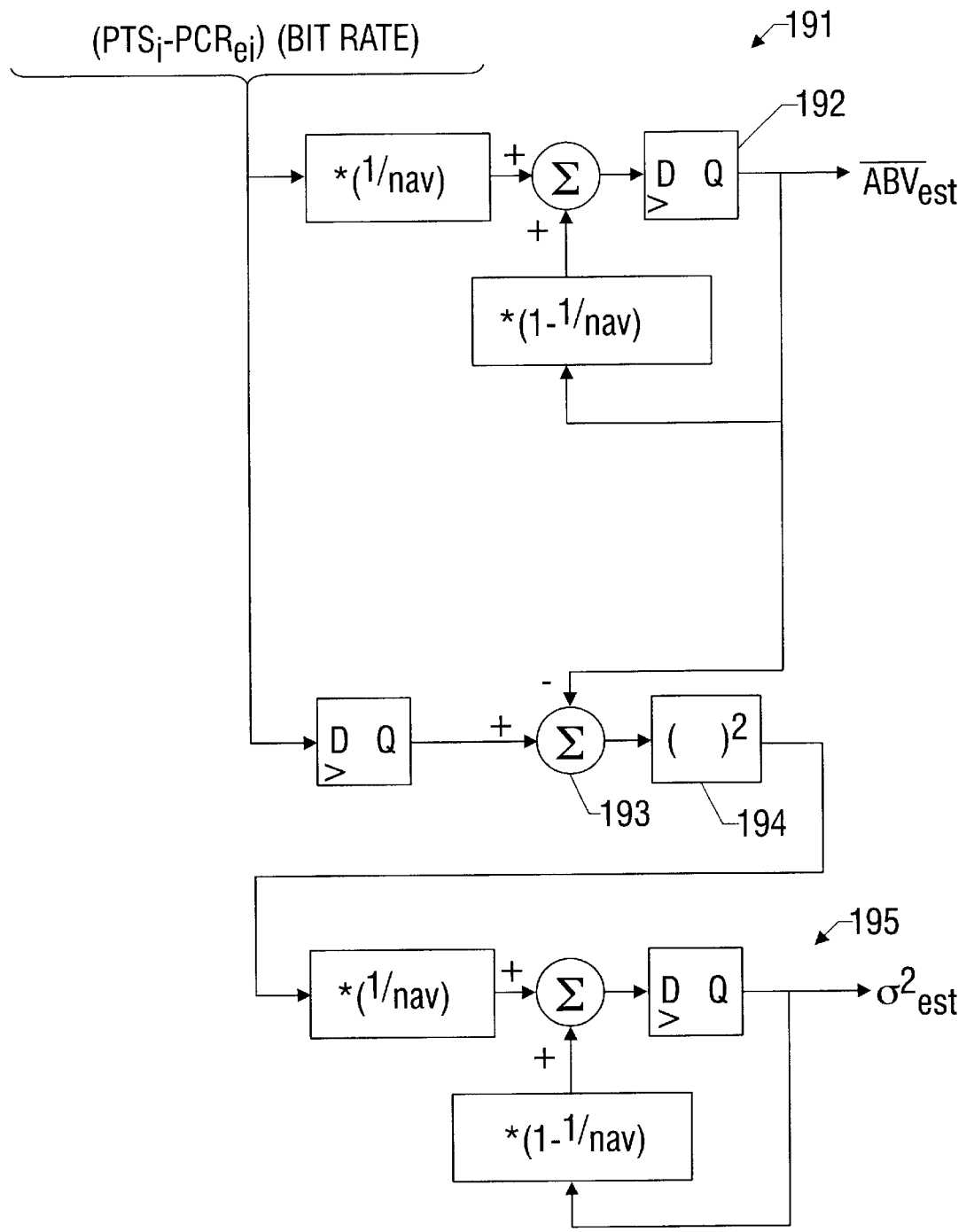
FIG. 36 is a schematic diagram of a digital filter for estimating the average audio buffer level and standard deviation of the audio buffer level from presentation time stamps (PTS) and extrapolated program clock reference (PCR) time stamps for an audio elementary stream.

A preferred method of estimating the mean audio buffer level of a clip is to use the product $(PTS_i - PCR_{ei})(BIT\ RATE)$ as an indication of the audio buffer level. $PTS_i$ denotes the ith audio PTS time stamp, and $PCR_{ei}$ denotes the PCR value extrapolated to the bit position of $PTS_i$. Because the product $(PTS_i - PCR_{ei})(BIT\ RATE)$ will fluctuate more rapidly than the mean audio buffer level, the computed values may be processed by a simple digital filter routine to obtain an estimated value of the mean audio buffer level at any point of a clip. Shown in FIG. 36, for example, is a digital filter schematic that includes a single first-order recursive stage 191 for computing an estimate of the mean audio buffer level ABV. The computation includes a scaling of $(PTS_i - PCR_{ei})(BIT\ RATE)$ by a factor of $1/n_{av}$, where $n_{av}$ is the effective number of samples over which the mean is estimated. The scaled value is added to the previous estimate of the mean value of ABV scaled by a "forgetting factor" of $1 - 1/n_{av}$. The previous value is stored in a register 192. In a similar fashion, an estimate of the variance of the audio buffer level at any point of a clip is computed by similar circuitry or computations depicted in FIG. 36. For example, the estimate of the variance can be computed by a subtractor 193 that calculates the deviation of each sample of $(PTS_i - PCR_{ei})(BIT\ RATE)$ from the estimated mean audio buffer level, a squaring unit 194, and another first-order recursive filter stage generally designated 195.

Figure 37:
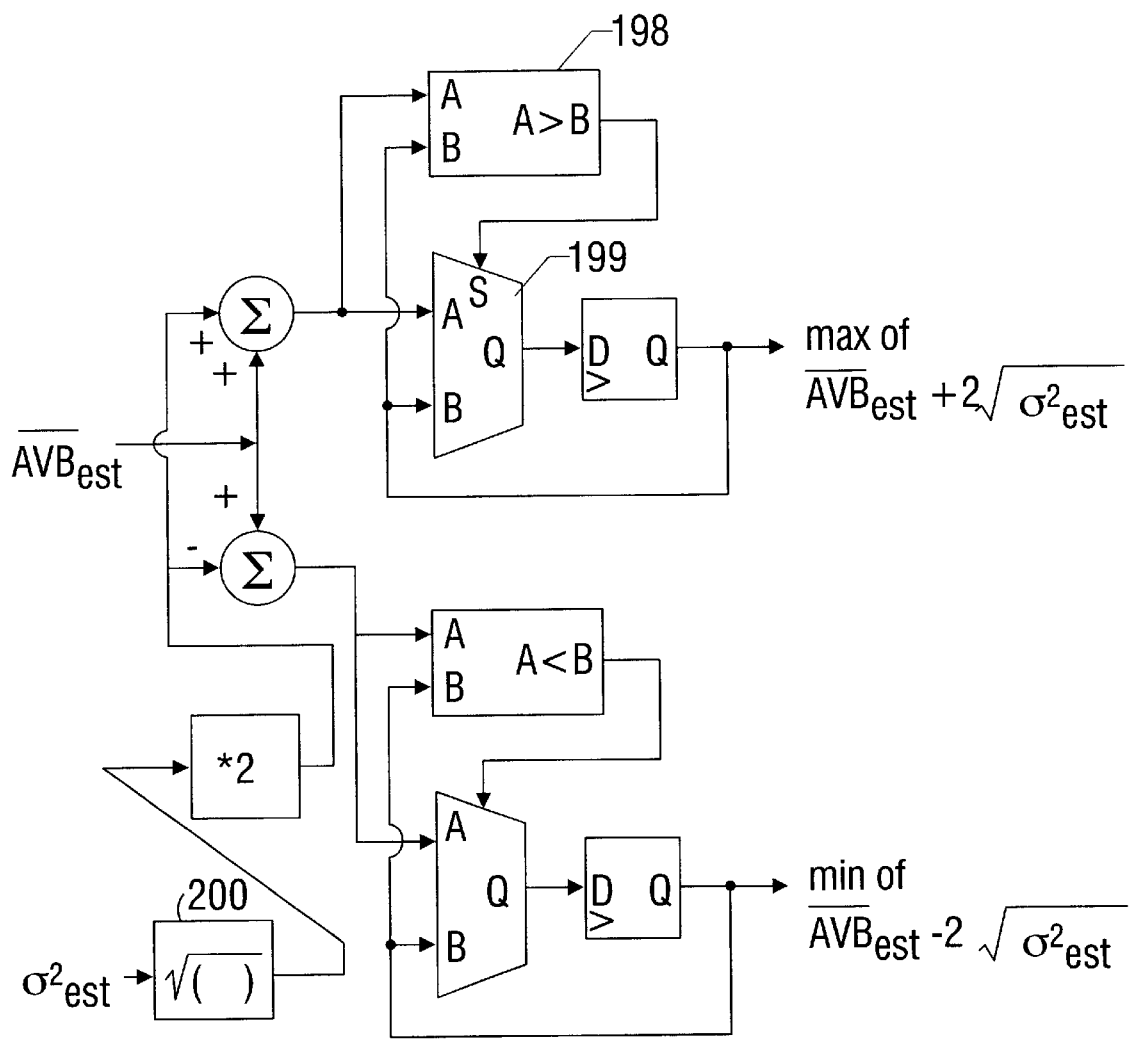
FIG. 37 is a schematic diagram of circuitry for computing an expected maximum and an expected minimum audio buffer level from the estimated average audio buffer level and standard deviation of the average audio buffer level from the digital filter circuitry in FIG. 36.

Instead of determining whether the mean audio buffer level is relatively high or low for a clip, a determination can be made as to whether the audio buffer full level (i.e., audio buffer size) is within a certain number of estimated standard deviations from the estimated mean audio buffer level, or whether the audio buffer empty level (e.g., zero bytes) is within a certain number of estimated standard deviations from the estimated mean audio level. In this case, the certain number can be selected based on the usual statistics of the type of audio encoding that is employed, in order to ensure the absence of audio buffer underflow or overflow within a desired level of confidence. In order to make the comparisons very simple at the time of splicing, the maximum and minimum expected deviations from the estimated average can be computed in advance for each clip. For example, FIG. 37 shows in schematic form the computations necessary to compute the maximum of the estimated mean buffer level AVB plus twice the estimated standard deviation, and to compute the minimum of the estimated mean buffer level AVB minus twice the standard deviation. The box 198, for example, outputs a binary value indicating whether or not the input A is greater than the input B. The symbol 199 denotes a multiplexer or selection step. The symbol 200 denotes a square root operator block. The other symbols in FIG. 37 have meanings similar to the like symbols in FIG. 36.

To simplify audio buffer management during splicing transients, it is recommended to have the same audio buffer levels at the beginning and at the end of the clips. The case of going from a low to a high audio buffer level is the most problematic, and is addressed by a sufficiently precise mean buffer level estimate for beyond the selected In Point.

If there are multiple audio streams for one program, then all of these individual audio streams are processed independently in the fashion described above for a single stream. For example, there could be two stereo audio streams for one program, or four audio streams for quadraphonic sound. The association of the ending (i.e., first) clip and starting (i.e., second) clip audio streams to splice together depends on the PID of the streams after PID re-mapping, if there is PID re-mapping, or on the PID of each stream in the spliced clips, if there is no PID re-mapping. For an audio stream of the ending clip that has no audio stream in the starting clip that can be associated with it, the preserved audio packets are played until the end. This will achieve the best possible alignment between audio and video for the ending clip.

The method used above for seamless audio splicing can also be used for splicing other elementary streams containing encapsulated data. For example, a TS may have additional elementary streams of other data encapsulated in access units such as access units for teletext, closed captioning, VBI, etc. To apply the seamless splicing method to a TS having multiple elementary streams of non-video and non-audio access units, the AU's in each elementary stream are found that are best aligned with the first and last video frames, and an AU sequence over the splice is selected, independent of the content of the other non-video elementary streams. In this case, the method will minimize skew with respect to associated video frames and also prevent accumulation of skew from multiple splices in the TS.

With reference to FIG. 38, there is shown a flow chart of a procedure for calculating the video time stamp offset $V_{OFFSET}$. In a first step 211, the procedure finds the DTS of the last video frame (in decode order) of the first clip. This DTS of the last video frame of the first clip is denoted $DTS_{VL1}$. Then in step 212, the procedure finds the original DTS of the first frame to be decoded in the second clip. This DTS of the first frame to be decoded in the second clip is denoted $DTS_{VF2}$. Finally, in step 213, the video time stamp offset $V_{OFFSET}$ is computed as $DTS_{VL1}-DTS_{VF2}$ plus one video frame duration.

Figure 39:
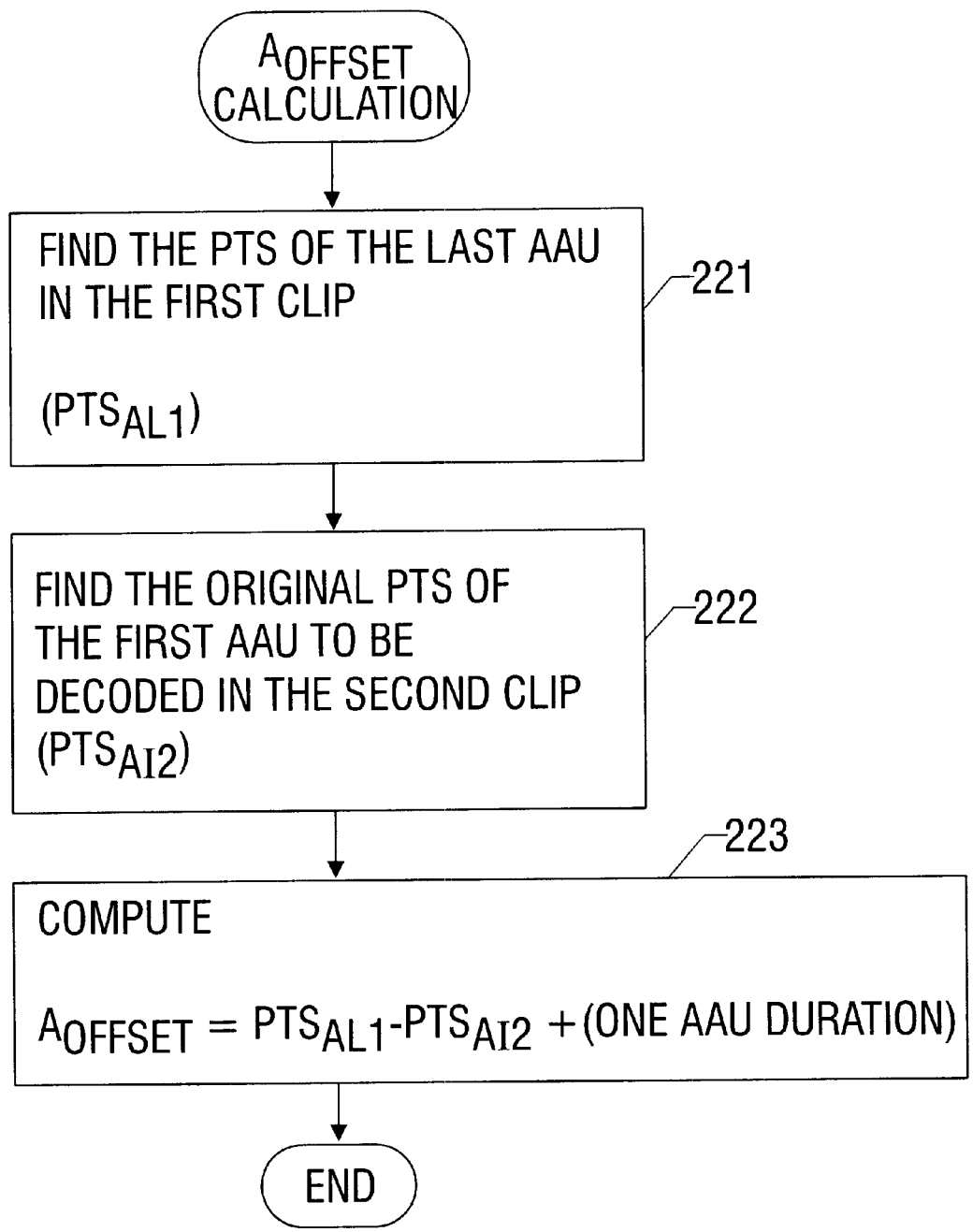
FIG. 39 is a flow chart of a procedure for computing an offset for the audio presentation time stamps (PTS) of the second clip for splicing the second clip onto the first clip.

With reference to FIG. 39, there is shown a flow chart of a procedure for calculating the audio time stamp offset $A_{OFFSET}$. In a first step 221, the procedure finds the PTS of the last AAU of the first clip. This PTS of the last AAU of the first clip is denoted $PTS_{AL1}$. Then in step 222, the procedure finds the original PTS of the first AAU to be decoded in the second clip. This PTS of the first AAU to be decoded in the second clip is denoted $PTS_{AF2}$. Finally, in step 223, the audio time stamp offset $A_{OFFSET}$ is computed as $PTS_{AL1}-PTS_{AF2}$ plus one AAU duration.

Figure 40:
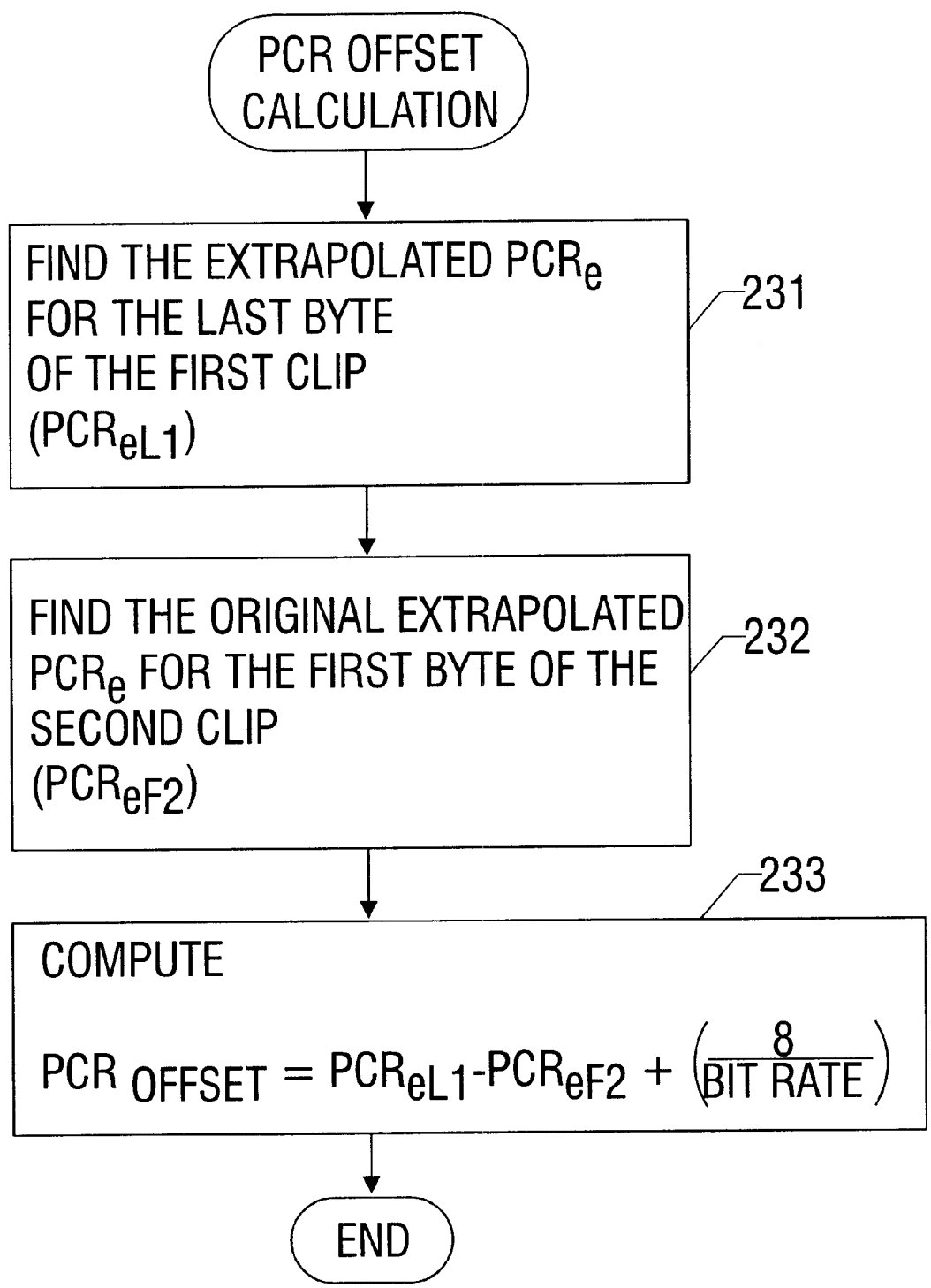
FIG. 40 is a flow chart of a procedure for computing an offset for the program clock reference (PCR) time stamps of the second clip for splicing the second clip to the first clip.

With reference to FIG. 40, there is shown a flow chart of a procedure for calculating the PCR offset $PCR_{OFFSET}$. In a first step 231, the procedure finds the extrapolated $PCR_e$ for the last byte of the first clip. This extrapolated $PCR_e$ is denoted $PCR_{eL1}$. Then in step 232, the procedure finds the original extrapolated $PCR_e$ for the first byte of the second clip. This extrapolated $PCR_e$ is denoted $PCR_{eF2}$. Finally, in step 233, the PCR offset $PCR_{OFFSET}$ is computed as $PCR_{eL1}-PCR_{eF2}$ plus eight divided by the bit rate.

Figure 41:
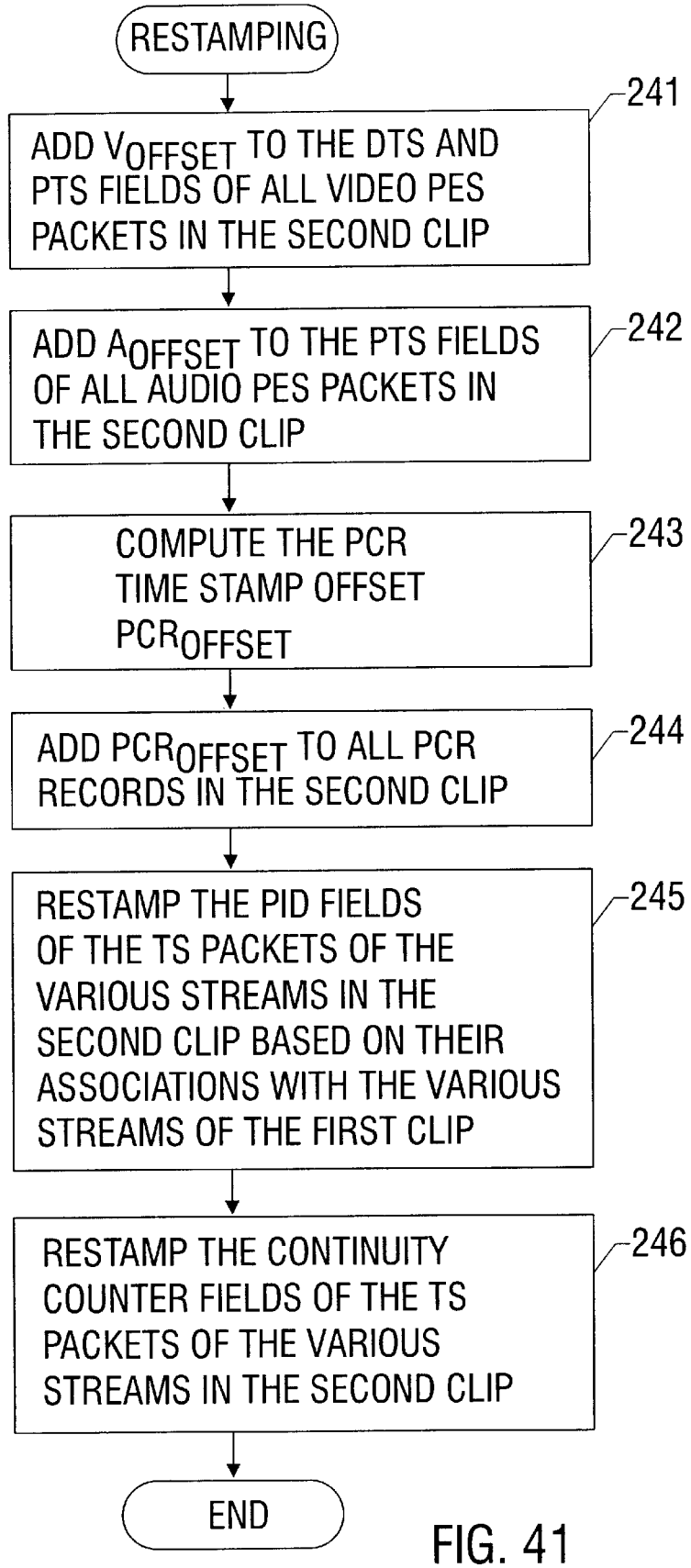
FIG. 41 is a flow chart of a procedure for re-stamping a second clip for splicing of the second clip to the first clip.

With reference to FIG. 41, there is shown a flow chart of a procedure for re-stamping the time stamps in the portion of the second clip appearing in the spliced transport stream. In step 241, the video time stamp offset $V_{OFFSET}$ is added to the DTS and PTS fields of all video PES packets in the second clip. Next, in step 242, the audio time stamp offset $A_{OFFSET}$ is added to the PTS fields of all audio PES packets in the second clip. In step 243, the PCR time stamp offset $PCR_{OFFSET}$ is computed by invoking the subroutine of FIG. 40. In step 244 the $PCR_{OFFSET}$ is added to all PCR records in the second clip. In step 245 the PID fields of the TS packets of the various streams in the second clip are re-stamped based on their associations with the various streams of the first clip. Finally, in step 246, the continuity counter fields of the TS packets of the various streams are re-stamped in the second clip so as to achieve stream continuity from the first clip to the second clip.

In order to solve certain buffer problems and also to avoid artifacts in case of clips starting with an open GOP, it sometimes becomes necessary to remove some frames. If these frames are removed from the stream without any replacement, a "hole" in the frame presentation time sequence will be generated. In this case, the result depends on the decoder implementation (i.e. on how a particular decoder handles this situation). For example, some decoders try to correct the problem by themselves. More precisely, they do not take the recorded DTS values into account and continue decoding the frames they have received until they possibly enter an underflow state. The observed result is a freeze of the scene which occurs some frames after the splicing point (sometimes 10 frames). In other,decoders the consequences could be more catastrophic.

To avoid any unpleasant effect in a controlled fashion, the frames which cannot be decoded are replaced by encoded frozen frames. These frames are encoded such that they effectively repeat a previous frame in the decoding order. They can be either B-frames or P-frames. The frozen frame implementation relies on null motion vectors and no coded transform coefficients. Consequently, these frames are completely MPEG-2compliant and the decoder doesn't encounter any discontinuity in the stream.

With these frozen frames, decoder freeze can be controlled to make the visual perception cleaner. There are three different types of encoded frozen frames that can be generated for this purpose. These three types are a P-frame repeating the previous I or P frame (in display order), a B-frame repeating the previous I or P frame (in display order), and a B-frame repeating the following I or P frame (in display order). Moreover, any frozen frame should not be separated from the frame it is repeating by some live (i.e. non-frozen) frames in display order. To avoid any undesirable flickering effect due to the presence of two fields within an interlaced frame, the frozen frames are generated using the dual motion prediction type which allows the encoding of one field by extrapolation (prediction) from the dual field.

Figure 42:
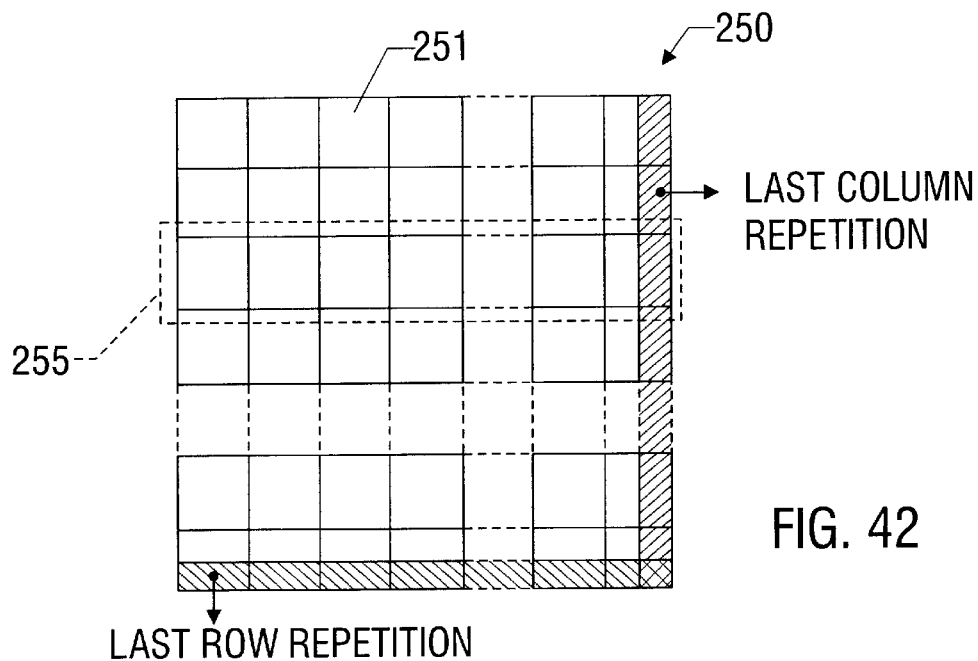
FIG. 42 is a diagram of macroblocks in a video frame.

With reference to FIG. 42, there is shown a diagram of the pixels in a video frame 250. According to the MPEG video encoding standard, the video frame can be subdivided into a rectangular array of macroblocks, where each macroblock 251 includes a square array of pixels. Pixels on the lower right and lower borders of a frame that do not fit into full size macroblocks are handled as follows. The frame horizontal and vertical sizes are completed to the nearest integer multiples of macroblock horizontal and vertical sizes by right-most column and lower-most row reptitions respectively. The MPEG standard also permits slices, or linear arrays of contiguous macroblocks, to be defined, with the maximum sized slices including an initial macroblock in a left-most column and a final macroblock in a right-most column. For example, a maximum size slice 255 is shown including all of the macroblocks in the third row of the macroblock matrix. A large number of consecutive macroblocks in a slice can be very efficiently encoded by a command to skip that number of macroblocks immediately after the initial macroblock in the slice. In case of a skip, the encoding information (i.e., the motion vectors and quantized DCT coefficients for the prediction error) is common to all skipped macroblocks and therefore is not repeated for each skipped macroblock.

It is possible to encode a "freeze frame" in various ways, such that the encoding of the "freeze frame" will result in a selected variable size. The smallest freeze frame will define the maximum number of skipped macroblocks and maximum size slices, and a null set of DCT coefficients for the prediction residual and zero valued displacement vectors. The largest freeze frame will define, for each of the non-skipped macroblocks, a set of zero valued DCT coefficients for the prediction residual and zero valued displacement vectors. Freeze frames of intermediate sizes can be defined by using different numbers of skipped macroblocks, and then various sizes of slices of macroblocks. Also, a slight adjustment can be made by padding. Padding is done by placing some stuffing bytes in the adaptation field (see FIG. 5).

Figure 43:
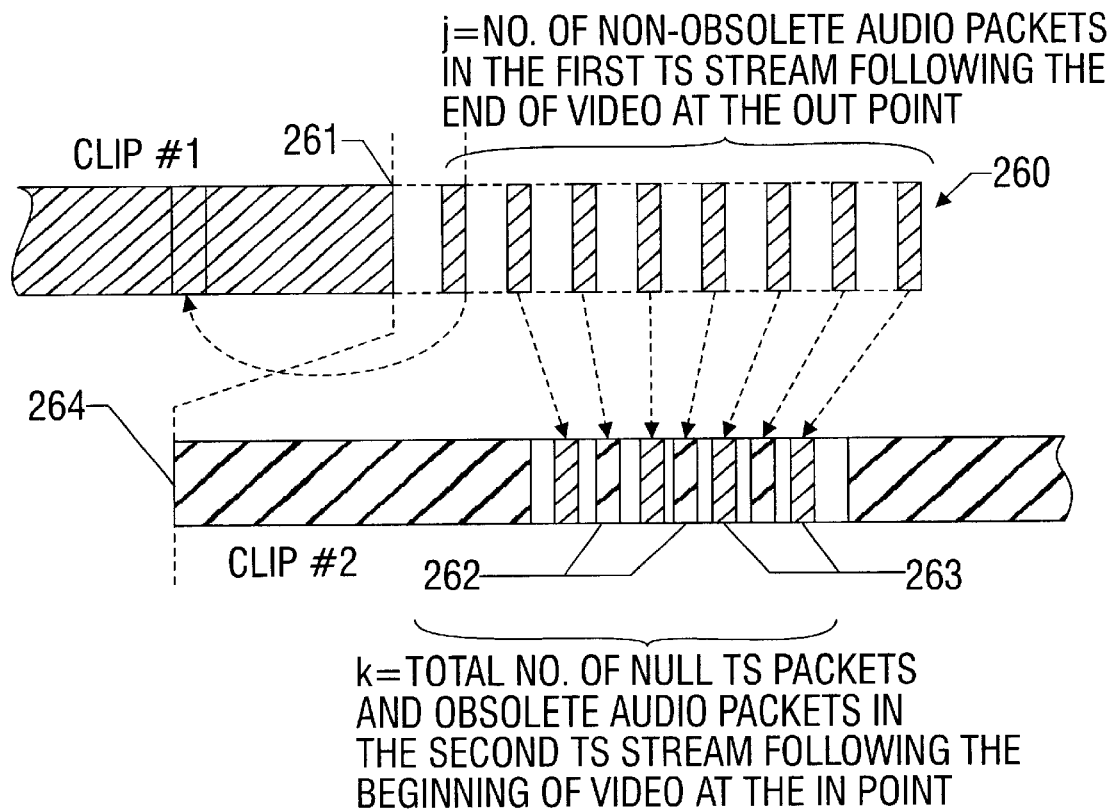
FIG. 43 is a diagram showing non-obsolete audio packets in a first TS stream following the end of video at an Out Point and null packets and obsolete audio packets in a second TS stream following the beginning of video at an In Point.

With reference to FIG. 43, there is illustrated a problem of non-obsolete audio TS packets 260 that follow in the first clip after the end 261 of the video TS packet for the Out Point, and null TS packets 262 and obsolete audio packets 263 in the second clip after the beginning of the video TS packet for the In Point. It is desired to replace as many of the null TS packets 262 and obsolete audio packets 263 as possible with the non-obsolete audio packets. If any of the non-obsolete audio packets from the first clip cannot be repositioned into existing packet positions in the second clip after the beginning of the video TS packet for the In Point, then the placement of these remaining non-obsolete audio TS packets may affect the $DTS_{F2}$–$PCRC_2$ relationship of the In Point of the second clip or the $T_S = T_e + 8/(\text{bit rate})$ relationship that needs to be satisfied for seamless video splicing. In particular, the number of bits of the remaining non-obsolete audio packets must either fit in the gap that needs to be compensated in step 157 of FIG. 24, or will require additional space to be opened up in the clip in step 158 (for example by reducing the size of a freeze frame or increasing the number of video frames in the first clip that must be replaced by freeze frames) to make room for them.

Figure 44:
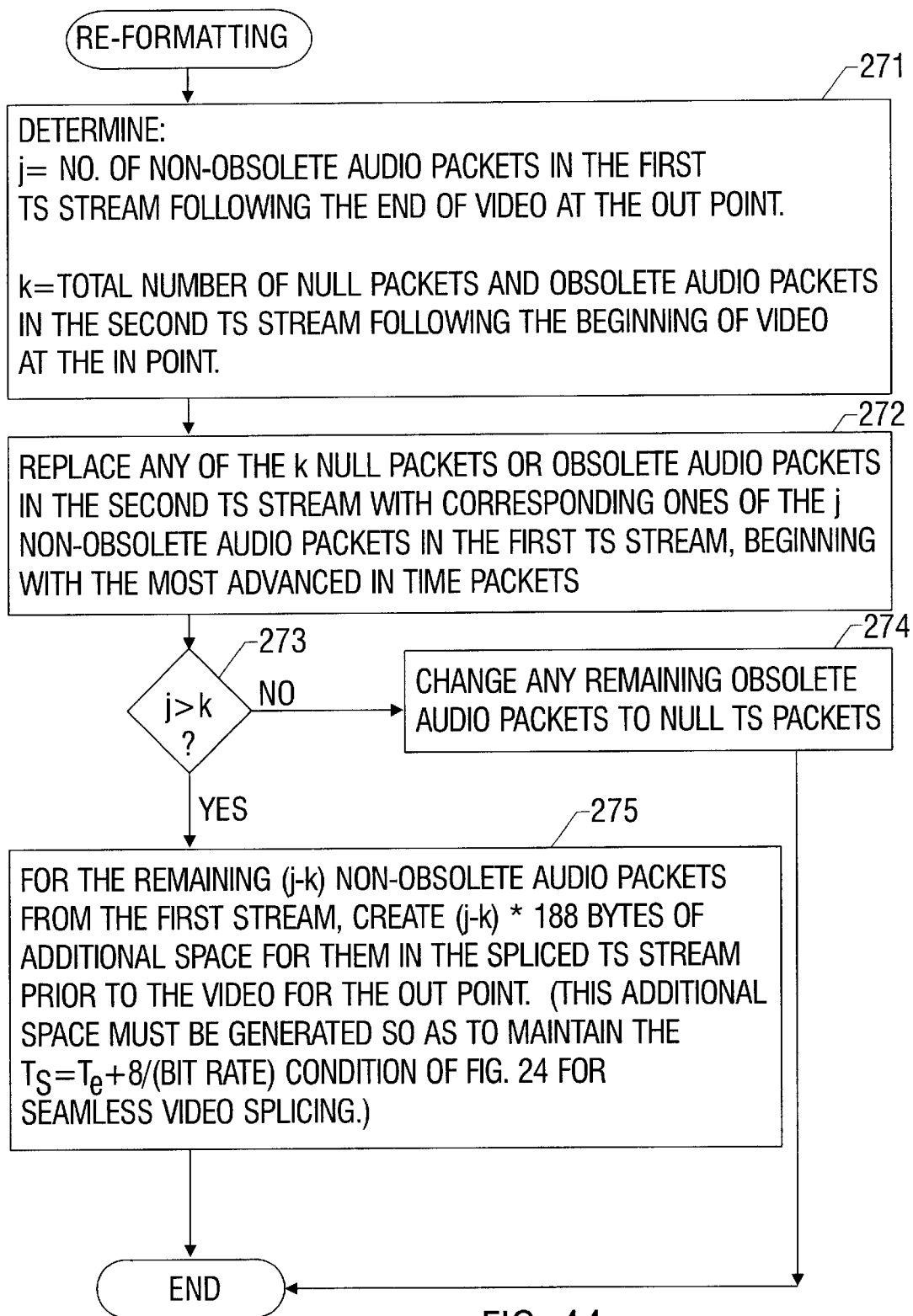
FIG. 44 is a flow chart of a re-formatting procedure that replaces the null packets and obsolete audio packets in FIG. 43 with the non-obsolete audio packets in FIG. 43.

With reference to FIG. 44, there is shown a procedure of a re-formatting operation that solves the problem of the non-obsolete audio TS packets 260 that follow in the first clip after the end 261 of the video TS packet for the Out Point. In a first step 271, the procedure determines the number (designated "j") of non-obsolete audio packets in the first TS stream or clip following the end of the video at the Out Point, and the total number (designated "k") of null packets and obsolete audio packets in the second TS stream or clip following the beginning of video at the In Point and up to the first non-obsolete audio packet in the second TS. Next, in step 272, the procedure replaces any of the "k" null packets or obsolete audio packets in the second TS stream with corresponding ones of the "j" non-obsolete audio packets in the first TS stream, beginning with the most advanced in time packets. Then, in step 273, the procedure branches depending on whether or not "j" is greater than "k". If "j" is not greater than "k", then all of the non-obsolete audio packets following the Out Point from the first TS stream have been inserted into the second TS stream following the In Point so that they no longer constitute a problem for the seamless video splicing. In this case, execution branches to step 274 to change any remaining obsolete audio packets to null TS packets, and the reformatting procedure of FIG. 44 is finished.

If "j" is greater than "k", execution continues from step 273 to step 275. In step 275, for the remaining (j–k) non-obsolete audio packets from the first stream, the procedure creates (j–k)*188 bytes of additional space for them in the spliced TS stream prior to the video for the Out Point. This additional space must be generated so as to maintain the $TS = Te + 8/(\text{bit rate})$ condition of FIG. 24 for seamless video splicing. This additional space can be entirely or partially provided by the space of the null TS packets created in step 157, in which case these null TS packets are replaced with non-obsolete audio packets. Any remaining ones of the non-obsolete audio packets are placed into the space opened up by reducing the space taken by the video packets in the first stream prior to the Out Point. After step 275, the re-formatting routine of FIG. 44 is finished.

The reformatting of the spliced TS stream after concatenation also includes steps to ensure the continuity of associated individual streams across the splice point. The same program specific information (PSI) tables must occur before and after the splicing point. This is achieved by re-stamping all of the program identification indices (PIDs) within the second clip with the associated stream PIDs of the first clip. The program identification indices must be the same for the different component streams which form a continuation before and after the splicing points. In addition, the continuity counter sequence for each elementary stream must be evolving continuously across the splicing point. Therefore, typically all of the continuity counter values are re-stamped for each transport packet of the second stream.

There can also be a need for some further reformatting to permit the In Point to be an I frame of an open GOP, and to select where freeze frames should be inserted in the last GOP before the Out Point. When the clip to decode and present for viewing starts with an open GOP, some B-frames will typically contain references to a frame that was in the previous GOP at the encoding time. These reference frames are not present in the new stream. So, it is not possible to play these B frames without artifacts. They must be removed. However, in order to keep an MPEG-2 compliant stream and also to preserve frame accuracy, these B frames are replaced by encoded frozen frames referring to a previous (in display order) I or P frame. As these B frames sent after the first I frame of the clip to start, are presented before it, the freeze will occur just at the splicing. The last anchor frame of the completed clip is repeated one or several times, but the new clip starts without any artifacts.

At the end of a clip, before decoding the last GOP to play, the procedure determines which changes are to be performed in this GOP to avoid buffer problems. To do this, the procedure accesses the following data:

the last GOP size (in bytes)

the last GOP size (in frames)

the $DTS$–$PCR_e$ at the beginning of this GOP (i.e. for its first frame) and the ending delay $T_{end} = DTS_{L1} - T_e$ at the end of this GOP which can be computed.

the number of frames to play from this GOP which is not necessarily equal to the full GOP size.

To rebuild this GOP, the procedure has access to the GOP structure and the size of each frame. So, the last GOP is read in full into the memory. This is done only if the procedure needs to terminate with an incomplete GOP. If a play-at-time interrupt arrives during playing a clip, the procedure determines in advance the number of frames remaining before the transition to the next clip to prepare the GOP.

The frames to be replaced by encoded frozen frames depend on the GOP structure. This point will be illustrated by examples.

EXAMPLE 1

Incomplete GOP With 3n Frames

Transport order: I B B P B B P B B P B B

Display order: 2 0 1 5 3 4 8 6 7 11 9 10

Case 1: The procedure has to play 3n frames. The procedure takes the first 3n frames without any problem since the set of the first 3n frames in the transport order is the same as the set of the first 3n frames in display order as shown above.

EXAMPLE 2

Incomplete GOP With 3n+1 Frames (Case of 3n+1=7 is Illustrated.)

Transport order: I B B P B B Pff

Display order: 2 0 1 5 3 4 6

Case 2: The procedure has to play 3n+1 frames. Then the procedure replaces the last frame by a frozen frame as shown above. Pff implements a freeze of P5.

EXAMPLE 3

Incomplete GOP With 3n+2 Frames (Case of 3n+2=8 is Illustrated.)

Transport order: I B B P B B Pff Bff

Display order: 2 0 1 5 3 4 7 6

Case 3: The procedure has to play 3n+2 frames. Then the procedure inserts two frozen frames as shown above. Both Bff and Pff implement freeze of P5.

EXAMPLE 4

Structurally Closed IBBP . . . GOP

Transport order: I P B B P B B P B B P B B

Display order: 0 3 1 2 6 4 5 9 7 8 12 10 11

Within this GOP structure playing 3n+1 frames is trivial and can be achieved without any freeze frames. Playing 3n+2 frames can be achieved by freezing just one frame as illustrated below for the case of 3n+2=8:

Transport order: I P B B P B B Pff

Display order: 0 3 1 2 6 4 5 7 where Pff implements a freeze of P6. Similarly, playing 3n frames can be achieved by freezing two frames as illustrated below for the case of 3n=9:

Transport order: I P B B P B B Pff Bff

Display order: 0 3 1 2 6 4 5 8 7 where Pff and Bff both implement a freeze of P6.

These changes are applied before taking into account the buffer level. They provide a modified GOP tailored for achieving the desired temporal frame accuracy. After these transformations related to the GOP structure are performed, the buffer level (DTS−PCR) at the end of this GOP is computed based on the resultant (i.e. modified) GOP structure.

If the new GOP's (i.e. the first GOP of the clip to start) buffer level is too high and if there is no padding bandwidth available in the end of the first clip, then additional frames are replaced by encoded frozen frames, starting from the last one in transport order and proceeding one frame at a time (towards the beginning of the first clip) until the GOP size becomes small enough.

These GOP transformations can be done in advance, as soon as the number of frames to play in the current clip becomes known. This means that, if there is a play-at-time command to start the next clip, then the timer must expire late enough to allow the computation of frames remaining to play and also the preparation of the last GOP.

Figures 45, 46:
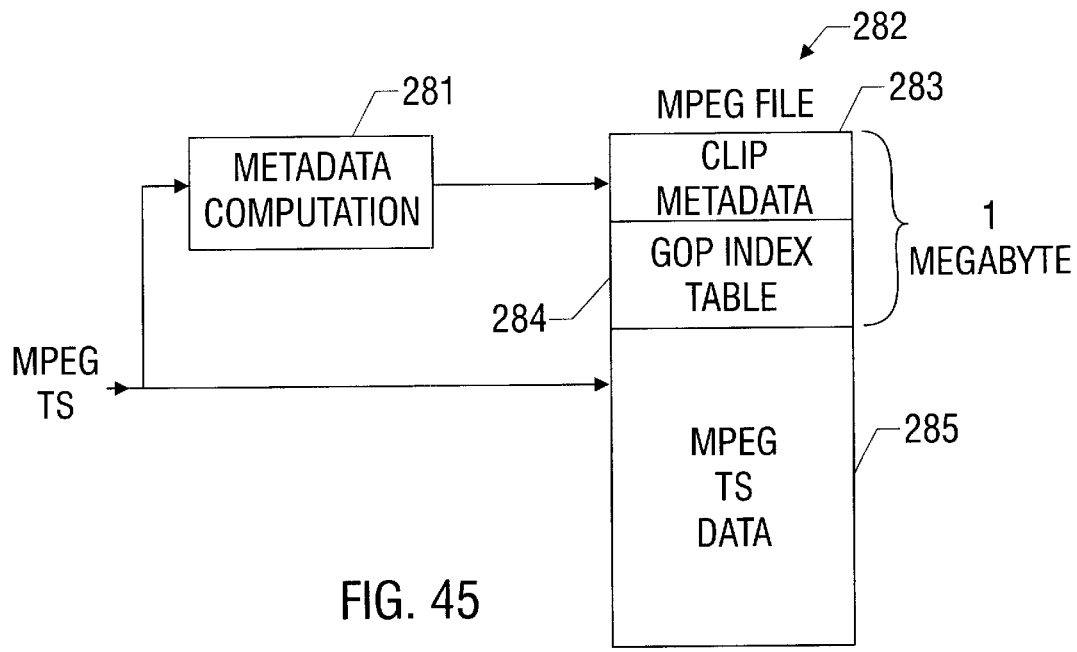
FIG. 45 is a diagram showing MPEG Transport Stream (TS) metadata computation and storage of the metadata in the header of an MPEG TS data file.
FIG. 46 is a block diagram of the preferred format of a GOP index introduced in FIG. 45.

With reference to FIG. 45, it is possible to pre-compute metadata that can speed up the process of seamless splicing. This is especially useful when the seamless splicing must be done on the fly, during real-time delivery of a TS stream. For example, a stream server of the video file server 20 of FIG. 1 performs metadata computation (281 in FIG. 45) when the file server records the MPEG TS stream in a MPEG file 282. As the MPEG TS data 285 becomes recorded in the MPEG file 282, the metadata is recorded in a header of the MPEG file. The header, for example, is a first megabyte of random-accessible address space in the file. Preferably, the metadata includes some metadata 283 associated with the clip as a whole, and metadata 284 associated with the individual GOPs. Preferably, the metadata 284 associated with the individual GOPs is stored in a GOP index table.

The metadata 283 associated with the clip as a whole includes a program number, the video frame rate, status of the clip, the number of GOPs in the clip, stream identifiers for the various elementary streams in the TS, a byte index indicating a beginning position of the clip in the file, and a byte index indicating an ending position of the clip in the file. This metadata 283 is stored in the file header, just before the GOP index 284.

The GOP index table may store the values of predefined attributes of each GOP included in the MPEG TS data. However, it is desirable to permit any number of the GOPs having recorded MPEG TS data 285 to have GOP index table entries that are empty of valid metadata values. Therefore, the metadata computation 281 can be suspended whenever computational resources are needed for higher priority tasks.

FIG. 46 shows a preferred format for the GOP index table 284. The GOP index table includes an entry for each GOP having MPEG TS data recorded in the MPEG file. Each entry is a row in the table, and the table is indexed implicitly by the GOP number. Each entry includes a frame number which is the frame number of the first video frame in the GOP, a pointer to the beginning of the MPEG TS data for the GOP, a set of flags for the GOP, and other GOP attributes. One of the flags for the GOP, or alternatively a sign bit of the frame number or the presence of a predefined reserved value for the frame number, indicates whether or not the GOP entry is valid. The GOP attributes include, for example, the maximum bit rate, the average bit rate, the AAU size in bytes, the APU duration in seconds, the audio PES packet starting locations, the AAU starting locations, the AAU PTS values, the $PCR_e$ of the first video frame, and a flag indicating whether or not the GOP is open or closed.

The GOP index table can be decimated to reduce its size. For example, if so much MPEG TS data becomes written to the MPEG TS file that there is insufficient space in the 1 megabyte header to hold entries for all of the GOPS, then the GOP index can be decimated by a factor of two by writing the content of the GOP entry for GOP no. 2 over the GOP entry for GOP no. 1, writing the content of the GOP entry for GOP. no. 4 over the GOP entry for GOP no. 2, writing the content of the GOP entry for GOP no. 6 over the entry for GOP no. 3, etc.

Figure 47:
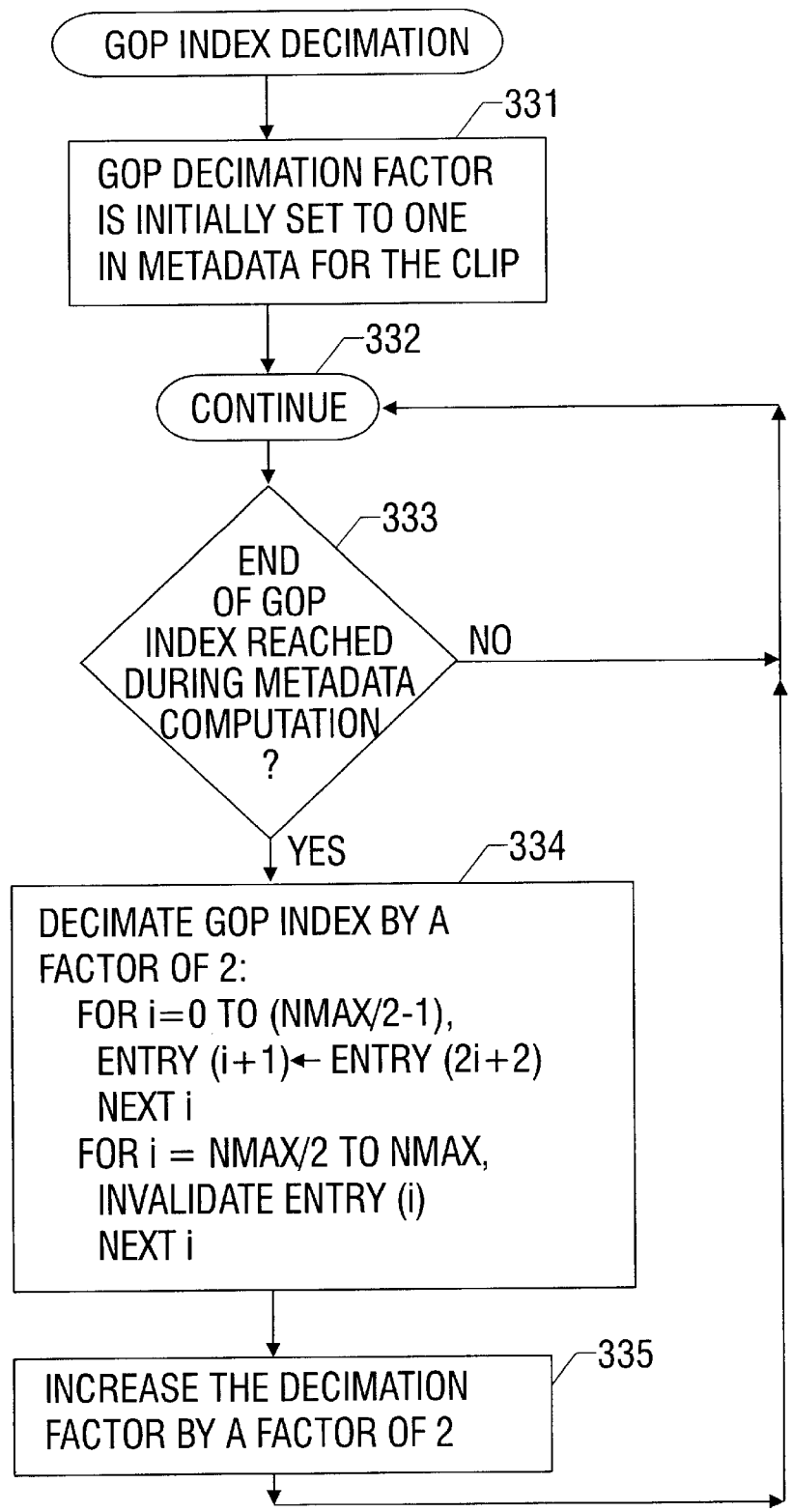
FIG. 47 is a flow chart showing decimation of the GOP index.

With reference to FIG. 47, there is shown a flow chart for GOP index decimation. In a first step 331, before computing attributes for any GOP, a GOP decimation factor is set to one in the metadata for the clip. (This decimation factor, for example, is used to find a GOP table index for a given GOP number by dividing the given GOP number by the decimation factor.) Computation of attribute values for the GOPS found in an ingested TS and the writing of those attribute values to respective entries in the GOP index continues in step 332 until the end of the GOP index is reached in step 333. Then the procedure continues to step 334 where the GOP index is decimated by a factor of two. Finally, the decimation factor is increased by a factor of two, and the procedure loops back to step 332.

Some of the metadata is of high priority and some of the metadata is of lower priority. In the absence of sufficient computational resources, the high priority metadata can be pre-computed without pre-computing the lower priority metadata. For example, the frame rate for the clip is a high priority item but the number of frames in the clip is a low priority item. The frame number and the pointer to the corresponding MPEG TS data (i.e., a byte index) are high priority GOP attributes. The flag indicating whether or not the GOP is open or closed is a low priority item. In the situation where it is possible that a GOP entry will include the high priority items but not the low priority items, the low priority items are encoded with an indication of whether they are valid or not. This can be done by initially setting the low priority items to predetermined invalid values indicating that valid attribute values are not yet computed.

Figure 48:
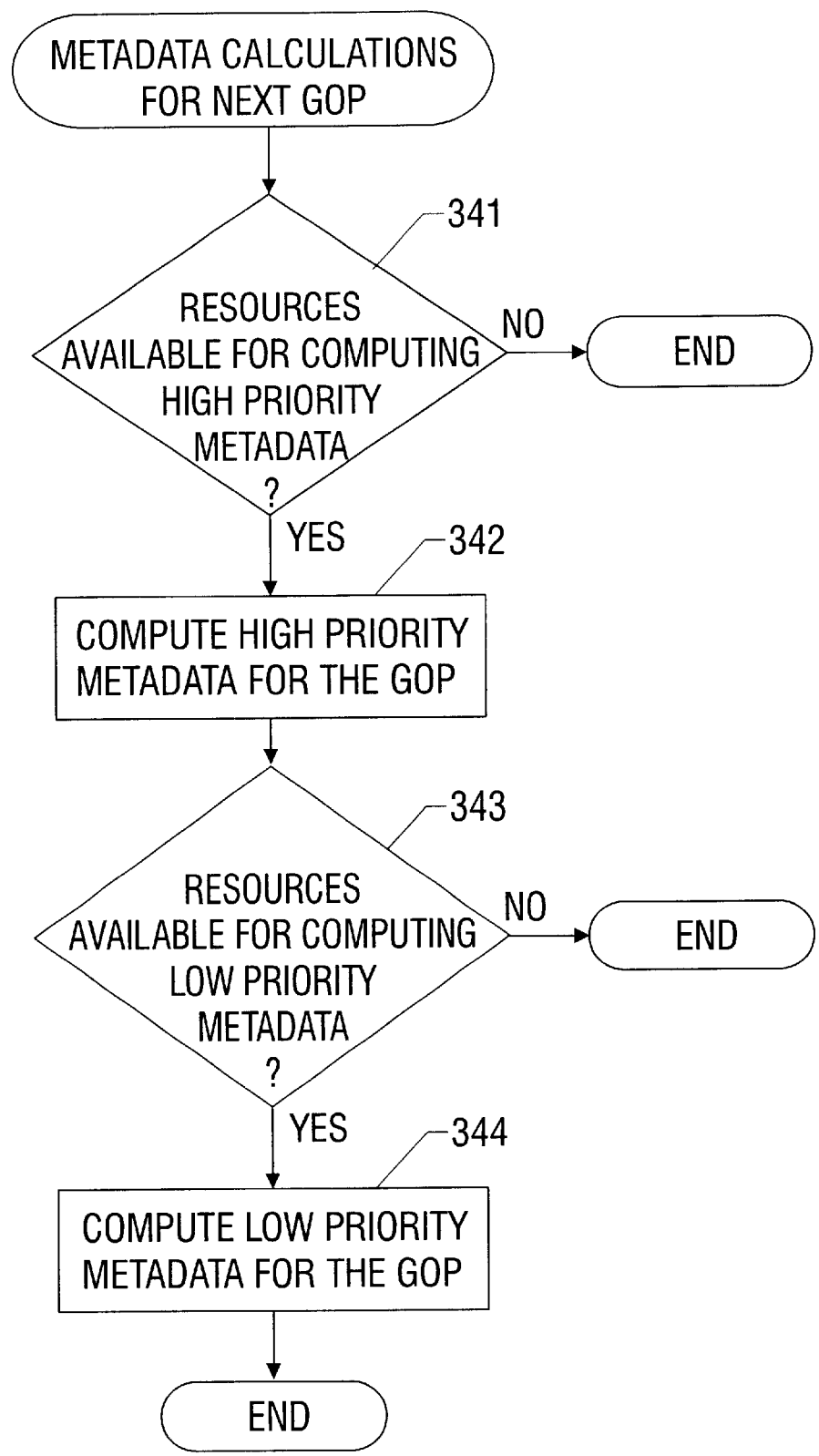
FIG. 48 is a flowchart showing metadata computations for a next GOP in an ingested TS.

With reference to FIG. 48, there is shown a flow chart of metadata computations for a next GOP processed in a TS. In a first step 341, if resources available for computing high priority metadata are not presently available, then the computations for the GOP are terminated. Otherwise, the procedure continues to step 342, where the high priority metadata is computed for the GOP. Then, in step 343, if resources for computing low priority metadata are not available, then the computations for the GOP are terminated. Otherwise, the procedure continues to step 344, where the low priority metadata is computed for the GOP.

The GOPs in a TS can be fixed size (same size throughout the TS) or variable size in terms of the number of video frames they contain. If the GOPs are of a fixed size, then each has an integral number of "n" frames. In this case, assuming that the first frame number in the TS is "m", then the number of the GOP containing a specified frame "p" can be calculated as the integer quotient of (p−m)/n plus one. If the GOPs are of variable size, then the metadata may include an average GOP size; i.e., an average number of frames per GOP. In this case, to find the GOP containing a specified frame, the GOP number is estimated using the same formula (using the average number of frames per GOP for n), and then the GOP index table is searched in the neighborhood of this GOP for the GOP containing the specified frame number.

The metadata contains information on the clip which is used during the play operation to check the buffer levels and to adjust these levels at the splicing time. The fundamental information item of metadata is the difference DTS–$PCR_e$ for each video access unit within the video stream which is representative of the buffer level in the sense described previously. It should be noted that DTS values are defined for I and P frames for which the decoding and presentation times differ since these frames are used as references by other P and B frames. However, for type B frames only PTS is defined which is identical to the DTS of the same frame.

A subsection of the metadata includes the following two values:

First PTS: This is the PTS of the First Frame in Display Order.

First PCR, ($PCR_{e,0}$): This is a calculated (i.e., extrapolated) PCR value corresponding to the beginning (i.e. the first byte) of the file. This value is computed from the bit-rate, the value of the first genuine PCR record and its byte position within the file.

Based on these two values, for each I frame the procedure computes both the DTS of this frame and also the $PCR_e$ value corresponding to the beginning of this frame within the file. In order to perform these calculations, the procedure also accesses the frame number (a cumulative frame count from the beginning of the file) and the byte position of the beginning of this frame in the file, both of which are recorded in the GOP index table.

The GOP index table forms a major sub-section of the metadata. It is easy to see that assuming one I frame per GOP, the cumulative frame count values at I pictures also become their cumulative temporal references (referring to display order). Then, it is straightforward to calculate a PTS value for each of these I frames assuming a continuous video play-out. Finally, assuming a known uniform GOP structure, these presentation time stamps of I pictures can be easily converted to decoding time stamps based on the principle that the decode time instant of an anchor frame is the same as the presentation time instant of the previous anchor frame. So, the DTS–$PCR_e$ difference can be computed in advance for each I frame of the file and consequently whatever the start position is in a clip for play-out, the required buffer level to be build-up can be known in advance.

Figure 49:
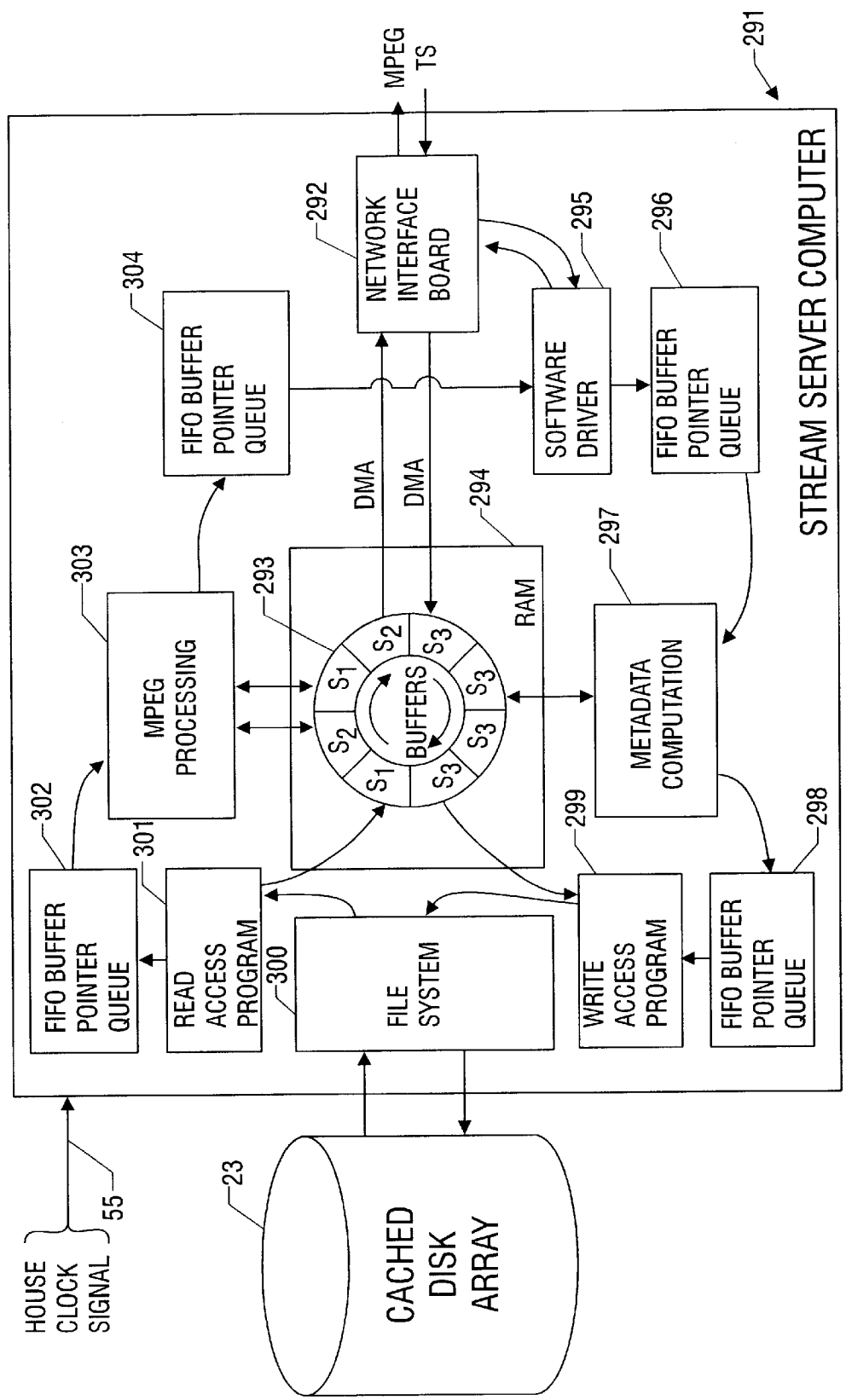
FIG. 49 is a block diagram of various blocks in the stream server computer of the video file server of FIG. 1 for computing MPEG metadata during ingestion of an MPEG TS, and for performing real-time MPEG processing such as seamless splicing in real-time during real-time transmission of a spliced MPEG TS.

With reference to FIG. 49, there are shown further details of the components involved in the ingestion of an MPEG TS into a stream server computer 291 for recording in the cached disk array, and for real-time splicing during real-time transmission of an MPEG TS from the cached disk array and from the stream server computer to a destination such as one of the clients (54 in FIG. 1). The stream server computer 291 is interfaced to the network (25 in FIG. 1) via a network interface board 292. The network interface board 292, for example, is a DVB board, an ATM board, an Ethernet board, a Fiber Channel board, or a Gigabit Ethernet board. The network interface board 292 performs a direct memory access upon buffers 293 in the random access memory 294 of the stream server computer 291 in order to exchange MPEG TS data with the network (25 in FIG. 1). A software driver 295 for the network interface board 292 initiates the direct memory access transfers. In particular, the software driver 295 hands to the network interface board 292 the RAM address range of the data in the buffer for the DMA transfer. Real-time delivery of an MPEG TS stream from the stream server 291 is controlled by a "house" clock signal 55. As shown in FIG. 1, the house clock signal 55 is applied to each of the stream servers 21 and the controller servers 28, 29 in the video file server 20. This house clock signal 55 simultaneously interrupts each stream server and controller server at the video frame rate.

For DVB (digital video broadcast), data is transmitted upon request. When the stream server is accepting data from an application, the request is produced when a receive buffer becomes available. For ATM (asynchronous transfer mode), the data is transmitted in response to a time interrupt signal. A buffer is scheduled to be available when the interrupt is expected to occur. In either case, when transmitting an MPEG TS, the data must be delivered to ensure that any jitter is within the limit that the MPEG standard imposes on the PCR time values. The PCR values must be accurate within 20 cycles of a 27 MHz decoder clock. Moreover, the difference between neighboring PCR values in the TS is kept less that 100 msec; otherwise, the decoder clock will reset.

When ingesting an MPEG TS from the network (25 in FIG. 1), once an assigned one of the buffers 293 is filled with MPEG TS data, the software driver 295 inserts a pointer to the filled buffer into a FIFO buffer pointer queue 296. A metadata computation software program module 297 finds that the queue 296 is not empty, and services the queue by obtaining the buffer pointer from the queue and accessing the MPEG TS data in the buffer 293 indicated by the pointer. The metadata computed by the program module 297, for example, is placed in a header of the buffer. When the metadata computation module 297 is finished, it places the buffer pointer in another FIFO buffer pointer queue 298. The queue 298 is serviced by a write access program module 299. The write access program module 299 removes the pointer from the queue 298, and then writes the data from the indicated buffer to an MPEG TS file of the file system 300. The file system 300 writes the data to the cached disk array 23 in an asynchronous write operation to data storage in the cached disk array. The file system maps the address space of each file to one or more 16 megabyte blocks of storage in the cached disk array. (The active one of the controller servers 28, 29 in FIG. 1 has supervisory control over these operations of the stream server computer 291.)

To perform splicing or other real-time MPEG processing during real-time delivery of an MPEG TS to the network (25 in FIG. 1), a read access program module 301 invokes the file system 300 to read the MPEG TS data from an MPEG TS file in the cached disk array 23 in an asynchronous read operation upon data storage in the cached disk array, and the read access program module writes the MPEG TS data into an assigned one of the buffers 293. When the read access program 301 has filled the assigned one of the buffers 293, it places a pointer to the buffer on a FIFO buffer pointer queue 302. An MPEG processing program module 303 services the queue 302. Upon finding that the queue 302 is not empty, the module 303 removes the pointer from the queue 302 and accesses the buffer 293 indicated by the pointer.

For splicing, the MPEG processing module 303 will access two consecutive buffers, one containing a first clip and the other containing a second clip. The splicing procedure modifies the first clip in its assigned buffer so that the first clip will represent the spliced TS. Splicing in real time requires parsing the TS stream in real time for audio PES packet headers, and parsing the audio PES packets in real time for the AAUs. Also the TS stream is parsed in real time to find the GOP header and to extract the display order and type (i.e., open or closed) from the GOP header. The AAUs around the splice point are identified as obsolete or not, the non-obsolete AAUs are reformatted and the obsolete AAUs are eliminated in real time. The TS stream around the splice point is modified in real time for seamless video splicing. The time stamp offsets are computed and the spliced TS stream following the splice point has all of its time stamps and continuity counters re-stamped in real time.

When the MPEG processing module 303 is finished with the splicing operation, it places the pointer to the buffer of the spliced TS into yet another FIFO buffer pointer queue 304. The queue 304 is serviced by the software driver. Upon finding that the queue 304 is not empty, the software driver 295 removes the pointer from the queue 304, and causes the network interface board to initiate a direct memory access transfer of the spliced TS from the indicated buffer 293 to the network (25 in FIG. 1). The TS data is buffered from the MPEG processing to the network interface board because the network interface board has priority access to the stream server RAM. (The active one of the controller servers 28, 29 in FIG. 1 has supervisory control over these operations of the stream server computer 291.)

It is also possible for the new spliced TS to be stored in the cached disk array 23, with or without concurrent transfer to the network (25 in FIG. 1.) In this case, the software driver 295 passes the buffer pointer from the queue 304 to the queue 296. Overall, it is seen that the buffers 293 function as a kind of carousel to distribute clips and MPEG TS streams data to successive processing, storage, and stream delivery functions, and the MPEG TS streams can be easily edited and spliced in the process.

The number of buffers 293 that are allocated for use in the carousel during the reading, writing, or generation of a spliced TS is a function of the bit rate of the TS. A higher bit rate requires more buffers. Each buffer, for example, has 64 kilobytes of memory, and the data rate can range from about 100 kilobits per second to 130 megabits per second. The buffers smooth out variations in bit rate that are not deterministic in time. The buffer size can be much smaller than a clip, and smaller than a portion of a clip that is needed for splicing. In this case, when splicing a first stream ($S_1$) to a second stream ($S_2$), alternate buffers in sequence around the carousel can contain data from the same clip. For example, a first buffer may contain a next-to-last segment of the first clip, a second buffer may contain a first segment of the second clip, a third buffer may contain a last segment of the first clip, and a fourth buffer may a second segment of the second clip.

The metadata computation module 297 parses the content of its assigned buffer. The parsing typically continues from one buffer to a next buffer in the carousel, for the usual case where each buffer has a size smaller than the duration of the TS. The parsing counts frames, builds GOP entries, calculates instantaneous bit rates and other GOP attributes, and looks for error conditions. Each GOP header is parsed for display order and type (i.e., open or closed).

The MPEG processing 303 may use a number of flags. These MPEG processing flags include the following:

0x100: re-stamp time records flag

If this flag is set then all of the PCR and DTS/PTS records are recomputed and re-stamped so that they are continuous across splicing transitions.

0x200: discontinuity flag

If this flag is set, the discontinuity flag of the adaptation field in the TS packet headers is set following the splicing point.

0x1000: rate-based padding flag

This bit is not used by the MPEG processing itself. If padding is necessary since the session bit-rate is greater than the clip bit-rate, the right amount of padding will be inserted in any case. However, it is used by the video service to allow appending clips having a bit-rate smaller than the session bit-rate. If it is not set, the video service allows only clips having the same bit-rate as the current session.

0x2000: allow removal of B frames in an open GOP

If this flag is not set then no frames from any clip can be removed or replaced. This bit must be set only if clips are encoded with an encoder set-up to generate clips that can be spliced.

0x20000: disable audio splicing flag

This bit when set, disables all of the audio processing around the splicing points except for the PTS. and PCR re-computation. All of the audio present in the clip is played in this case.

Figure 50:
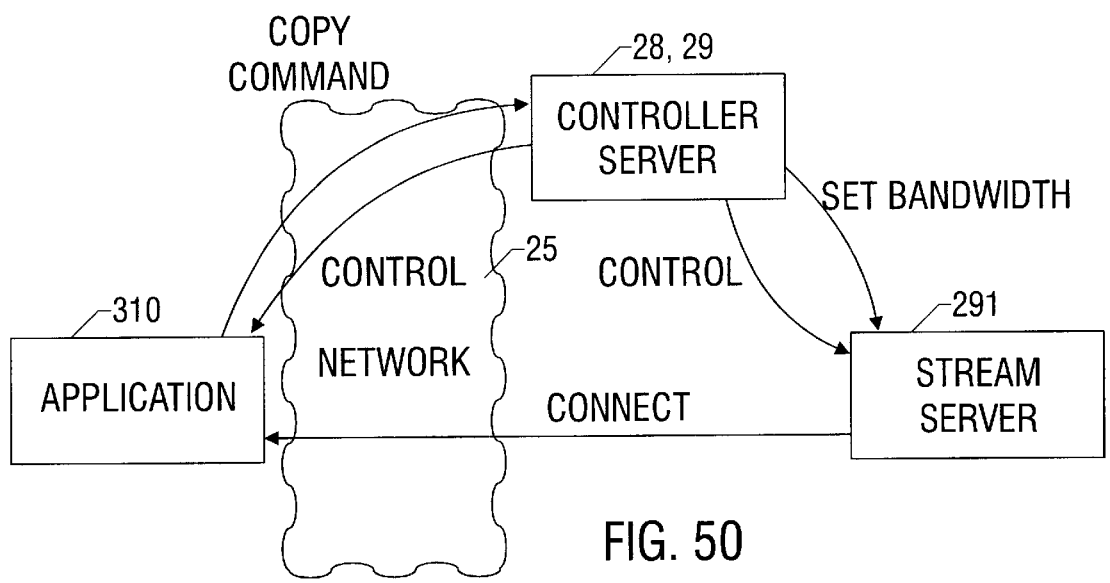
FIG. 50 is a diagram showing flow of control during a metered file transfer using the video server of FIG. 1.

With reference to FIG. 50, there is shown a diagram that illustrates a metered file transfer protocol (FTP). This protocol is useful for transfer of an MPEG TS stream from the video file server (20 in FIG. 1) to an application 310. The application 310, for example, is a client application on the network 25, or it could be another video file server. The application 310 initiates the metered FTP by sending a copy command to the active one of the controller servers 28, 29. The controller server sends a set bandwidth command to the stream server to set the bit rate for the metered transfer of file data between the stream server 291 and the application 310. The stream server then issues a connect message to the application to open an IP channel for the transfer of the file data. In the metered FTP protocol, the data transmission rate is controlled so that the loading on the stream server is deterministic. The data transmission is TCP flow controlled. For input to the stream server from the application, the stream server controls the data rate by flow-control pushback. For transmission of data from the stream server to the application, the stream server merely controls the rate at which it transmits the data.

In the transmission control protocol (TCP), the stream server either opens or closes a window of time within which to receive more data. The stream server indicates to the application a certain number of buffers that are available to receive the data. In addition, the stream sever acknowledges receipt of the data.

In the metered FTP protocol, time is split up into one-second intervals, and at every 1/10 of a second, the average data rate is re-computed. An adjustment is made to a data transmission interval parameter if the computed data rate deviates from the desired rate. For example, for a desired 10 kilobyte per second transmission rate, the data transmission size is set at one kilobyte, and the data transmission interval parameter is initially set at 1/10 of a second. If the computed average data rate happens to be less than 10 kilobytes per second, then a one kilobyte bunch of data will be transmitted more frequently than once every 1/10 of a second.

Figure 51:
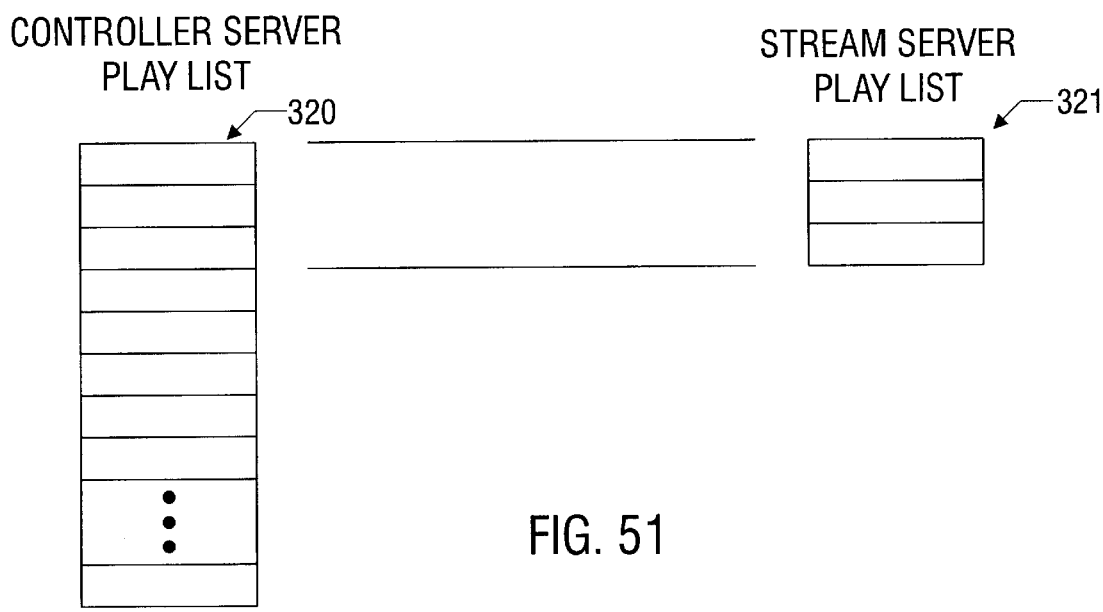
FIG. 51 is a block diagram of play lists in the video file server of FIG. 1, showing that a stream server play list is maintained as a window into a control station play list.

With reference to FIG. 51, there is shown a control station play list 320 and a stream server play list 321. As described in the above referenced Duso et al. U.S. Pat. No. 5,892,915, the stream server can continuously supply a real-time data stream to a client by servicing a play list. As shown in FIG. 51, the play list can be distributed between the controller server play list 320 and a stream server play list 321. The controller server play list, for example, holds up to 356 elements that point to clips, and the stream server play list holds up to three of the elements. The stream server play list is in effect a window to up to three of the elements that are at or near the head of the controller server play list. When a pointer to a clip is placed in a play-list entry, the entry also has an indication of an In Point in the clip, an Out Point for the clip, and a desired start time. A pointer to a clip can be recalled (i.e., removed) from a play-list entry.

When a pointer to a clip is appended to the controller server play list 320, extra audio packets are loaded in a FIFO buffer. Then, the start and the end positions of the clip are set based on the video elementary stream only. The clip is read starting with the first video frame to play and until the end of the last frame to play. One dedicated buffer is associated with each audio stream. The number of additional audio access units to play is computed at the splicing time. All of these pre-fetched audio access units will be played only if the clip is played until the end. However, if the play-out of the clip is interrupted by a "play-next immediate" or a "play-next at-time" command then some of the preloaded extra audio is replaced by audio data (i.e. audio access units) extracted from the new clip's buffer pool at the splicing time.

Figure 52:
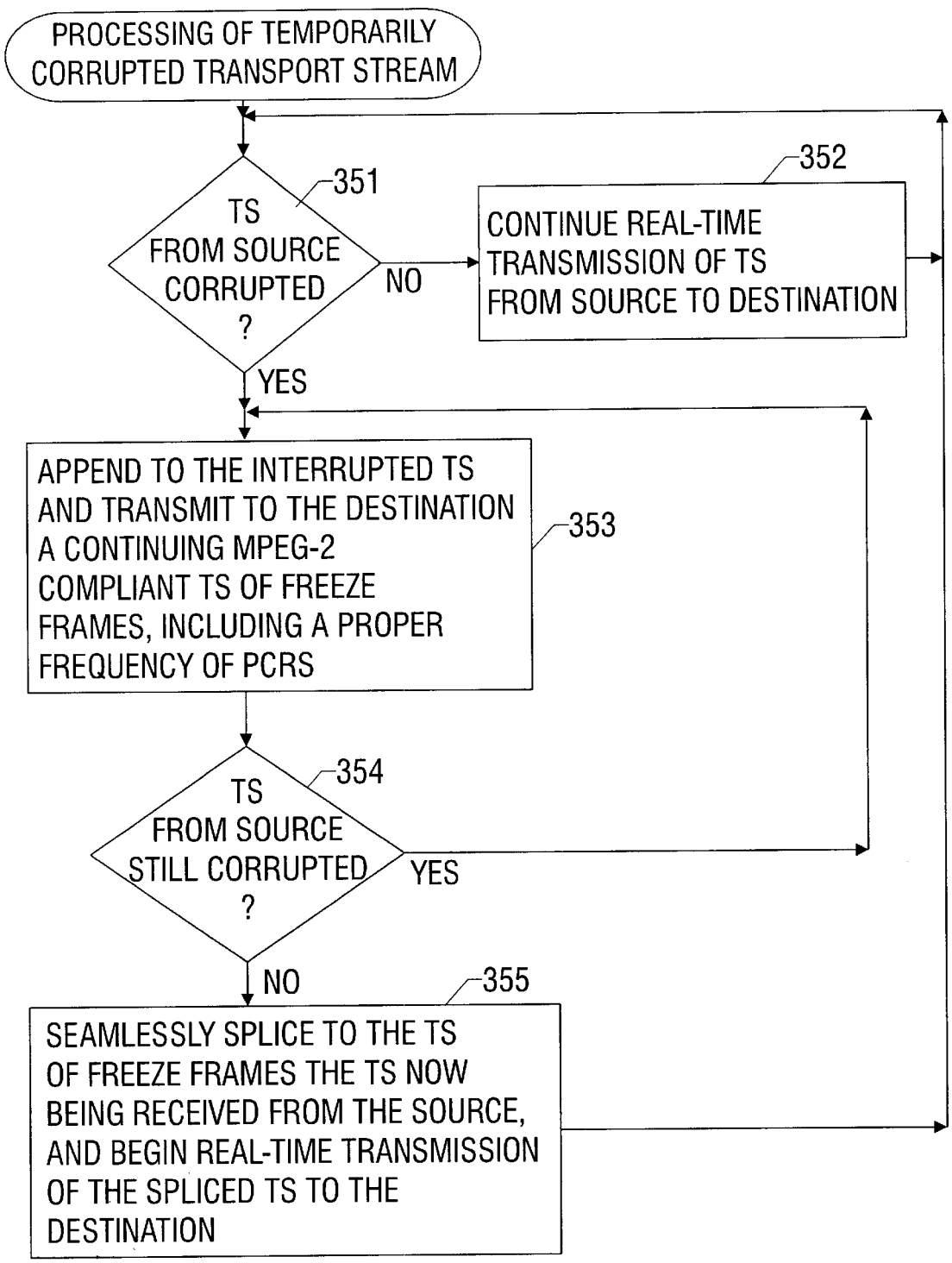
FIG. 52 is a flow chart showing the use of seamless splicing for repair of a temporarily corrupted TS.

The seamless splicing techniques described above can also be used to recover from failure conditions that may destroy or corrupt a portion of an MPEG transport stream. For example, a component of a data path in the cached disk array may fail, causing an MPEG TS from a disk drive in the cached disk array to be interrupted for a short period of time while the failure condition is diagnosed and the MPEG TS is re-routed to bypass the failed component. As shown in the flow chart of FIG. 52, the MPEG processing module may be programmed to recognize the failure (step 351) during the delivery of the MPEG TS to a client (step 352). Once this failure is detected, the MPEG processing module 303 can fill in this gap in the MPEG TS with null packets or freeze frames with correct PCR values (step 353). By inserting correct PCR values at less than the required minimum interval (less than 100 milliseconds), a client's decoder will not reset and can be kept in a ready state. Once delivery of the MPEG TS to the MPEG processing module is reestablished (as detected in step 354), the MPEG processing module seamlessly splices (step 355) the re-established TS (as if it were a second stream or clip) to the TS of null packets or freeze frames that it has been generating and sending to the client. Splicing could be performed in a similar fashion in the set-top decoder box of FIG. 2 or the switch of FIG. 3 to compensate for temporary interruptions in the delivery of an MPEG TS to the set-top decoder box or to the switch.

In a similar fashion, the MPEG processing module in batch mode could check a clip for any damaged portions, and once a damaged portion is found, remove it by seamlessly splicing the end of the first good part of the clip to the beginning of the last good part of the clip. Batch mode processing also would have the advantage that the audio and video buffer levels could be determined exactly by simulation, so that it would be possible to guarantee the absence of any buffer underflow or overflow at every point after the splice. Batch mode processing, with audio and video buffer simulators, could also measure the quality of spliced TS streams and determine whether or not the splices should be repaired using the more accurate simulated buffer levels. The quality measurement could also include an analysis of audio delay or skew; how many freeze frames are in the TS stream and their clustering, and an analysis of PCR jitter. It would also be very easy for the MPEG processing module to compute the audio skew and PCR jitter in real time during the real-time transmission of an MPEG TS, and to display continuous traces of the audio skew and PCR jitter to a system administrator.

In view of the above, there have been described various techniques for seamless splicing of audio/visual transport streams, including predictive analysis performed upon encoded digital motion video (such as an MPEG Transport Stream). The predictive analysis includes estimation of upper and lower bounds of the data levels in a decoder's video and audio buffers for splicing in such a way as to prevent buffer overflow and underflow. This enables buffer management techniques including padding or stuffing, micro-restamping, freeze or repeat of frames, skip or drop of frames, alignment of audio with video. The predictive analysis also includes analysis of the structure of the encoded audio including audio access units (AAUs) and compression windows (AFs), prediction in the compressed domain of initial conditions of the decoder buffer levels for every single Elementary Stream (ES) component of a Transport Stream (TS), and identification of valid splicing In Points and Out Points based on the predicted buffer levels without any special encoder. This permits splicing of different compressed audio types without consideration of the details of the compression mechanism. The predictive analysis may also include recommendations or marking. The creation of the metadata is performed on ingest of the data as a pre-processing in preparation for splicing of a new file on early queuing in a data storage system before streaming. The predictive analysis also provides support for multiplexing of multiple elementary streams including multiple video, audio, and data streams, and splicing of elementary streams encoded with or without variable bit rate.

What is claimed is:

1. A method of seamless splicing of a first transport stream to a second transport stream to produce a spliced transport stream, the first transport stream including video access units encoding video presentation units representing video frames and audio access units encoding audio presentation units representing segments of a first audio signal, the second transport stream including video access units encoding video presentation units representing video frames and audio access units encoding audio presentation units representing segments of a second audio signal, the first transport stream having a last video frame to be included in the spliced transport stream, and the second transport stream having a first video frame to be included in the spliced transport stream, said method comprising:

(a) finding, in the first transport stream, an audio access unit that is best aligned with the last video frame from the first transport stream to be included in the spliced transport stream, and removing audio access units from the first transport stream that are subsequent to the audio access unit that is best aligned with the last video frame from the first transport stream;

(b) finding, in the second transport stream, an audio access unit that is best aligned with the first video frame from the second transport stream to be included in the spliced transport stream; and removing audio access units from the second transport stream that are prior to the audio access unit that is best aligned with the first video frame from the second transport stream; and (c) concatenating a portion of the first transport stream up to and including the last video frame to a portion of the second transport stream including and subsequent to the first video frame.

2. The method as claimed in claim 1, which includes finding, in the first transport stream, the audio access unit that is best aligned with the last video frame from the first transport stream to be included in the spliced transport stream by computing a difference between presentation time at the end of an audio presentation unit encoded in the first transport stream and a presentation time at the end of the last video frame from the first transport stream to be included in the spliced transport stream, and finding that the difference has a magnitude less than half of a duration of the audio presentation unit, wherein the audio access unit that is best aligned with the last video frame from the first transport stream to be included in the spliced transport stream encodes the audio presentation unit having an ending presentation time that is best aligned with the ending presentation time of the last video frame from the first transport stream to be included in the spliced transport stream.

3. The method as claimed in claim 1, which includes finding, in the second transport stream, the audio access unit that is best aligned with the first video frame from the second transport stream to be included in the spliced transport stream by computing a difference between presentation time at the beginning of an audio presentation unit encoded in the second transport stream and a presentation time at the beginning of the first video frame from the second transport stream to be included in the spliced transport stream, and finding that the difference has a magnitude less that a half of a duration of the audio presentation unit, wherein the audio access unit that is best aligned with the first video frame from the second transport stream to be included in the spliced transport stream encodes the audio presentation unit having a beginning presentation time that is best aligned with the beginning presentation time of the first video frame from the second transport stream to be included in the spliced transport stream.

4. The method as claimed in claim 1, which includes deciding that decoding of the second transport stream in the absence of splicing would cause an audio decoder buffer to have a mean level substantially more than half full, and upon deciding that decoding of the second transport stream in the absence of splicing would cause the audio decoder buffer to have a mean level substantially more than half full and also concluding that a backward audio skew would not result in the second transport stream after splicing if both of the audio access unit that is best aligned with the first video frame and the audio access unit that is best aligned with the second video frame, then excluding, from the spliced transport stream, only one of either the audio access unit that is best aligned with the first video frame or the audio access unit that is best aligned with the second video frame in order to reduce the mean level of the audio decoder buffer for decoding of the second transport stream.

5. The method as claimed in claim 1, which includes deciding that decoding of the second transport stream in the absence of splicing would cause an audio decoder buffer to have a mean level substantially less than half full and also concluding that a backward audio skew, and upon deciding that decoding of the second transport stream in the absence of splicing would cause the audio decoder buffer to have a mean level substantially less than half full and also concluding that a forward audio skew in the second transport stream after splicing would not result without inclusion of an additional audio access unit in the spliced transport stream, then including, in the spliced transport stream, only one additional audio access unit either after the best aligned audio access unit in the first transport stream or before the best aligned audio access unit in the second transport stream in order to increase the mean level of the audio decoder buffer for decoding of the second transport stream.

6. The method as claimed in claim 1, wherein audio access units to be included in the spliced transport stream from the first transport stream and the second transport stream are selected by decoding one of sixteen possible cases determined from a presentation time offset (delta 1) of alignment between audio and video for the audio access unit that is best aligned with the last video frame from the first transport stream to be included in the spliced transport stream, a presentation time offset (delta 2) of alignment between audio and video for the audio access unit that is best aligned with the first video frame from the second transport stream to be included in the spliced transport stream; and a mean level that an audio decoding buffer would have upon decoding of the second transport stream in the absence of splicing.

7. The method as claimed in claim 6, wherein the decoding includes inspecting the sign of the presentation time offset delta 1, inspecting the sign of the presentation time offset delta 2, comparing a difference between the presentation time offset delta 1 and the presentation time offset delta 2 to a numerical range, and comparing at least two threshold to a mean level that the audio decoding buffer would have upon decoding of the second transport stream in the absence of splicing.

8. The method as claimed in claim 1, wherein the first transport stream, the second transport stream, and the spliced transport stream are MPEG-2 compliant.

9. The method as claimed in claim 1, which includes skewing, in the spliced transport stream, presentation times for audio access units from the second transport stream with respect to presentation times for associated video access units from the second transport stream in order to adjust a mean audio buffer level that would be substantially different from half-full when decoding the second transport stream in the absence of splicing, toward a half-full audio buffer level when decoding the spliced transport stream.

10. The method as claimed in claim 9, wherein audio/visual skew is not introduced in a cumulative fashion for multiple consecutive splices.

11. The method as claimed in claim 9, which includes estimating the mean audio buffer level that would result when decoding the second transport stream, in the absence of splicing, by filtering a sequence of differences between presentation times and corresponding extrapolated program clock reference times for the audio access units of the second transport stream.

12. The method as claimed in claim 11, which further includes estimating a variance of the audio buffer level that would result when decoding the second stream, in the absence of splicing, to ensure with a level of confidence that the audio buffer for the spliced transport stream will not overflow or underflow.

13. The method as claimed in claim 1, which includes modifying the portion of the first transport stream contained in the spliced transport stream in order to eliminate any substantial video presentation discontinuity, the modification being performed prior to finding, in the first transport stream, an audio access unit that is best aligned with the last video frame from the first transport stream to be included in the spliced transport stream.

14. A method of seamless splicing of a first transport stream to a second transport stream to produce a spliced transport stream, the first transport stream including video access units encoding video presentation units representing video frames and audio access units encoding audio presentation units representing segments of a first audio signal, the second transport stream including video access units encoding video presentation units representing video frames and audio access units encoding audio presentation units representing segments of a second audio signal, the first transport stream having a last video frame to be included in the spliced transport stream, and the second transport stream having a first video frame to be included in the spliced transport stream, said method comprising:

(a) computing differences between presentation times and corresponding extrapolated program clock reference times for the audio access units of the second transport stream in order to estimate the mean audio buffer level that would result when decoding the second transport stream; and (b) concatenating a portion of the first transport stream up to and including the last video frame to a portion of the second transport stream including and subsequent to the first video frame, wherein presentation times for audio access units from the second transport stream are skewed in the spliced transport stream with respect to presentation times for video access units from the second transport stream in order to adjust the estimated mean audio buffer level toward a half-full audio buffer level when decoding the spliced transport stream.

15. The method as claimed in claim 14, which further includes passing the differences through a digital filter to compute an estimate of the mean audio buffer level that would result when decoding the second transport stream.

16. The method as claimed in claim 14, which further includes computing an estimate of a variance of the audio buffer level of the second stream, in the absence of splicing, to ensure with a level of confidence that the audio buffer for the spliced transport stream will not overflow or underflow.

17. A method of seamless splicing of a first transport stream to a second transport stream to produce a spliced transport stream, the first transport stream including video access units encoding video presentation units representing video frames, the video access units of the first transport stream encoding the video presentation units using a data compression technique and containing a variable amount of compressed video data, the second transport stream including video access units encoding video presentation units representing video frames, the video access units of the second transport stream encoding the video presentation units using a data compression technique and containing a variable amount of compressed video data, the first transport stream having a last video frame to be included in the spliced transport stream, and the second transport stream having a first video frame to be included in the spliced transport stream, each of the video access units having a time at which each video access unit is to be received in a video decoder buffer and a time at which said each video access unit is to be removed from the video decoder buffer, said method comprising:

(a) setting the time at which the video access unit for the first video frame of the second transport stream is to be removed from the video decoder buffer to a time following in a decoding sequence next after the time at which the last video access unit for the last frame of the first transport stream is to be removed from the video decoder buffer;

(b) adjusting content of the first transport stream so that the beginning of the video access unit for first video frame of the second transport stream will be received in the video decoder buffer immediately after the end of the video access unit for the last video frame of the first transport stream is received in the video decoder buffer; and (c) concatenating a portion of the first transport stream up to and including the last video frame to a portion of the second transport stream including and subsequent to the first video frame.

18. The method as claimed in claim 17, wherein the video access unit for the last video frame of the first transport stream has a decode time stamp ($DTS_{L1}$) specifying when the video access unit for the last video frame of the first transport stream is to be removed from the video decoder buffer, the video access unit for the first video frame of the second transport stream has a decode time stamp ($DTS_{F2}$) specifying when the video access unit for the first video frame of the second transport stream is to be removed from the video decoder buffer, and the method includes setting the decode time stamp of the video access unit for the first video frame of the second video stream substantially equal to the decode time stamp of the video access unit for the last video frame of the first video stream plus one video frame interval.

19. The method as claimed in claim 18, wherein the first transport stream has at least one program clock reference time stamp from which can be extrapolated a time ($T_e$) at which the end of the video access unit for the last video frame of the first transport stream will be received in the video decoder buffer, and the second transport stream has at least one program clock reference time stamp from which can be extrapolated a time ($PCR_{e2}$) at which the beginning of the video access unit for the first video frame of the second transport stream will be received in the video decoder buffer, and the method includes adjusting the content of the first video stream so that $PCR_{e2}$ will immediately follow $T_e$ and the original difference ($DTS_{F2}-PCR_{e2}$) for the second stream will be substantially equal to the difference ($DTS_{F2}-PCR_{e2}$) between corresponding locations in the spliced transport stream.

20. The method as claimed in claim 19, wherein $PCR_{e2}$ in the spliced transport stream is substantially equal to $T_e$ plus the quotient of eight divided by a bit transmission rate for the spliced transport stream.

21. The method as claimed in claim 17, which includes computing a time ($T_S$) at which a first byte for the first video frame of the second transport stream should be received in the video decoder buffer where $T_S = DTS_{F1} - DTS_{F2} + PCR_{e2}$, and computing a difference between $T_e$ and $T_S$ to compute an amount of data that is removed from at least one video access unit in the first transport stream that is included in the spliced transport stream.

22. The method as claimed in claim 17, wherein the content of the first transport stream is adjusted by replacing at least one video access unit in the first transport stream with a video access unit encoding a freeze frame having a size selected so that the beginning of the video access unit for the first video frame of the second transport stream will be received in the video decoder buffer immediately after the end of the video access unit of the last video frame of the first transport stream is received in the video decoder buffer.

23. The method as claimed in claim 22, which includes selecting the size of the freeze frame by selecting the size of at least one slice in the freeze frame.

24. The method as claimed in claim 17, wherein the second transport stream has a higher bit transmission rate than the first transport stream, and the second transport stream is spliced in substantially seamless fashion to the first transport stream.

25. The method as claimed in claim 17, wherein the first transport stream, the second transport stream, and the spliced transport stream are MPEG-2 compliant.

26. The method as claimed in claim 17, wherein the first transport stream includes audio packets, the second transport stream includes audio packets, a plurality of (j) non-obsolete audio packets in the first transport stream follow the beginning of the video access unit of the last video frame in the first transport stream and are included in the spliced transport stream, a total of (k) null packets and obsolete audio packets in the second transport stream follow the video access unit of the first video frame of the second transport stream, and the method includes, for j>k, replacing the null packets and obsolete audio packets with (k) of the non-obsolete audio packets, inserting the remaining (j−k) audio packets in the spliced transport stream before the video access unit of the first video frame from the second transport stream, and taking into consideration the amount of data in the remaining (j−k) audio packets when ensuring that the time at which the video access unit for the first video frame of the second transport stream is to be removed from the video decoder buffer follows in a decoding sequence next after the time at which the last video access unit for the last frame of the first transport stream is to be removed from the video decoder buffer, and that the beginning of the video access unit for the first video frame of the second transport stream will be received in the video decoder buffer immediately after the end of the video access unit for the last video frame of the first transport stream is received in the video decoder buffer and the original difference ($DTS_{F2}-PCR_{e2}$) for the second stream will be substantially equal to the difference ($DTS_{F2}-PCR_{e2}$) between the corresponding locations in the spliced transport stream.

27. A method of seamless splicing a first transport stream to a second transport stream to produce a spliced transport stream, the first transport stream including video access units encoding video presentation units representing video frames and audio packets including data of audio access units encoding audio presentation units representing segments of a first audio signal, the second transport stream including video access units encoding video presentation units representing video frames and audio packets including data of audio access units encoding audio presentation units representing segments of a second audio signal, the first transport stream having a last video frame to be included in the spliced transport stream, and the second transport stream having a first video frame to be included in the spliced transport stream, said method comprising:

finding a plurality of (j) non-obsolete audio packets in the first transport stream following the video access unit of the last video frame in the first transport stream and to be included in the spliced transport stream, finding a total of (k) null packets and obsolete audio packets in the second transport stream follow the video access unit of the first video frame of the second transport stream, where j>k;

replacing the null packets and obsolete audio packets with (k) of the non-obsolete audio packets; and concatenating a portion of the first transport stream up to and including the last video frame to a portion of the second transport stream including and subsequent to the first video frame to form the spliced transport stream, wherein the remaining (j−k) audio packets are inserted in the spliced transport stream before the video access unit of the first video frame from the second transport stream.

28. The method as claimed in claim 27, wherein content of the portion of the first transport stream up to and including the last video frame is adjusted to reduce a video decoding discontinuity, and the amount of data in the remaining (j−k) audio packets is taken into consideration when adjusting the content of the portion of the first transport stream up to and including the last video frame.

* * * * *